(12) United States Patent
Burdynska et al.

(10) Patent No.: US 11,581,570 B2
(45) Date of Patent: Feb. 14, 2023

(54) POLYURETHANE HYBRID SOLID ION-CONDUCTIVE COMPOSITIONS

(71) Applicant: Blue Current, Inc., Berkeley, CA (US)

(72) Inventors: Joanna Burdynska, Berkeley, CA (US); Alexander Teran, Oakland, CA (US); Benjamin Rupert, Berkeley, CA (US); Eduard Nasybulin, Fremont, CA (US); Richard Hoft, Palo Alto, CA (US); Simmi Kaur Uppal, Oakland, CA (US)

(73) Assignee: Blue Current, Inc., Hayward, CA (US)

( * ) Notice: Subject to any disclaimer, the term of this patent is extended or adjusted under 35 U.S.C. 154(b) by 0 days.

(21) Appl. No.: 16/241,784

(22) Filed: Jan. 7, 2019

(65) Prior Publication Data

US 2020/0220202 A1 Jul. 9, 2020

(51) Int. Cl.
*H01M 10/056* (2010.01)

(52) U.S. Cl.
CPC .. *H01M 10/056* (2013.01); *H01M 2300/0082* (2013.01); *H01M 2300/0091* (2013.01)

(58) Field of Classification Search
CPC combination set(s) only.
See application file for complete search history.

(56) References Cited

U.S. PATENT DOCUMENTS

| 4,828,945 A | 5/1989 | Nagata et al. |
| 4,879,073 A | 11/1989 | Kromrey |
| 4,929,388 A | 5/1990 | Wessling |
| 4,985,317 A | 1/1991 | Adachi et al. |
| 4,990,413 A | 2/1991 | Lee et al. |
| 5,057,573 A * | 10/1991 | Pascault ............. C08G 18/4277 524/871 |
| 5,190,695 A | 3/1993 | Sotomura |

(Continued)

FOREIGN PATENT DOCUMENTS

| CN | 101983444 A | 3/2011 |
| CN | 104779415 A | 7/2015 |

(Continued)

OTHER PUBLICATIONS

The English language translation of CN107403904A (Jun Haizu) (Year: 2017).*

(Continued)

*Primary Examiner* — Ula C Ruddock
*Assistant Examiner* — Sarika Gupta
(74) *Attorney, Agent, or Firm* — Weaver Austin Villeneuve & Sampson LLP

(57) ABSTRACT

Provided herein are methods of forming solid-state ionically conductive composite materials that include particles of an inorganic phase in a matrix of an organic phase. The organic phase includes a cross-linked polyurethane network. The methods involve forming the composite materials from a precursor that is cross-linked in-situ after being mixed with the particles. The cross-linking occurs under applied pressure that causes particle-to-particle contact. Once cross-linked, the applied pressure may be removed with the particles immobilized by the polymer matrix. The polyurethane network is configured for easy processability of uniform films and may be characterized by a hard phase content of at least 20%.

27 Claims, 28 Drawing Sheets

(56) References Cited

U.S. PATENT DOCUMENTS

| | | | |
|---|---|---|---|
| 5,217,827 A * | 6/1993 | Fauteux | H01M 6/181 |
| | | | 252/62.2 |
| 5,360,686 A | 11/1994 | Peled et al. | |
| 5,521,026 A | 5/1996 | Brochu et al. | |
| 5,529,707 A | 6/1996 | Kejha | |
| H1576 H | 8/1996 | Walker, Jr. et al. | |
| 5,563,103 A | 10/1996 | Komatsu | |
| 5,576,115 A | 11/1996 | Capuano et al. | |
| 5,599,355 A | 2/1997 | Nagasubramanian et al. | |
| 5,625,474 A | 4/1997 | Aomori et al. | |
| 5,631,103 A | 5/1997 | Eschbach et al. | |
| 5,695,873 A | 12/1997 | Kumar et al. | |
| 5,965,299 A | 10/1999 | Khan et al. | |
| 6,066,417 A | 5/2000 | Cho et al. | |
| 6,096,234 A | 8/2000 | Nakanishi et al. | |
| 6,190,806 B1 | 2/2001 | Kumar et al. | |
| 6,200,707 B1 | 3/2001 | Takada et al. | |
| 6,368,746 B1 | 4/2002 | Takada et al. | |
| 6,395,429 B1 * | 5/2002 | Kang | H01M 10/0565 |
| | | | 429/306 |
| 6,475,677 B1 | 11/2002 | Inda et al. | |
| 6,524,749 B1 | 2/2003 | Kaneda et al. | |
| 6,645,675 B1 | 11/2003 | Munshi | |
| 6,664,006 B1 | 12/2003 | Munshi | |
| 6,939,383 B2 | 9/2005 | Eastin et al. | |
| 7,799,467 B2 | 9/2010 | DeLongchamp et al. | |
| 7,824,795 B2 | 11/2010 | Yoshida et al. | |
| 7,993,782 B2 | 8/2011 | Takada et al. | |
| 8,182,943 B2 | 5/2012 | Visco et al. | |
| 8,895,194 B2 | 11/2014 | Shigeo et al. | |
| 8,951,678 B2 | 2/2015 | Jeong et al. | |
| 8,968,928 B2 | 3/2015 | Wang et al. | |
| 9,093,722 B2 | 7/2015 | Zhang et al. | |
| 9,153,840 B2 | 10/2015 | Saimen et al. | |
| 9,231,253 B2 | 1/2016 | Lee et al. | |
| 9,926,411 B1 | 3/2018 | Burdynska et al. | |
| 9,972,838 B2 | 5/2018 | Teran et al. | |
| 9,972,863 B2 | 5/2018 | Teran et al. | |
| 10,079,404 B1 | 9/2018 | Burdynska et al. | |
| 10,174,173 B2 | 1/2019 | Burdynska et al. | |
| 10,355,319 B1 | 7/2019 | Lim et al. | |
| 10,457,781 B2 | 10/2019 | Burdynska et al. | |
| 10,797,314 B2 | 10/2020 | Teran et al. | |
| 11,355,750 B2 | 6/2022 | Teran et al. | |
| 11,394,054 B2 | 7/2022 | Villaluenga et al. | |
| 11,394,064 B2 | 7/2022 | Honjo | |
| 2002/0185627 A1 | 12/2002 | Chen-Yang et al. | |
| 2006/0228608 A1 | 10/2006 | Chung et al. | |
| 2008/0138697 A1 * | 6/2008 | Asada | H01M 8/106 |
| | | | 429/479 |
| 2008/0166636 A1 | 7/2008 | Niitani et al. | |
| 2008/0248396 A1 | 10/2008 | Jung et al. | |
| 2008/0268346 A1 | 10/2008 | Inda | |
| 2009/0062434 A1 | 3/2009 | Chen et al. | |
| 2009/0081553 A1 | 3/2009 | Kondo et al. | |
| 2010/0055301 A1 | 3/2010 | Naoi | |
| 2010/0151335 A1 | 6/2010 | Senga et al. | |
| 2011/0049745 A1 | 3/2011 | Katayama et al. | |
| 2011/0287305 A1 | 11/2011 | Scordilis-Kelley et al. | |
| 2012/0039824 A1 | 2/2012 | Archer et al. | |
| 2012/0177990 A1 | 7/2012 | Mitsuhashi et al. | |
| 2013/0040206 A1 | 2/2013 | Yoshida et al. | |
| 2013/0273421 A1 | 10/2013 | Matsumura et al. | |
| 2013/0289197 A1 | 10/2013 | Pavon Sierra et al. | |
| 2013/0309549 A1 | 11/2013 | Luski et al. | |
| 2014/0093785 A1 | 4/2014 | Sugiura et al. | |
| 2014/0162140 A1 | 6/2014 | Hoshiba et al. | |
| 2014/0170504 A1 | 6/2014 | Baek et al. | |
| 2014/0231706 A1 | 8/2014 | Cha et al. | |
| 2014/0234726 A1 | 8/2014 | Christensen et al. | |
| 2014/0255792 A1 * | 9/2014 | Cao | H01M 10/0525 |
| | | | 429/303 |
| 2015/0030933 A1 | 1/2015 | Goetzen et al. | |
| 2015/0102257 A1 | 4/2015 | Mullins et al. | |
| 2015/0147660 A1 | 5/2015 | Fujiki et al. | |
| 2015/0188187 A1 | 7/2015 | Strand et al. | |
| 2015/0255767 A1 | 9/2015 | Aetukuri et al. | |
| 2015/0288028 A1 | 10/2015 | DeSimone et al. | |
| 2015/0349377 A1 | 12/2015 | Sugiura et al. | |
| 2015/0349380 A1 | 12/2015 | Manthiram et al. | |
| 2015/0380739 A1 | 12/2015 | Watanabe et al. | |
| 2016/0013465 A1 | 1/2016 | Akiike | |
| 2016/0033918 A1 | 2/2016 | Taniguchi | |
| 2016/0049690 A1 | 2/2016 | Basak et al. | |
| 2016/0099470 A1 | 4/2016 | Kwon et al. | |
| 2016/0226097 A1 | 8/2016 | Wegner et al. | |
| 2016/0293946 A1 | 10/2016 | Ritter et al. | |
| 2017/0005367 A1 * | 1/2017 | Van Berkel | H01G 11/06 |
| 2017/0062830 A1 | 3/2017 | Bao et al. | |
| 2017/0062873 A1 | 3/2017 | Iyer et al. | |
| 2017/0133717 A1 | 5/2017 | Makino et al. | |
| 2017/0330699 A1 | 11/2017 | Buffry et al. | |
| 2017/0352916 A1 | 12/2017 | Miyashita et al. | |
| 2018/0034048 A1 | 2/2018 | Teran et al. | |
| 2018/0034061 A1 | 2/2018 | Teran et al. | |
| 2018/0034096 A1 | 2/2018 | Teran et al. | |
| 2018/0254513 A1 | 9/2018 | Burdynska et al. | |
| 2018/0254518 A1 | 9/2018 | Burdynska et al. | |
| 2018/0261877 A1 | 9/2018 | Strand et al. | |
| 2018/0282486 A1 | 10/2018 | Burdynska et al. | |
| 2018/0351148 A1 | 12/2018 | Schneider et al. | |
| 2019/0081353 A1 | 3/2019 | Iwata et al. | |
| 2019/0135988 A1 | 5/2019 | Burdynska et al. | |
| 2019/0148769 A1 | 5/2019 | Aihara et al. | |
| 2019/0221879 A1 | 7/2019 | Safanama et al. | |
| 2019/0288319 A1 | 9/2019 | Kim | |
| 2019/0296393 A1 | 9/2019 | Watanabe | |
| 2019/0312304 A1 | 10/2019 | Uesugi et al. | |
| 2019/0334150 A1 | 10/2019 | Koh et al. | |
| 2019/0372160 A1 | 12/2019 | Makino et al. | |
| 2020/0087155 A1 | 3/2020 | Rupert | |
| 2020/0099104 A1 | 3/2020 | Watanabe et al. | |
| 2020/0115505 A1 | 4/2020 | Burdynska et al. | |
| 2020/0168959 A1 | 5/2020 | Hettrich | |
| 2020/0203696 A1 | 6/2020 | Minamida | |
| 2020/0220210 A1 | 7/2020 | Makino | |
| 2021/0005889 A1 | 1/2021 | Teran et al. | |
| 2021/0047195 A1 | 2/2021 | Rupert | |
| 2021/0050620 A1 | 2/2021 | Rupert | |
| 2021/0057726 A1 | 2/2021 | Hoft et al. | |
| 2021/0167417 A1 | 6/2021 | Chao et al. | |
| 2021/0189105 A1 | 6/2021 | Burdynska et al. | |
| 2021/0194039 A1 | 6/2021 | Burdynska et al. | |
| 2021/0194047 A1 | 6/2021 | Villaluenga et al. | |
| 2021/0313616 A1 | 10/2021 | Villaluenga et al. | |
| 2021/0389645 A1 | 12/2021 | Kim | |
| 2022/0021023 A1 | 1/2022 | Burdynska et al. | |
| 2022/0021079 A1 | 1/2022 | Villaluenga et al. | |
| 2022/0077493 A1 | 3/2022 | Oshima et al. | |
| 2022/0352565 A1 | 11/2022 | Wujcik et al. | |
| 2022/0367861 A1 | 11/2022 | Wujcik et al. | |

FOREIGN PATENT DOCUMENTS

| | | |
|---|---|---|
| CN | 111384456 A | 7/2020 |
| EP | 3 407 412 | 4/2021 |
| JP | 2003508886 A | 3/2003 |
| JP | 2010/106252 A | 5/2010 |
| JP | 2010186682 | 8/2010 |
| JP | 2013033659 | 2/2013 |
| JP | 2015191866 A | 11/2015 |
| JP | 2018521173 A | 8/2018 |
| JP | 2020068170 A | 4/2020 |
| TW | 200400281 A | 1/2004 |
| WO | WO2016/017525 A1 | 2/2016 |
| WO | WO-2016129427 A1 | 8/2016 |
| WO | WO-2017027395 A1 | 2/2017 |
| WO | WO2018/023079 | 2/2018 |
| WO | WO 2018/151161 A1 | 8/2018 |
| WO | WO-2019119779 A1 | 6/2019 |
| WO | WO 2020/252427 | 12/2020 |

(56) References Cited

FOREIGN PATENT DOCUMENTS

| | | |
|---|---|---|
| WO | WO-2021183858 A1 | 9/2021 |
| WO | WO-2022016194 A1 | 1/2022 |

OTHER PUBLICATIONS

Villaluenga, et al., "Compliant glass-polymer hybrid single ion-conducting electrolytes for lithium batteries," PNAS Early Edition, 2015, pp. 1-6.

Inada, et al., "Fabrications and properties of composite solid-state electrolytes," Solid State Ionics, vol. 158, 2003, pp. 275-280.

Inada, et al., "Silicone as a binder in composite electrolytes," Journal of Power Sources, vol. 119-121, 2003, pp. 948-950.

Skaarup, et al., "Mixed phase solid electrolytes with nonconducting polymer binder," Solid State Ionics, vol. 40/41, 1990, pp. 1021-1024.

Dey, A., et al., "Micro-Structural Effect on Hydroxy Terminated Poly Butadiene (HTPB) Prepolymer and HTPB Based Composite Propellant," Molecular Nanotechnology & Nanomedicine, vol. 1, Issue 1, 2017, pp. 1-7.

Manjari, R., et al., "Structure-Property Relationship of HTPB-Based Propellants. II Formulation Tailoring for Better Mechanical Properties," Journal of Applied Polymer Science, vol. 48, 1993, 279-289.

Naim, K., et al., "Polymer-Ceramic Ion-Conducting Composites," Solid State Ionics, 86-88, 1996, pp. 589-593.

Santoro, M., et al., "High-Pressure Synthesis of a Polyethylene/zeolite Nano-Composite Material," Nature Communications, Published Mar. 5, 2013, 7 pages.

Sasuga, et al., "Liquid-Liquid Transition and Radiation-Induced Polymerization of Vinyl Acetate at High Pressure," Macromolecules, 1983, vol. 16, No. 4, pp. 545-548.

Hu, Qichao, "Electrode-Electrolyte Interfaces in Solid Polymer Lithium Batteries," Submitted to Harvard School of Engineering and Applied Sciences, May 1, 2012, 131 pages.

MacFarlane, D. R., et al., "Lithium-ion conducting ceramic/polyether composites," Electrochimica Acta, vol. 43, Nos. 10-11, pp. 1333-1337, 1998.

Notice of Allowance dated Aug. 23, 2017, in U.S. Appl. No. 15/607,328.

Notice of Allowance dated Feb. 16, 2018, in U.S. Appl. No. 15/607,328.

Office Action dated Aug. 25, 2017, in U.S. Appl. No. 15/607,336.

Notice of Allowance dated Jan. 4, 2018, in U.S. Appl. No. 15/607,336.

Office Action dated Nov. 28, 2017, in U.S. Appl. No. 15/662,102.

Notice of Allowance dated Jul. 19, 2018, in U.S. Appl. No. 15/662,102.

Office Action dated Sep. 18, 2017, in U.S. Appl. No. 15/662,116.

Notice of Allowance dated Jan. 22, 2018, in U.S. Appl. No. 15/662,116.

Office Action dated Aug. 27, 2018, in U.S. Appl. No. 15/936,221.

Notice of Allowance dated Nov. 9, 2018, in U.S. Appl. No. 15/936,221.

Notice of Allowance (corrected) dated Dec. 5, 2018, in U.S. Appl. No. 15/936,221.

Invitation to Pay additional Fees dated Oct. 2, 2017, issued in Application No. PCT/US17/44530.

International Search Report and Written Opinion dated Dec. 12, 2017 issued in Application No. PCT/US17/44530.

International Search Report and Written Opinion dated May 15, 2018 issued in Application No. PCT/US18/20780.

U.S. Appl. No. 16/240,257 filed Jan. 4, 2019, Burdynska et al.

Office Action dated May 29, 2019, in U.S. Appl. No. 15/936,221.

Notice of Allowance dated Sep. 5, 2019, in U.S. Appl. No. 16/240,257.

International Preliminary Report on Patentability dated Sep. 12, 2019 issued in PCT/US2018/020780.

Extended European Search Report dated Feb. 25, 2020 issued in Application No. 17835391.8.

International Search Report and Written Opinion dated Mar. 24, 2020 issued in PCT/US2020/012409.

U.S. Appl. No. 16/814,756, filed Mar. 10, 2020, Villaluenga et al.

U.S. Appl. No. 16/946,974, filed Jul. 14, 2020, Teran et al.

Chilaka et al., "Solid-state poly(ethylene glycol)polyurethane/polymethylmethacrylate/rutile Ti02 nanofiber composite electrolyte-correlation between morphology and conducting properties", Electrochimica Acta, vol. 62, Feb. 1, 2012 (Feb. 1, 2012), pp. 362-371, XP055127951, ISSN: 0013-4686, DOI: 10.1016/j.electacta.2011.12.052.

Shah et al., "Polymer Nanocomposites as Solid Electrolytes: Evaluating Ion-Polymer and PolymerNanoparticle Interactions in PEG-PU/PAN Semi-IPNs and Titania Systems", Journal of Physical Chemistry C, vol. 114, No. 33, Aug. 26, 2010 (Aug. 26, 2010), pp. 14281-14289, XP055127969, ISSN: 1932-7447, DOI: 10.1021/jp105450q.

Office Action dated Jan. 13, 2021 in U.S. Appl. No. 16/814,756.

Extended European Search Report and Opinion dated Nov. 12, 2020 issued in Application No. 17835391.8.

Chinese Office Action dated Feb. 7, 2021 issued in Application No. 201880026321.5.

Nasef et al. "Preparation of polymer electrolyte membranes for lithium batteries by radiationinduced graft copolymerization" Solid State Ionics. 2004, vol. 171, p. 243-249; p. 243, abstract, p. 244, left col, para 1.

International Search Report and Written Opinion dated Mar. 17, 2021 issued in Application No. PCT/US2020/066180.

Office Action dated Feb. 16, 2021 in U.S. Appl. No. 17/129,290.

U.S. Appl. No. 17/129,277, filed Dec. 21, 2020, Burdynska et al.

U.S. Appl. No. 17/129,290, filed Dec. 21, 2020, Burdynska et al.

Chinese Office Action dated Sep. 3, 2021 issued in Application No. 201780054522.1.

CN Office Action dated Oct. 18, 2021, in CN Application No. CN201880026321.5 with English translation.

International Search Report and Written Opinion dated Jun. 29, 2021 issued in PCT/US2021/025663.

Knauth, P. et al., "Inorganic Solid Li Ion Conductors: An Overview", Solid State Ionics, 2009, vol. 180, pp. 911-916.

Knauth, Solid State Ionics 180 (2009) 911-916 https://www.sciencedirect.com/science/article/abs/pii/S0167273809001179.

Minafra et al., J. Mater. Chem. A, 2018, vol. 6, pp. 645-651 https://pubs.rsc.org/en/content/articlelanding/2017/ta/c7ta08581h/unauth#!divAbstract.

Minafra, N. et al., "Effect of Si Substitution on the Structural and Transport Properties of Superionic Li-argyrodites" Journal of Materials Chemistry A, 2018, vol. 6, pp. 645-651.

Minami, J. Non-Cryst. Solids, vol. 95-96 (1987) 107-118 https://www.sciencedirect.com/science/article/abs/pii/S0022309387801035?via%3Dihub.

Minami, T. et al., "Recent Progress in Superionic Conducting Glasses", Journal of Non Crystalline Solids, 1987, vol. 95 &96, pp. 107-118.

Office Action dated Aug. 13, 2021 in U.S. Appl. No. 16/814,756.

Office Action dated Sep. 16, 2021 issued in U.S. Appl. No. 16/946,974.

Ribes et al., J. Non-Cryst. Solids, vol. 38-39 (1980) 271-276 https://www.sciencedirect.com/science/article/abs/pii/0022309380904305.

Ribes, M. et al., "Sulfide Glasses: Glass Forming Region, Structure and Ionic Conduction of Glasses in Na2S—XS2 (X—Si; Ge), Na2S—P2S5 and Li2S—GeS2 Systems", Journal of NonCrystalline Solids, vol. 38 & 39, 1980, pp. 271-276.

Tatsumisago et al., J. Power Sources 2014, 270, 603-607 https://www.sciencedirect.com/science/article/abs/pii/S0378775314011057.

Tatsumisago, M. et al., "Preparation of Li3BO3—Li2SO4 Glass-ceramic Electrolytes for Alloxide Lithium Batteries", Journal of Power Sources, vol. 270, 2014, pp. 603-607.

U.S. Final Office Action dated Nov. 5, 2021 in U.S. Appl. No. 17/129,277.

U.S. Non-Final Office Action dated Apr. 28, 2021 in U.S. Appl. No. 17/129,277.

(56) References Cited

OTHER PUBLICATIONS

Zhang et al., J. Mater. Chem. A, 2019, vol. 7, pp. 2717-2722 https://pubs.rsc.org/ko/content/articlelanding/2019/ta/c8ta10790d/unauth#!divAbstract.
Zhang, Z. et al., "Design and Synthesis of Room Temperature Stable Li-argyrodite Superionic Conductors via Cation Doping", Journal of Materials Chemistry A, 2019, vol. 7, pp. 2717-2722.
Zhao, Y. et al., "Superionic Conductivity in Lithium-rich Antiperovskites", Journal of the American Chemical Society, 2012, vol. 134, pp. 15042-15047.
Office Action dated Apr. 28, 2021 in U.S. Appl. No. 17/129,27.
Final Office Action dated Jul. 12, 2021 in U.S. Appl. No. 17/129,290.
Preliminary Amendment dated Sep. 24, 2020 for U.S. Appl. No. 16/946,974.
Xu et al., A thermally healable po yhedral oligomeric silsesquioxane (POSS) nanocomposite based on Diels-Alder chemistry, Chem. Commun. 2013,49, 6755-6757.
Cao et al., "Recent Advances in inorganic solid electrolytes for lithium batteries," Frontiers in Energy Research, Review Article, vol. 2, Article 25, 2014, 1-10.
Kong et al., "Li6PO5Br and Li6PO5Cl: The first Lithium-Oxide-Argyrodites," Wiley-VCH Verlag GmbH & Co. KGaA, Weinheim, Z. Anorg. Allg. Chem. 2010, 636, 1920-1924.
Zhou et al., "New Family of Argyrodite Thioantimonate Lithium Superionic Conductors," J. Am. Chem. Soc., 2019, vol. 141, pp. 19002-19013 https://www.osti.gov/biblio/1606830-new-family-argyrodite-thioantimonate-lithium-superionic-conductors.
Nilges and Pfitzner, Z. Kristallogr., "A Structural Differentiation of quaternary copper argyrodites: Structure—property relations of high temperature ion conductors," 2005, vol. 220, pp. 281-294 https://epub.uniregensburg.de/11740/1/87_A%20structural%20differentiation%20of%20quaternary%20copper%20argyrodites%20Structure%20-%20property%20relations%20of%20high%20temperature%20ion%20conductors.pdf).
U.S. Appl. No. 17/301,457, filed Apr. 2, 2021, Villaluenga et al.
U.S. Appl. No. 17/304,645, filed Jun. 23, 2021, Villaluenga et al.
U.S. Appl. No. 17/304,646, filed Jun. 23, 2021, Burdynska et al.
Baoyun, L., "Molecular Weight, Molecular Weight Distribution and Bonding Strength of Adhesive", Organic Chemicals Engineering Technology, May 1982, vol. 1, No. 2, pp. 18-25.
CN Office Action dated May 23, 2022, in Application No. CN201780054522.1 with English translation.
JP Office Action dated Feb. 1, 2022, in Application No. JP2019-547367.
Manjun, H. et al., "High Polymer Physics", Fudan University Press, Oct. 1990, 182 pages.
Patent Search Report 'Uncycled Solid-State Lithium-Ion Battery Cell' dated Feb. 22, 2022, Cardinal IP Services.
Snyder. L.R., "Classification of the Solvent Properties of Common Liquids", Journal of Chromatography, 92, 1978, pp. 223-234.
U.S. Corrected Notice of Allowance dated May 10, 2022 in U.S. Appl. No. 16/946,974.
U.S. Non Final office action dated Apr. 1, 2022, in U.S. Appl. No. 17/129,290.
U.S. Non-Final office Action dated Jun. 14, 2022 in U.S. Appl. No. 17/129,290.
U.S. Non-Final Office Action dated May 12, 2022 in U.S. Appl. No. 17/129,277.
U.S. Notice of Allowance dated Feb. 1, 2022 in U.S. Appl. No. 16/946,974.
U.S. Notice of Allowance dated Mar. 15, 2022, in U.S. Appl. No. 16/814,756.
U.S. Appl. No. 17/661,898, inventors Teran et al., filed May 3, 2022.
U.S. Appl. No. 17/735,954, filed May 3, 2022.
U.S. Appl. No. 17/735,961, inventors Wujcik et al., filed May 3, 2022.
U.S. Requirement for Restriction dated Feb. 24, 2022 in U.S. Appl. No. 17/129,277.
U.S. Restriction Requirement dated Mar. 14, 2022, in U.S. Appl. No. 16/714,555.
CN Office Action dated Jun. 29, 2022, in CN Application No. CN201880026321.5 with English translation.
Doux, J. et al., "Pressure Effects on Sulfide Electrolytes for All Solid-state Batteries", Journal of Materials Chemistry A, 2020, vol. 8, pp. 5049-5055.
International Preliminary Report on Patentability dated Jun. 30, 2022, in PCT Application No. PCT/US2020/066180.
International Preliminary Report on Patentability dated Jun. 30, 2022, in PCT Application No. PCT/US2020/066189.
JP Office Action dated Aug. 30, 2022 in Application No. JP20190547367.
U.S. Non-Final office Action dated Aug. 4, 2022 in U.S. Appl. No. 17/735,954.
U.S. Non-Final office Action dated Aug. 30, 2022 in U.S. Appl. No. 17/304,645.
U.S. Appl. No. 17/808,295, inventors Villaluenga et al., filed Jun. 22, 2022.
Wang, M.J. et al., "Characterizing the Li-Solid-Electrolyte Interface Dynamics as a Function of Stack Pressure and Current Density", Joule, Sep. 18, 2019, vol. 3, pp. 2165-2178.
Yu. C, et al., "Revealing the relation between the structure, Li-ion conductivity and solid-state battery performance of the argyrodite Li6PS5Br solid electrolyte", Journal of Materials Chemistry A, 2017, vol. 5, pp. 21178-81188.
Zhang. J, et al., "All-solid-state batteries with slurry coated LiNi0.8Co0.1 Mn0.1 02 composite cathode and Li6PS5Cl electrolyte: Effect of content", Journal of Power Sources 391, 2018 pp. 73-79.
U.S. Non-Final office Action dated Oct. 19, 2022 in U.S. Appl. No. 16/714,555.
U.S. Notice of Allowance dated Sep. 30, 2022 in U.S. Appl. No. 17/129,277.
U.S. Non-Final Office Action dated Dec. 21, 2022 in U.S. Appl. No. 17/304,646.
U.S. Notice of Allowance dated Oct. 7, 2022 in U.S. Appl. No. 17/129,277.

* cited by examiner

Poly(ureaurethane)

Poly(urethane)

Poly(thiourethane)

R = H, alkyl or aryl

R₁ = H, alkyl, aryl, linkers

∿ Backbone

Polyolefin

R = H, alkyl or aryl

R₂ = H, alkyl, aryl

POLYURETHANE HYBRID SOLID ION-CONDUCTIVE COMPOSITIONS

FIELD OF INVENTION

The invention relates generally to the field of solid-state alkali-ion and alkali metal batteries. More particularly, it relates to ionically conductive composite materials and battery components, such as electrolytes and electrodes, that incorporate the ionically conductive composite materials.

BACKGROUND

Solid-state electrolytes present various advantages over liquid electrolytes for primary and secondary batteries. For example, in lithium ion secondary batteries, inorganic solid-state electrolytes may be less flammable than conventional liquid organic electrolytes. Solid-state electrolytes can also faciliate the use of a lithium metal electrode by resisting dendrite formation. Solid-state electrolytes may also present advantages of high energy densities, good cycling stabilities, and electrochemical stabilities over a range of conditions. However, there are various challenges in large scale commercialization of solid-state electrolytes. One challenge is maintaining contact between electrolyte and the electrodes. For example, while inorganic materials such as sulfide glasses and ceramics have high ionic conductivities (over $10^{-4}$ S/cm) at room temperature, they do not serve as effective electrolytes due to poor adhesion to the electrode during battery cycling. Another challenge is that glass and ceramic solid-state conductors are too brittle to be processed into dense, thin films. This can result in high bulk electrolyte resistance due to the films being too thick, as well as dendrite formation, due to the presence of voids that allow dendrite penetration. The mechanical properties of even relatively ductile sulfide glasses are not adequate to process the glasses into dense, thin films. Improving these mechanical properties without sacrificing ionic conductivity is a particular challenge, as techniques to improve adhesion, such as the addition of a solid polymer binder, tend to reduce ionic conductivity. It is not uncommon to observe more than an order of magnitude conductivity decrease with as little as 1 wt % of binder introduced. Solid-state polymer electrolyte systems may have improved mechanical characteristics that faciliate adhesion and formation into thin films, but have low ionic conductivity at room temperature.

Materials that have high ionic conductivities at room temperature and that are sufficiently compliant to be processed into thin, dense films without sacrificing ionic conductivity are needed for large scale production and commercialization of solid-state batteries.

SUMMARY

One aspect of the disclosure relates to a solid-state electrolyte composition including ionically conductive inorganic particles in a non-ionically conductive organic phase, wherein the non-ionically conductive organic phase has a hard phase content of between about 5% and 50% and includes one or more of a cross-linked polyurethane network, a cross-linked poly(urea-urethane) network, and a cross-linked polythiourethane network. In some embodiments, the hard phase content is between about 10% and 30% and in some embodiments, the hard phase content is between about 20% and 30%.

In some embodiments, the one or more of a cross-linked polyurethane network, a cross-linked poly(urea-urethane) network, and a cross-linked polythiourethane network includes a non-polar backbone. In some embodiments, the one or more of a cross-linked polyurethane network, a cross-linked poly(urea-urethane) network, and a cross-linked polythiourethane network includes a low-polar backbone. In some embodiments, the one or more of a cross-linked polyurethane network, a cross-linked poly(urea-urethane) network, and a cross-linked polythiourethane network includes a hydrogenated polyolefin backbone.

In some embodiments, the hard phase includes a chain extender selected from: ethylene glycol, propylene glycol, triethylene glycol, tetraethylene glycol, propylene glycol, dipropylene glycol, 1,3-propanediol, 1,3-butanediol, 1,4-butanediol, neopentyl glycol, 1,6-hexanediol, 1,12-dodecanediol, 1,4-cyclohexanedimethanol, 2-butyl-2-ethyl-1,3-propanediol, 2-ethyl-1,3-hexanediol (EHD), 1,4-bis(2-hydroxyethoxy)benzene, ethanolamine, diethanolamine, methyldiethanolamine, 1,12-diaminododecane, phenyldiethanolamine, 4,4'-ethylene dianiline, dimethylthiotoluenediamine, diethyl toluene diamine, 4,4'-methylene-bis-2,6-diethyl aniline, and m-xylene diamine.

In some embodiments, the hard phase includes a cross-linker selected from: glycerol, trimethylolpropane, 1,2,6-hexanetriol, diethylenetriamine, triethanolamine, tetraerythritol, pentaerythriol, N,N-bis(2-hydroxypropyl)aniline, triisopropanolamine (TIPA), and N,N,N'N"-tetrakis(2-hydroxypropyl)ethylenediamine.

In some embodiments, the composition is a substantially uniform film. In some embodiments, the composition is a substantially free-standing film.

In some embodiments, the organic phase includes a polymer binder. ISSE, the polymer binder is between 10% and 50% by weight of the organic phase. In some embodiments, the organic phase is free of a polymer binder. In some embodiments, the organic phase is 2.5%-60% by weight of the composition. In some embodiments, the organic phase is at least 20% by weight of the composition.

In some embodiments, the ionically conductive inorganic particles are sulfides. In some embodiments, the cross-linked polyurethane network, the cross-linked poly(urea-urethane) network, or the cross-linked polythiourethane network is polymerized in-situ.

In some embodiments, the cross-linked polyurethane network, the cross-linked poly(urea-urethane) network, or the cross-linked polythiourethane includes a backbone selected from a polyolefin, a polysiloxane, a polystyrene, and a cyclic olefin polymer. In some embodiments, the cross-linked polyurethane network, the cross-linked poly(urea-urethane) network, or the cross-linked polythiourethane includes a polydimethylsiloxane (PDMS) backbone. In some embodiments, the cross-linked polyurethane network, the cross-linked poly(urea-urethane) network, or the cross-linked polythiourethane includes a polybutadiene (PBD) backbone.

In some embodiments, the cross-linked polyurethane network, the cross-linked poly(urea-urethane) network, or the cross-linked polythiourethane includes one or more of:
1) —CH2CH(H/CH3)(R) where R=—C(O)—O—, —C(O)—NR—, —C6H4—, or

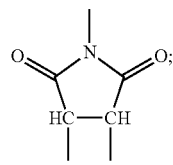

2) —NH—C(O)—NR—, where R is H, alkyl or aryl;
3) —NH—C(O)—O—; and
4) —NH—C(O)—S—.

In some embodiments, the organic phase does not include an added salt. In some embodiments, the organic phase includes a blocking agent. In some embodiments, the average particle size of inorganic ionically conductive particles is less than 20 μm.

In some embodiments, the average particle size inorganic ionically conductive particles is less than 7 μm. In some embodiments, the inorganic ionically conductive particles have a multi-modal size distribution having a first size distribution with an average size of less than 7 μm and a second size of greater than 10 μm.

Another aspect of the disclosure relates to a battery having improved safety. The battery includes an anode, a cathode; and a solid-state electrolyte. In some embodiments, the including ionically conductive inorganic particles in a non-ionically conductive organic phase, wherein the non-ionically conductive organic phase has a hard phase content of between about 5% and 50% and includes one or more of a cross-linked polyurethane network, a cross-linked poly (urea-urethane) network, and a cross-linked polythiourethane network.

Another aspect of the disclosure relates to a method including polymerizing diols to form oligomers, wherein the oligomers have a molecular weight of between about 5 and 30 kDaltons; mixing the oligomers with blocked isocyanates and ionically conductive inorganic particles to form a mixture; and polymerizing the oligomers while applying a pressure of at least 10 MPa to the mixture to form a composite including the ionically conductive inorganic particles in a polyurethane matrix. In some embodiments, the oligomers are polymerized at a temperature of at least 140° C.

Another aspect of the disclosure relates to a solid-state electrolyte composition including: ionically conductive inorganic particles embedded in an organic phase, wherein the organic phase includes a polymer binder and a cross-linked polymer network, wherein the polymer binder is a polymer having a number average molecular weight of at least 30 kg/mol and wherein the polymer binder constitutes at least 90% by weight of the organic phase.

In some embodiments, the cross-linked polymer network includes one or more of a cross-linked polyurethane network, a cross-linked poly(urea-urethane) network, and a cross-linked polythiourethane network. In some embodiments, the composition further includes a blocking agent.

DETAILED DESCRIPTION

Figure 1A:
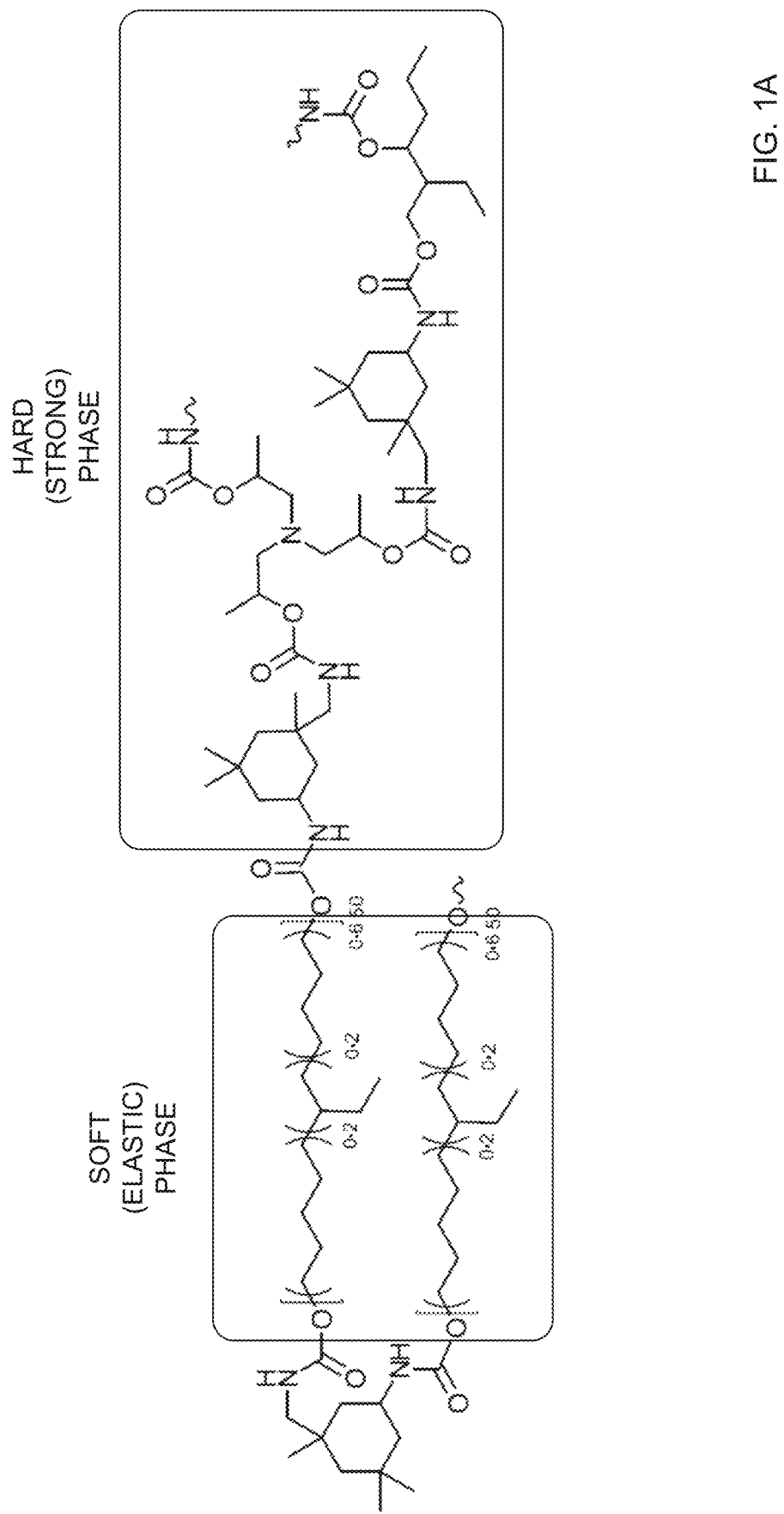
FIG. 1A shows an example of an organic phase that includes a soft phase and a hard phase, the soft phase being a hydrogenated polybutadiene and the hard phase including urethane groups.

Particular embodiments of the subject matter described herein may have the following advantages. In some embodiments, the ionically conductive solid-state compositions may be processed to a variety of shapes with easily scaled-up manufacturing techniques. The manufactured composites are compliant, allowing good adhesion to other components of a battery or other device. The solid-state compositions have high ionic conductivity, allowing the compositions to be used as electrolytes or electrode materials. In some embodiments, ionically conductive solid-state compositions enable the use of lithium metal anodes by resisting dendrites. In some embodiments, the ionically conductive solid-state compositions do not dissolve polysulfides and enable the use of sulfur cathodes.

Liquid electrolytes typically used in lithium ion cells are volatile and flammable at high temperatures. For instance, 1,3-dioxolane (DOL) and dimethoxyethane (DME), two common liquid electrolyte components, have boiling points of 75° C. and 85° C., respectively. The composite electrolytes described here are solid and do not contain chemicals that are incompatible with each other at high temperatures.

Further details of the ionically conductive solid-state compositions, solid-state electrolytes, electrodes, and batteries according to embodiments of the present invention are described below.

The ionically conductive solid-state compositions may be referred to as hybrid compositions herein. The term "hybrid" is used herein to describe a composite material including an inorganic phase and an organic phase. The term "composite" is used herein to describe a composite of an inorganic material and an organic material.

In some embodiments, the composite materials are formed from a precursor that is polymerized fully or partially in-situ after being mixed with inorganic particles. The polymerization may take place under applied pressure that facilitates particle-to-particle contact. Once polymerized, applied pressure may be released, with the particles immobilized by the polymer matrix. In some implementations, the organic material includes a cross-linked polymer network. This network may constrain the inorganic particles and prevents them from shifting during operation of a battery or other device that incorporates the composite.

The resulting composite has high conductivity values close to the conductivity of the pristine solid-state ion conducting particles. The result is highly conducting, dense, and compliant material which can be easily processed to desired shapes. "Pristine" refers to the particles prior to incorporation into the composite. According to various embodiments, the material has at least half, at least 80%, or at least 90% of the ionic conductivity of the particles. In some embodiments, the material has at least 10% of the ionic conductivity of the particles. In some embodiments, the material has at least 20% of the ionic conductivity of the particles.

In some embodiments, the polymerization may facilitate particle-to-particle contact without applied external pressure. For example, certain polymerization reactions that include cross-linking may lead to sufficient contraction that particle-to-particle contact and high conductivity is achieved without applied pressure during the polymerization.

The polymer precursor and the polymer matrix are compatible with the solid-state ionically conductive particles, non-volatile, and non-reactive to battery components such as electrodes. The polymer precursor and the polymer matrix may be further characterized by being non-polar or having low-polarity. In some embodiments, non-polar components are characterized by having a dielectric constant of less than 3 at all frequencies and low-polar components are characterized by having a dielectric constant between 3 and 5 at low frequency (60 Hz) and room temperature. In the description herein, polarity of a functionalized polymer component is determined by its backbone. For example, a non-polar polymer may have a non-polar linear polydimethylsiloxane (PDMS) backbone that is functionalized with polar end groups.

The polymer precursor and the polymer matrix may interact with the inorganic phase such that the components mix substantially uniformly and microscopically well, without affecting at least the composition of the bulk of the inorganic phase. Interactions can include one or both of physical interactions or chemical interactions. Examples of physical interactions include hydrogen bonds, van der Waals bonds, electrostatic interactions, and ionic bonds. Chemical interactions refer to covalent bonds. A polymer matrix that is generally non-reactive to the inorganic phase may still form bonds with the surface of the particles, but does not degrade or change the bulk composition of the inorganic phase. In some embodiments, the polymer matrix may mechanically interact with the inorganic phase.

Also provided herein are processing methods that may be implemented at industrial scale. In some embodiments, the methods involve application of heat and pressure to cure the composite films without deformation or dislocation of the organic phase of the composite films.

The term "number average molecular weight" or "Mn" in reference to a particular component (e.g., a high molecular weight polymer binder) of a solid-state composition refers to the statistical average molecular weight of all molecules of the component expressed in units of g/mol. The number average molecular weight may be determined by techniques known in the art such as, for example, gel permeation chromatography (wherein Mn can be calculated based on known standards based on an online detection system such as a refractive index, ultraviolet, or other detector), viscometry, mass spectrometry, or colligative methods (e.g., vapor pressure osmometry, end-group determination, or proton NMR). The number average molecular weight is defined by the equation below, $$M_n = \frac{\Sigma N_i M_i}{\Sigma N_i}$$

wherein Mi is the molecular weight of a molecule and Ni is the number of molecules of that molecular weight.

The term "weight average molecular weight" or "Mw" in reference to a particular component (e.g., a high molecular weight polymer binder) of a solid-state composition refers to the statistical average molecular weight of all molecules of the component taking into account the weight of each molecule in determining its contribution to the molecular weight average, expressed in units of g/mol. The higher the molecular weight of a given molecule, the more that molecule will contribute to the Mw value. The weight average molecular weight may be calculated by techniques known in the art which are sensitive to molecular size such as, for example, static light scattering, small angle neutron scattering, X-ray scattering, and sedimentation velocity. The weight average molecular weight is defined by the equation below, $$M_w = \frac{\Sigma N_i M_i^2}{\Sigma N_i M_i}$$

wherein 'Mi' is the molecular weight of a molecule and 'Ni' is the number of molecules of that molecular weight. In the description below, references to molecular weights of particular polymers refer to number average molecular weight.

The term "alkyl" as used herein alone or as part of another group, refers to a straight or branched chain hydrocarbon containing any number of carbon atoms and that include no double or triple bonds in the main chain. "Lower alkyl" as used herein, is a subset of alkyl and refers to a straight or branched chain hydrocarbon group containing from 1 to 4 carbon atoms. The terms "alkyl" and "lower alkyl" include both substituted and unsubstituted alkyl or lower alkyl unless otherwise indicated. Examples of lower alkyl include methyl, ethyl, n-propyl, iso-propyl, n-butyl, iso-butyl, tert-butyl, and the like.

The term "aryl" as used herein refers to groups that include monocyclic and bicyclic aromatic groups. Examples include phenyl groups.

Inorganic Phase

The inorganic phase of the composite materials described herein conducts alkali ions. In some embodiments, it is responsible for all of the ion conductivity of the composite material, providing ionically conductive pathways through the composite material.

In some embodiments, the inorganic phase is a particulate solid-state material that conducts alkali ions. In the examples given below, lithium ion conducting materials are chiefly described, though sodium ion conducting or other alkali ion conducting materials may be employed. According to various embodiments, the materials may be glass particles, ceramic particles, or glass ceramic particles. The solid-state compositions described herein are not limited to a particular type of compound but may employ any solid-state inorganic ionically conductive particulate material, examples of which are given below.

In some embodiments, the inorganic material is a single ion conductor, which has a transference number close to unity. The transference number of an ion in an electrolyte is the fraction of total current carried in the electrolyte for the ion. Single-ion conductors have a transference number close to unity. According to various embodiments, the transference number of the inorganic phase of the solid electrolyte is at least 0.9 (for example, 0.99).

The inorganic phase may be an oxide-based composition, a sulfide-based composition, or a phosphate-based composition, and may be crystalline, partially crystalline, or amorphous. In certain embodiments, the inorganic phase may be doped to increase conductivity. Examples of solid lithium ion conducting materials include perovskites (e.g., Li3xLa(2/3)-xTiO3, 0≤x≤0.67), lithium super ionic conductor (LISICON) compounds (e.g., Li2+2xZn1−xGeO4, 0≤x≤1; Li14ZnGe4O16), thio-LISICON compounds (e.g., Li4−xA1−yByS4, A is Si, Ge or Sn, B is P, Al, Zn, Ga; Li10SnP2S12), garnets (e.g. Li7La3Zr2O12, Li5La3M2O12, M is Ta or Nb); NASICON-type Li ion conductors (e.g., Li1.3Al0.3Ti1.7(PO4)3), oxide glasses or glass ceramics (e.g., Li3BO3Li2SO4, Li2O—P2O5, Li2O—SiO2), agyrodites (e.g. Li6PS5X where X=Cl, Br, I), sulfide glasses or glass ceramics (e.g., 75Li2S—25P2S5, Li2S—SiS2, Li1—Li2S—B2S3) and phosphates (e.g., Li1−xAlxGe2−x(PO4)3 (LAGP), Li1+xTi2−xAlx(PO4)). Further examples include lithium rich anti-perovskite (LiRAP) particles. As described in Zhao and Daement, Jour J. Am. Chem. Soc., 2012, 134 (36), pp 15042-15047, incorporated by reference herein, these LiRAP particles have an ionic conductivity of greater than 10-3 S/cm at room temperature.

Examples of solid lithium ion conducting materials include sodium super ionic conductor (NASICON) compounds (e.g., Na1+xZr2SixP3−xO12, 0<x<3). Further examples of solid lithium ion conducting materials may be found in Cao et al., Front. Energy Res. (2014) 2:25 and Knauth, Solid State Ionics 180 (2009) 911-916, both of which are incorporated by reference herein.

Further examples of ion conducting glasses are disclosed in Ribes et al., J. Non-Cryst. Solids, Vol. 38-39 (1980) 271-276 and Minami, J. Non-Cryst. Solids, Vol. 95-96 (1987) 107-118, which are incorporated by reference herein.

In some embodiments, the inorganic phase includes lithium sulfide argyrodites or lithium oxide argyrodites as described in U.S. Provisional Patent Application Nos. 62/733,501, filed Sep. 19, 2018 and 62/744,331, filed Oct. 11, 2018 and incorporated by reference herein.

According to various embodiments, an inorganic phase may include one or more types of inorganic ionically conductive particles. The particle size of the inorganic phase may vary according to the particular application, with an average diameter of the particles of the composition being between 0.1 µm and 500 µm for most applications. In some embodiments, the average diameter is between 0.1 µm and 100 µm. In some embodiments, a multi-modal size distribution may be used to optimize particle packing. For example, a bi-modal distribution may be used. In some embodiments, particles having a size of 1 µm or less are used such that the average nearest particle distance in the composite is no more than 1 µm. This can help prevent dendrite growth. In some embodiments, average particle size is less 10 µm or less than 7 µm. In some embodiments, a multi-modal size distribution having a first size distribution with an average size of less than 7 µm and a second size of greater than 10 µm may be used. As discussed below with respect to Example 13, larger particles lead to membranes with more robust mechanical properties and better conductivities, while smaller particles give more compact, uniform films with lower porosity and better density The inorganic phase may be manufactured by any appropriate method. For example, crystalline materials may be obtained using different synthetic methods such as solution, sol-gel, and solid state reactions. Glass electrolytes may be obtained by quench-melt, solution synthesis or mechanical milling as described in Tatsumisago, M.; Takano, R.; Tadanaga K.; Hayashi, A. J. Power Sources 2014, 270, 603-607, incorporated by reference herein.

As used herein, the term amorphous glass material refers to materials that are at least half amorphous though they may have small regions of crystallinity. For example, an amorphous glass particle may be fully amorphous (100% amorphous), at least 95% (vol). amorphous, at least 80% (vol.) amorphous, or at least 75% (vol.) amorphous. While these amorphous particles may one or more small regions of crystallinity, ion conduction through the particles is through conductive paths that are mostly or wholly isotropic.

Ionically conductive glass-ceramic particles have amorphous regions but are at least half crystalline, for example, having at least 75% (vol.) crystallinity. Glass-ceramic particles may be used in the composites described, herein, with glass-ceramic particles having a relatively high amount of amorphous character (e.g., at least 40 (vol) % amorphous) useful in certain embodiments for their isotropic conductive paths. In some embodiments, ionically conductive ceramic particles may be used. Ionically conductive ceramic particles refers to materials that are mostly crystalline though they may have small amorphous regions. For example, a ceramic particle may be fully crystalline (100% vol. crystalline) or at least 95% (vol). crystalline.

Organic Phase

The organic phase includes a polyurethane matrix. Polyurethanes (including poly(urea-urethanes) and polythiourethanes) are versatile, offering the ability to manipulate their mechanical properties through composition and processing. The materials exhibit an outstanding ability to withstand more loads than rubber due to their hardness and at the same time, they are more flexible than plastics, which accounts for their strength and ability to withstand impact.

The mechanical properties of polyurethanes rely largely on the molecular structure of starting pre-polymers; hence they can be manufactured with a variety of classifications of hardness, ranging from 20 SHORE A to 85 SHORED. By contrast, rubbers are generally within 20 SHORE A to 90 SHORE A; and plastics (e.g., polytetrafluoroethylene (PTFE), polypropylene, polystyrenes, nylons, acetates, acrylics, phenolics) from range from 55 SHORED (50 ROCKWELL R) to 150 ROCKWELL R.

Polyurethanes are also resistant to abrasion and have good flexibility and tear resistance. Their resilience is well-suited for shock-absorbtion applications. The strong bonding properties of polyurethanes lead to better wetting of inorganic particles, hence better dispersibility and mechanical properties of the final product.

The physical properties of polyurethanes described herein come from their segmented nature and phase separation behavior. In particular, in some embodiments, the polymer matrix includes thermodynamically incompatible soft (SS) and hard segments (HS) (also referred to as soft domains and hard domains, respectively) that respectively confer elastomeric and physical-crosslinking behaviors. This leads to microphase separation and formation of domains on 5 nm-100 nm scale.

The hard domains in the organic phase are composed of short urethane blocks that are connected via hydrogen bonding and are responsible for formation of physical cross-links. The soft segments are typically lower polarity polymers, with the hard phase being small molecules, isocyanates, polar chain extenders and cross-linkers. FIG. 1A shows an example of an organic phase that includes a soft phase and a hard phase, the soft phase being a hydrogenated polybutadiene and the hard phase including isocyanate and amine groups. Synthesis of the organic phase shown in FIG. 1A is described further below. According to various embodiments, the amount of hard phase in the organic phase is between 5% and 50%, and may be between 15% and 30% by weight, or between 20% and 30% by weight according to various embodiments. The hard phase content may be calculated by the following:

$$\text{Hard phase content} = \frac{\text{mass of chain extender} + \text{mass of cross-linker} + \text{mass of isocyanate}}{\text{total mass}} \times 100\%$$

Figure 1B:
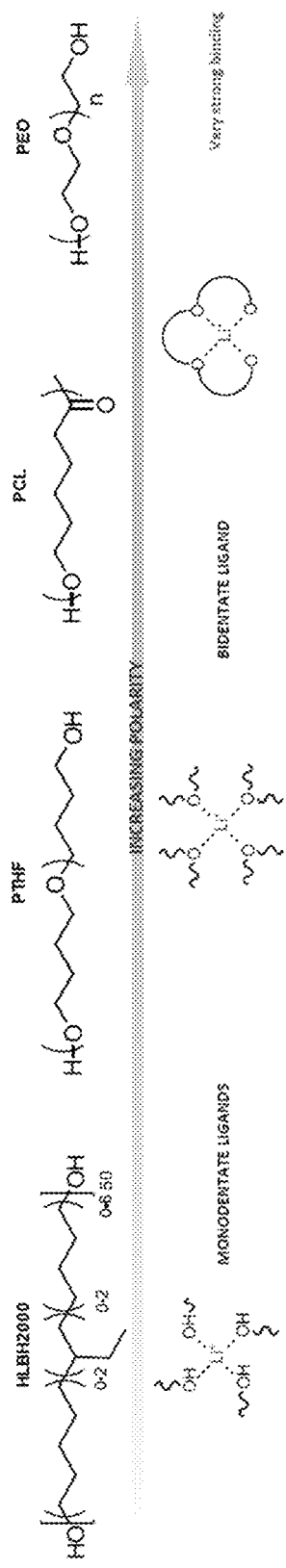
FIG. 1B shows examples of diols in order of increasing ion-coordination properties, including hydrogenated polybutadiene (HLBH), polytetrahydrofuran (PTHF), polycaprolactone (PCL), and polyethylene oxide (PEO) as well as the associated coordination to $Li^+$.

The soft phase may be derived from any appropriate polyol, and may include a non-polar backbone. FIG. 1B shows examples of diols in order of increasing ion-coordination properties, including hydrogenated polybutadiene (HLBH), polytetrahydrofuran (PTHF), polycaprolactone (PCL), and polyethylene oxide (PEO) as well as the associated coordination to $Li^+$. Examples of non-polar and low-polar backbones include polysiloxanes, polyolefins, polystyrene, cyclic olefin polymers (COPs), polyethers such as PTHF, polyesters including esters of fatty acid dimers and polycaprolactones, and polyamides such as polycaprolactam. Non-polar examples include PBD; low polar examples include PCL and PTHF. In some embodiments, the soft phase is derived from a film having polarity of PTHF or less. The hard phase includes the isocyanate groups used to form the polyurethanes, as well as any cross-linkers and chain extenders, as described further below.

In the description herein, polarity of a functionalized polymer component is determined by its backbone. For example, a non-polar polymer may have a non-polar linear polydimethylsiloxane (PDMS) backbone that is functionalized with polar end groups. Examples of low-polar backbones include polysiloxanes, polyolefins, polystyrene, and cyclic olefin polymers (COPs), polyethers such as poly(tetrahydrofuran (PTHF)), polyesters including esters of fatty acid dimers and polycaprolactones, and polyamides such as polycaprolactam.

A COP is a polymer molecule or chain that includes multiple cyclic olefin monomers (e.g., norborene). COPs include cyclic olefin copolymers (COCs), which are produced by copolymerization of a cyclic olefin monomer with a monomer such as ethylene. Polyolefins include one, two, or more different olefin ($C_nH_{2n}$) monomers and only carbon and hydrogen as well as fully or partially saturated derivatives thereof.

Highly polar polymers such as polyvinylacetate and polyethylene oxide (PEO), are not effective polymer backbones as they may interact too strongly with the polar surface of the inorganic phase. Polymers that require highly polar solvents (e.g., polyvinylidene fluoride (PVDF)) may not be appropriate, as such solvents are incompatible with some inorganic particles, such as sulfide glass conductors.

For certain polymer classes such as polyvinyl, polyacrylamide, polyacrylic, and polymaleimide polymers, the polarity is highly dependent on the identity of their constituent monomers. While some such polymers (e.g., polyvinylacetate) may be too polar, it is possible that less polar polymers in these classes (e.g., poly(dodecyl-n-vinyl ether) may be used as backbones. Further, in some embodiments, these polymer classes may be included in a copolymer backbone along with a non-polar or low-polar polymer (e.g., a polyolefin).

In some embodiments, the glass transition temperature of the polymer backbone is relatively low, e.g., less than about −50° C., less than about −70° C., less than about −90° C., or lower. In some embodiments, the polymer is an elastomer.

Specific examples of polymer backbones include PDMS (Tg of −125° C.) and polybutadiene (PBD) ($T_g$ of −90° C. to −111° C.). Further examples include styrene butadiene rubbers (SBRs) ($T_g$ of −55° C.), ethylene propylene rubbers (EPRs) ($T_g$ of −60° C.), and isobutylene-isoprene rubbers (IIRs) ($T_g$ of −69° C.). The glass transition temperatures as provided herein are examples and may vary depending on the particular composition and/or isomeric form of the polymer. For example, the glass transition temperature of PBD can depend on the degree of cis, trans, or vinyl polymerization.

In some embodiments, the organic phase is substantially non-ionically conductive, with examples of non-ionically conductive polymers including PDMS, PBD, and the other polymers described above. Unlike ionically conductive polymers such as PEO, polypropylene oxide (PPO), polyacrylonitrile (PAN), poly(methyl methacrylate) (PMMA), which are ionically conductive because they dissolve or dissociate salts such as LiI, non-ionically conductive polymers are not ionically conductive even in the presence of a salt. This is because without dissolving a salt, there are no mobile ions to conduct in the organic phase.

Figure 1C:
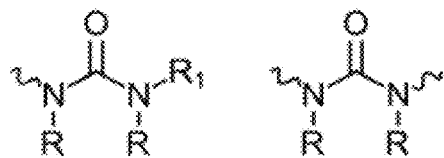
FIG. 1C shows examples of polymers and functional groups that may be in an organic matrix of a composite material according to certain embodiments.
Figure 1C:
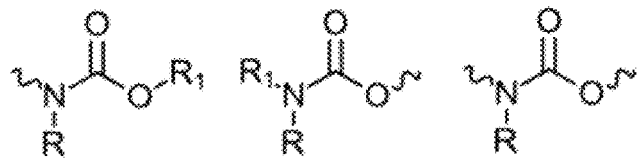
Figure 1C:
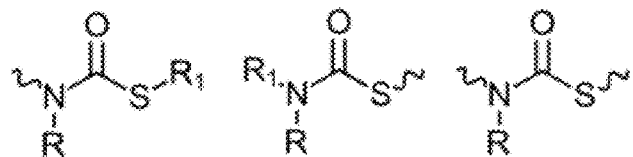
Figure 1C:
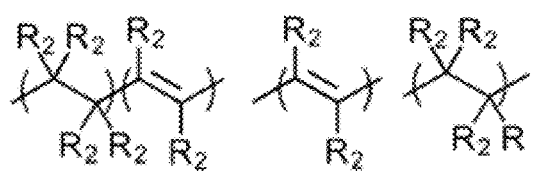
Figure 2:
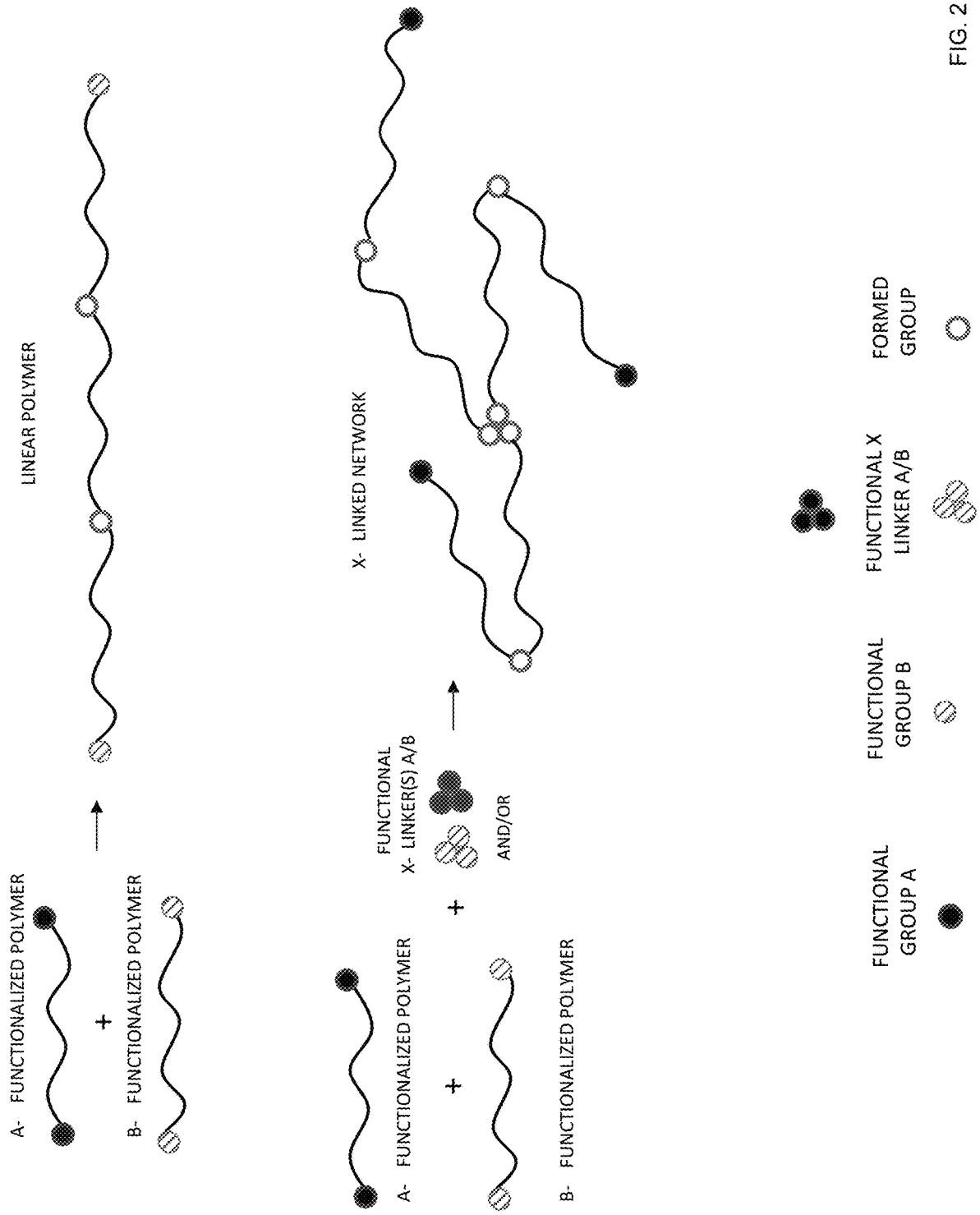
FIG. 2 provides schematic examples of formation of a linear polymer and a cross-linked polymer network by condensation polymerization.

FIG. 2 provides schematic examples of formation of a linear polymer and a cross-linked polymer network by condensation polymerization. The two types of functional groups are labeled "A" and "B". Examples of functional group A include isocyanates and blocked isocyanates. Examples of blocking agents include phenols, oximes, and secondary amines. Examples of functional group B include amines (which form poly(urea-urethanes)), alcohols (which form polyurethanes), and thiols (which form polythiourethanes). As such, the groups formed may be urea-urethanes, urethanes, or thiourethanes. FIG. 1C provides examples of these polymers in an in-situ polymerized polymer matrix as well as examples of polyolefin backbones, which may be fully or partially saturated. While the description herein refers chiefly to polyurethanes, the description herein may be applied to polythiourethanes and polythiourethanes.

Higher molecular weight linear polymers are formed when functionalized polymers of type A and type B are reacted. As also shown in FIG. 2, a cross-linked polymer network may be formed using multi-functional cross-linkers.

The organic matrix may include various signatures indicating that it was formed in-situ by condensation polymerization. These include unreacted functional groups and/or resideal side products, such as blocking agents, as described above and formed urea-urethane, urethane, and thiourethane groups also as described above.

There are several challenges to using condensation polymerization to fabricate the composite materials described herein. First, any byproducts should not react with the inorganic phase of the composite. For example, condensation polymerization between acids or acid halogens and alcohols, amines, or thiols forms water and acid byproducts that may react with sulfide conductors. Condensation polymerization may be performed if the polymerization proceeds with no byproducts or forms only non-reactive byproducts.

Another challenge with condensation polymerization is that, unlike with other polymerizations such as radical polymerization, it is spontaneous. The condensation polymerization reactions proceed with polymer precursors (i.e., monomers, oligomers, or polymers) functionalized with two different types of functional groups that react with each other. As such, for in-situ polymerization, one or both of the functional groups should be blocked. The reaction may then be initiated by unblocking thermally reactive components.

Polycondensation polymerization reactions of isocyanates or blocked isocyanates with alcohols, amines or thiols occur without negative effects on sulfide conductors or other particles. According to various embodiments, polyurethanes, poly(urethane-ureas), and polythiourethanes polymers are formed through polycondensation reactions between components that may be one or more of polymerizable monomers, functional polymers and/or oligomers, and chain extenders and cross-linkers. The reaction typically occurs between isocyanates or blocked isocyanates and one or more second reactive components, such as alcohols, amines or thiols.

Examples of isocyanates include aromatic isocyanates (e.g., diphenylmethane diisocyanate (MDI), p-phenylene diisocyanate (PPDI), toluene diisocyanate (TDI)), naphtalene diisocyanate (NDI), aliphatic isocyanates (e.g., hexamethylene diisocyanate (HDI) and isophorone diisocyanate (IPDI)), and other isocyanate-functionalized polymers, oligomers, and prepolymers including poly(hexamethylene diisocyanate (PHMI) and poly((phenyl isocyanate)-co¬-formaldehyde)) (PPFI).

Blocked isocyanates are typically formed by the reaction of an isocyanate with a compound containing an active hydrogen, including, but not limited to alcohols, phenols, lactams (e.g., ε-caprolactam), oximes (e.g., ketoximine), amides, hydroxylamines, pyrazoles, hydroxypyridines, triazoles, imidazoles, imidazolines, pyrazoles, formate, diacetone, secondary amines (e.g., diisopropyl amine and t-butyl benzyl amine), carbonates (e.g., glycerol 1,2-carbonate), and methylene compounds such as malonic esters. Most blocking agents are released as byproducts during polymerization. However, some blocking agents may be incorporated into the polymer network itself. For example, 1,2-carbonates may be incorporated in the polymer network via ring-opening polymerization. The non-carbonate blocking agents listed above are typically not incorporated into the polymer network.

Examples of chain extenders include glycols, diols, diamines, and hydroxy amines. Specific examples include ethylene glycol, propylene glycol, triethylene glycol, tetraethylene glycol, propylene glycol, dipropylene glycol, 1,3-propanediol, 1,3-butanediol, 1,4-butanediol, neopentyl glycol, 1,6-hexanediol, 1,12-dodecanediol, 1,4-cyclohexanedimethanol, 2-butyl-2-ethyl-1,3-propanediol, 2-ethyl-1,3-hexanediol (EHD), 1,4-bis(2-hydroxyethoxy) benzene, ethanolamine, diethanolamine, methyldiethanolamine, 1,12-diaminododecane, phenyldiethanolamine, 4,4'-ethylene dianiline, dimethylthiotoluenediamine, diethyl toluene diamine, 4,4'-methylene-bis-2,6-diethyl aniline, and m-xylene diamine.

Examples of cross-linkers include isocyanate cross-linkers, multifunctional alcohols, amines, and hydroxy amines. Specific examples include glycerol, trimethylolpropane, 1,2,6-hexanetriol, diethylenetriamine, triethanolamine, tetraerythritol, pentaerythriol, N,N-bis(2-hydroxypropyl)aniline, triisopropanolamine (TIPA) and N,N,N'N''-tetrakis(2-hydroxypropyl)ethylenediamine.

In some embodiments, a mixture of components containing blocked isocyanates undergoes polymerization only at elevated temperatures, as thermal dissociation, and hence release of the blocking agent and reactive isocyanate groups, occurs. The selection of isocyanates and blocking agents may be determined at least in part by related processing considerations. Further discussion and examples of blocking agents is provided below in the discussion of processing.

Processing

The solid-state compositions may be prepared by any appropriate method with example procedures described below with reference to the Experimental results. Substantially uniform films can be prepared by solution processing methods. In one example method, all components are mixed together by using various laboratory and industrial equipment such as sonicators, homogenizers, high-speed mixers, rotary mills, vertical mills, and planetary ball mills. Mixing media can be added to aid homogenization, by improving mixing, breaking up agglomerates and aggregates, thereby eliminating film imperfection such as pin-holes and high surface roughness. The resulting mixture is in a form of uniformly mixed slurry with a viscosity varying based on the hybrid composition and solvent content. The substrate for casting can have different thicknesses and compositions. Examples include aluminum, copper, nickel, Teflon®, and mylar. The casting of the slurry on a selected substrate can be achieved by different industrial methods. In some embodiments, porosity can be reduced by mechanical densification of films (resulting in, for example, up to about 50% thickness change) by methods such as calendaring between rollers, vertical flat pressing, or isostatic pressing. The pressure involved in densification process forces particles to maintain a close inter-particle contact. External pressure, e.g., on the order of 1 MPa to 300 MPa, or 1 MPa to 100 MPa, is applied. In some embodiments, pressures as exerted by a calendar roll are used. The pressure is sufficient to create particle-to-particle contact, though kept low enough to avoid uncured polymer from squeezing out of the composite film. Polymerization, which may include cross-linking, may occur under pressure to form the matrix. In some implementations, a thermal-initiated or photo-initiated polymerization technique is used in which application of thermal energy or ultraviolet light is used to initiate polymerization. The ionically conductive inorganic particles are trapped in the matrix and stay in close contact upon release of external pressure. The composite prepared by either of the above methods (pellets or thin films) may be incorporated to an actual solid-state lithium battery by well-established methods.

In some embodiments, the films are dry-processed rather than processed in solution. For example, the films may be extruded. Extrusion or other dry processing may be alternatives to solution processing especially at higher loadings of the organic phase (e.g., in embodiments in which the organic phase is at least 30 wt %).

Figure 3A:
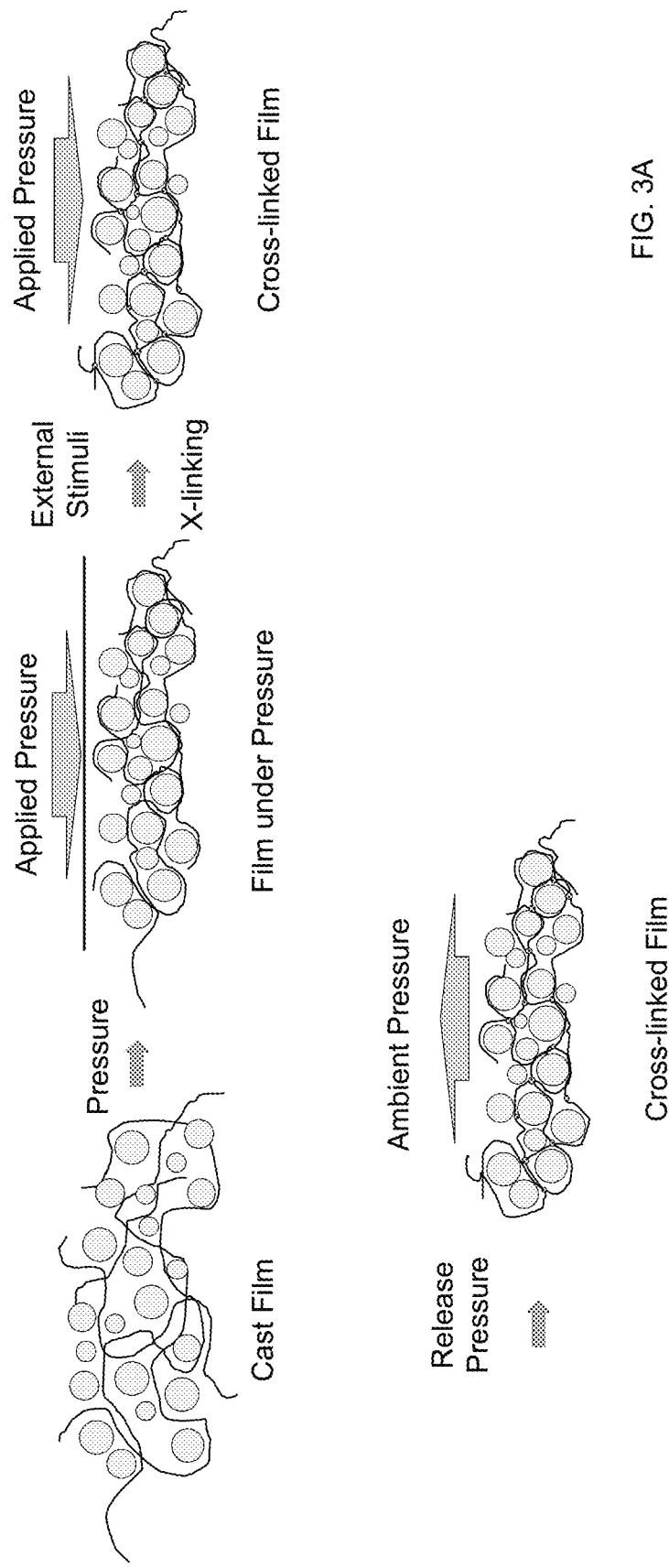
FIG. 3A provides an example of a schematic depiction of a cast film including ionically conductive inorganic particles in a polymer matrix undergoing in-situ polymerization to cross-link the polymer chains under applied pressure.

FIG. 3A provides an example of a schematic depiction of a cast film including ionically conductive inorganic particles in a polymer matrix undergoing in-situ polymerization to cross-link the polymer chains under applied pressure. In the example of FIG. 3A, the cast film is subject to an applied pressure that densifies the film and forces the ionically conductive particles into close contact. An external stimulus is applied to initiate polymerization, which in the example of FIG. 3A, cross-links polymer chains of the polymer matrix to form a polymer network. The pressure is released, with the cross-linked film remaining dense with the ionically conductive particles into close contact. In alternate embodiments, the organic matrix includes polymers without any cross-linking. Further, as indicated above, in some embodiments, the film is not cast.

Figure 3B:
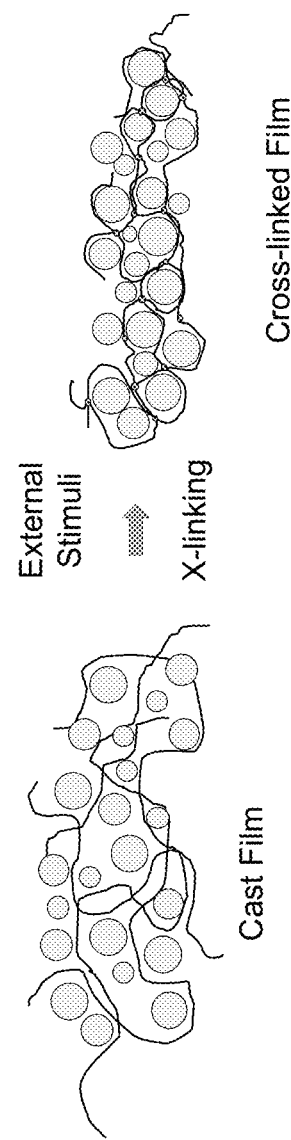
FIG. 3B provides an example of a schematic depiction of a cast film including ionically conductive inorganic particles in a polymer matrix undergoing in-situ polymerization according to certain embodiments of the invention to cross-link the polymer chains without applied pressure.

FIG. 3B provides an example of a schematic depiction of a cast film including ionically conductive inorganic particles in a polymer matrix undergoing in-situ polymerization according to certain embodiments of the invention to cross-link the polymer chains without applied pressure. In these embodiments, the film undergoes sufficient contraction due to the in-situ polymerization itself that particle-to-particle contact and increase in ionic conductivity occurs. Polyurethane polymerization with blocked isocyanates as described herein would be expected to undergo more contraction than other polymerization methods such as radical polymerization and ring-opening polymerization. Higher organic matrix volume percentages and lower inorganic particle volume percentages also lead to more contraction. Finally, the more functional groups that are converted during polymerization, the more the film will contract.

In some embodiments, dual-cure methods are provided. In such methods, two reactants that polymerize at different temperatures are provided. For example, a monomer that forms only higher molecular weight linear polymers (i.e., a difunctional or N=2 monomer) may polymerize at 100° C., and a functional cross-linker that has three functional groups (N=3) may polymerize at 180° C. The polymer formed with N=2 monomer may be a thermoplastic, and can be re-shaped under temperature and pressure, whereas the N=3 functional cross-linker may a thermoset that cannot be re-shaped. Thus, a first in-situ processing operation at 100° C. may be performed to hold the composite together with a subsequent in-situ processing operation performed at 180° C. to cross-link the composite in its final form. The first cure can provide mechanical strength to the material before the film undergoes thermally activated or ultraviolet-activated in-situ polymerization in some embodiments. An example of a dual cure system including a difunctional monomer (isophorone diisocyanate-diisopropylamine (IPDI-DIPA)) and blocked trifunctional isocyanate (poly[(phenyl isocyanate)-co-formaldehyde] PPFI-DIPA) for in-situ polyurethane formation is described below in in FIG. 4A and in the Examples.

In some embodiments, a higher molecular weight polymer can be pre-polymerized ex-situ and then mixed with the ionically conductive particles. This may be done instead of polymerizing N=2 monomers in-situ, for example. The higher molecular weight thermoplastic may be prepared by reacting a backbone polymer with isocyanate as described above. This may be referred to as a two-step polymerization herein; the first polymerization may be referred to as pre-polymerization or ex-situ polymerization.

Two-step polymerization may be advantageous to increase viscosity and uniformity. In some embodiments, the material undergoes hot pressing; hot pressing on low viscosity films can lead to non-uniformity. Further, pre-polymerization may reduce the chance of phase separation of polar and non-polar components in the mixture. As discussed further with respect to Examples 9 and 10, non-uniformity and phase separation have tremendous implications on homogeneity of composite electrolytes and other films caused by micro- and macroscopic composition drifts, and mechanical defects and can compromise the overall performance of the film.

Figure 4A:
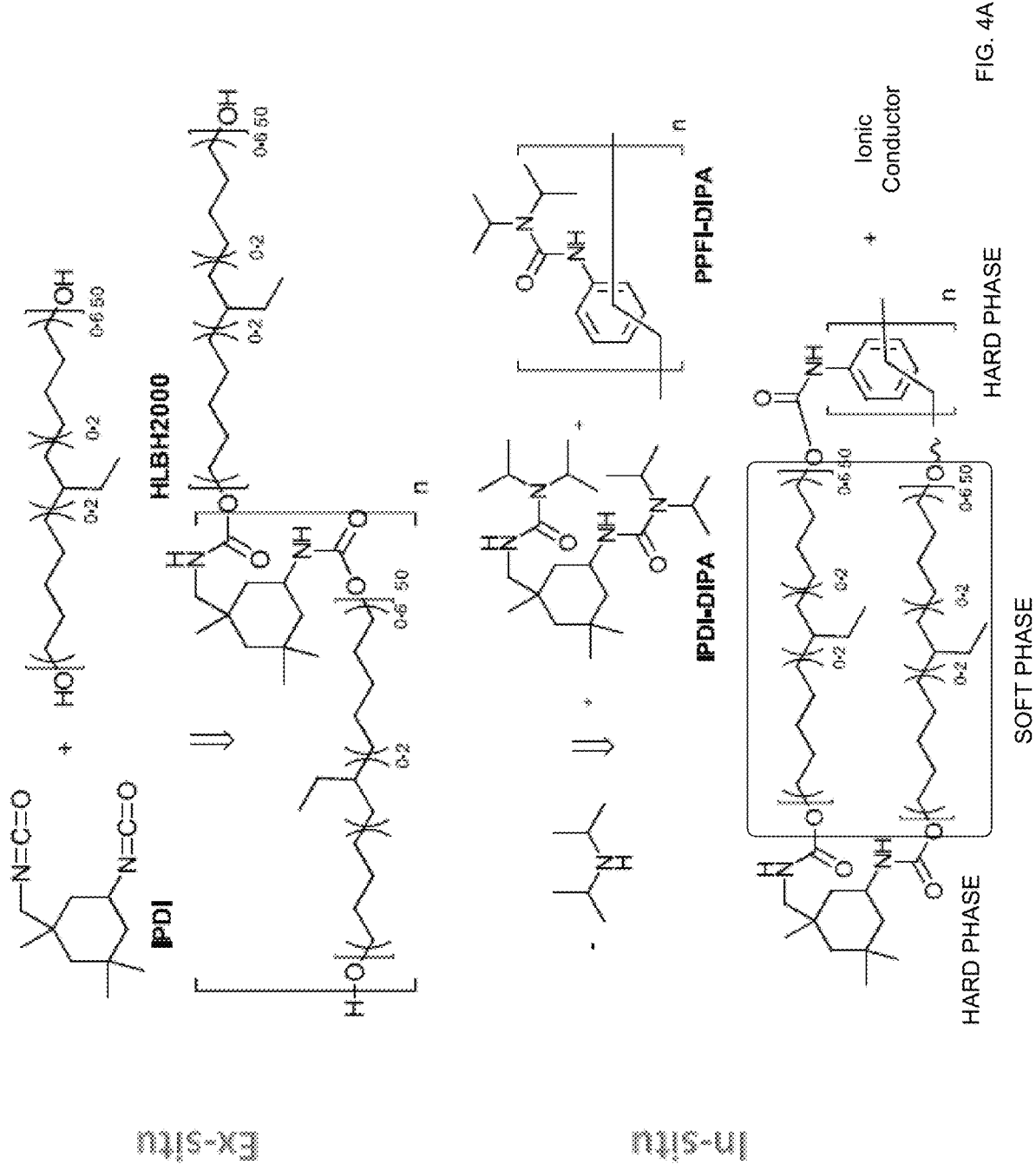
FIG. 4A shows an example of a two-step polymerization to form a polyurethane composite film.

FIG. 4A shows an example of a two-step polymerization to form a polyurethane composite film. The pre-polymerization or first step is labelled "ex-situ," in which a polymer diol is reacted with an isocyanate to form a pre-polymer. The polymer diol may be reacted with free diisocyanate in a specific OH:NCO ratio to obtain a pre-polymer with molecular weight (e.g., about 2,000-40,000) that is higher than that of the starting polymer diol. The resulting polymer is a diol or diisocyanate. In the example of FIG. 4A, the polymer diol is hydrogenated polybutadiene diol (HLBH2000) (Krasol HLBH-P 2000, Cray Valley; 2000 indicates the molecular weight) and the isocyanate is isophorone diisocyanate (IPDI), an unblocked isocyanate. The degree of polymerization is indicated by "n" with examples including 3, 5, 9, and 15.

Figure 4B:
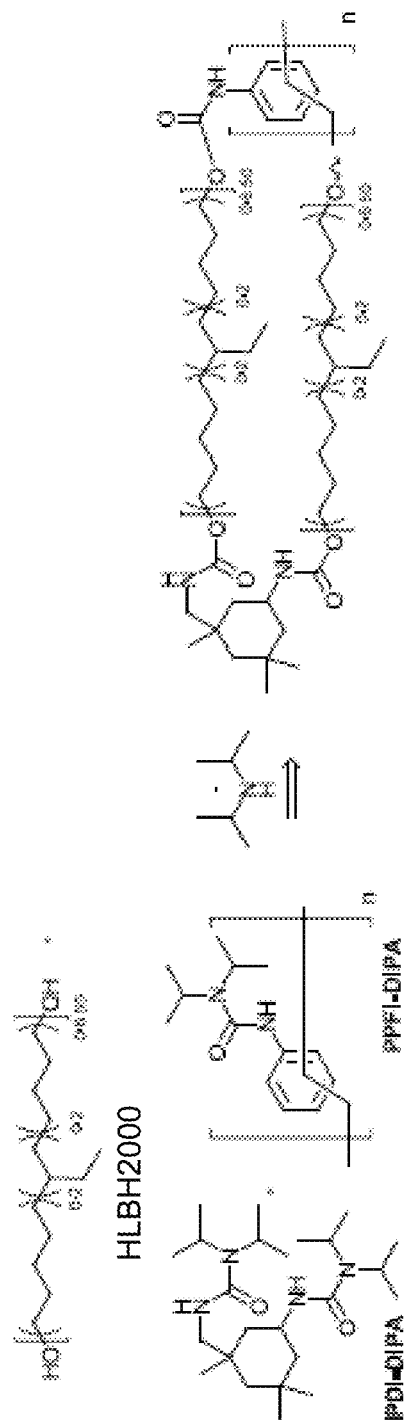
FIG. 4B shows an example of a one-step polymerization to form a polyurethane composite film.

The pre-polymer is then mixed with the other components of the composite material, namely, the components that make up the hard phase (isocyanate linkers and if present, cross-linkers, and chain extenders) and the inorganic particles. The final polymerization of polymer matrix occurs 'in-situ' and is triggered by thermal activation of blocked isocyanate. In the example of FIG. 4A, the isocyanate linker is isophorone diisocyanate-diisopropylamine (IPDI-DIPA), a blocked diisocyanate that acts as a difunctional monomer in polyurethane formation and the cross-linker is poly[(phenyl isocyanate)-co-formaldehyde] diisopropylamine (PPFI-DIPA), a blocked trifunctional isocyanate that acts as a cross-linker during in-situ polyurethane formation, and is responsible for the formation of a polymer network. The mixture undergoes in-situ polymerization as described above, with the result a composite including a cross-linked polyurethane matrix and inorganic ionically conductive particles. The polyurethane matrix includes a soft phase (in the boxed area) and hard phase as shown. The amount of hard phase may be adjusted as desired. In alternative embodiments, the IPDI-DIPA, PPFI-DIPA, HLBH2000 (or other components of the organic phase) may be mixed together in-situ in one step as shown in FIG. 4B.

The selection of a blocking agent for the formation of in-situ formed polyurethanes can be informed by the following factors:
(1) The blocking agent may be chosen such that deblocking and polymerization occurs at lower temperatures than temperatures at which unwanted changes (e.g., decomposition or glass crystallization) occur to the inorganic conductor. In embodiments in which glass crystallization is unwanted, the deblocking temperature ($T_{diss}$) is less than the glass crystallization temperature ($T_{cryst}$), for example. The deblocking temperature may be less than the decomposition temperature $T_{decomposition}$ of a ceramic material, for example.
(2) The blocking agent may be chosen such that it does not remain in the polymer after de-blocking. This may help avoid electrochemical side reactions and/or degradation of the inorganic conductor. The boiling point of the blocking agent $T_{bp}$ is less than the polymerization temperature $T_{react}$ to allow the side product to evaporate from the composition during curing. Synthesis and analysis of example blocking agents is provided below in Examples 1 and 7.

The selection of an isocyanate for the formation of in-situ formed polyurethanes can be informed by the following factors:
(1) The blocked isocyanate may be chosen such that deblocking and polymerization occurs at lower temperatures than temperatures at which unwanted changes (e.g., decomposition or glass crystallization) occur to the inorganic conductor. In embodiments in which glass crystallization is unwanted, the polymerization temperature ($T_{reac}$) is less than the glass crystallization temperature ($T_{cryst}$), for example.
(2) The blocked isocyanate may be chosen to be sufficiently soluble in a solvent used for casting slurries (if used). In some embodiments, aromatic solvents such as toluene or xylene are used.

The chemical structure of the isocyanate affects both properties of the final polyurethane as well as processing conditions for the composite materials. Synthesis and analysis of example blocked isocyanates is provided below in the Examples.

In-situ crosslinking of polyurethane matrix can also be performed in a presence of other organic additives, such as a high molecular weight binder. Such a binder may be advantageous in situations when harsher conditions such as high temperatures, loads, or shear forces, are used to process films. It can help improve mechanical properties and prevent any damage of the film before the cross-linking the polyurethane phase occurs.

The polymer binder is a high molecular weight (at least 30 kg/mol) polymer. In some embodiments, it may be at least 50 kg/mol, or at least 100 kg/mol polymer. In some embodiments, the polymer binder has a non-polar backbone. Examples of non-polar polymer binders include polymers or copolymers including styrene, butadiene, isoprene, ethylene, and butylene. Styrenic block copolymers including polystyrene blocks and rubber blocks may be used, with examples of rubber blocks including PBD and polyisoprene. The rubber blocks may or may be hydrogenated. Specific examples of polymer binders are styrene ethylene butylene styrene (SEBS), styrene-butadiene-styrene (SBS), styrene-isoprene-styrene (SIS), styrene-butadiene rubber (SBR), PSt, PBD, polyethylene (PE), and polyisoprene (PI).

Composites Including Cross-Linked Polymers As Plasticizer

In some embodiments, a cross-linked polymer may be used as a plasticizer for a high molecular weight binder. The presence of relatively small molecular weight polymers as plasticizers helps improve processability of large molecular weight binders such as SEBS, reducing requirements for pressure and temperatures. Plasticizers are usually not desired in materials, as they can leak over time, leading to the degradation and declining performance of the materials. However, the approach of cross-linking of polyurethane networks in presence of polymer diols, such as HLBH2000, overcomes that issue. A polymer diol can first act as a plasticizer to enable easier processing of composites that include high molecular weight binders, and then be immobilized in a polymer network via in-situ cross-linking with blocked isocyanates, thus stabilizing the plasticizer and preventing it from moving and leaking out from the materials over time.

According to various embodiments, a composite film having an organic phase that includes over 50 wt % high molecular weight binder may be provided. The organic phase may include a cross-linked polyurethane network as a plasticizer. In some embodiments, the cross-linked polyurethane network may be between 1-10 wt % of the organic phase.

Electrolytes

In one aspect of the invention, solid-state composite electrolytes are provided. The solid-state composite electrolytes may be any of the solid-state composite material described above. The electrolyte may be formed directly on a functional substrate, such as an electrode, or formed on a removable substrate that is removed before assembling the solid-state electrolyte to other components of a battery.

In some embodiments, solid-state composite electrolytes consisting essentially of a polyurethane matrix and the ionically conductive inorganic particles, along with any unreacted reactant or byproduct, as described above are provided. However, there may be other components of the electrolytes as described above. In some such embodiments, the polymerized precursor, the high molecular weight polymer binder (if present), ionically conductive inorganic particles, and any unreacted reactant or byproduct (if present) constitute at least 90% by weight of the solid-state composite electrolyte, and, in some embodiments, at least 95% by weight of the solid-state composite electrolyte.

In some embodiments, ionically conductive inorganic particles constitute at least 60% by weight of the solid-state electrolyte. In some such embodiments, the balance of the solid-state electrolyte is the polymer matrix and any unreacted reactant and byproduct. In some embodiments, ionically conductive inorganic particles constitutes at least 80% by weight of the solid-state electrolyte. In some such embodiments, the balance of the solid-state electrolyte is the polymer matrix and any unreacted reactant and byproduct. In some embodiments, ionically conductive inorganic particles constitutes at least 85% by weight of the solid-state electrolyte. In some such embodiments, the balance of the solid-state electrolyte is the polymer matrix and any unreacted reactant and byproduct.

Other components can include alkali metal ion salts, including lithium ion salts, sodium ion salts, and potassium ion salts. Examples include LiPF6, LiTFSI, LiBETI, etc. However, in some embodiments, the solid-state electrolytes are substantially free of alkali metal ion salts.

In some embodiments, the electrolyte may include an electrode stabilizing agent that can be used to form a passivation layer on the surface of an electrode. Examples of electrode stabilizing agents are described in U.S. Pat. No. 9,093,722, which is incorporated by reference. In some embodiments, the electrolyte may include conductivity enhancers, fillers, or organic components as described above.

The composite solid-state electrolytes may be used in any solid-state alkali-ion or alkali-metal battery, including lithium-ion batteries, sodium-ion batteries, lithium-metal batteries, and sodium-metal batteries. The composite solid-state electrolytes are well-suited for batteries in which dendrite growth is a concern. For example, in some embodiments, an electrolyte for a lithium metal battery is provided. The composite solid-state electrolytes enable the use of lithium metal anodes by resisting dendrites. The composite solid-state electrolytes may be used with any cathode material, including sulfur cathodes. The organic phase components described above do not dissolve polysulfides and are suited for use with lithium-sulfur batteries.

A solid film electrolyte composition of the present invention may be of any suitable thickness depending upon the particular battery design. For many applications, the thickness may be between 10 microns and 250 microns, for example 100 microns. In some embodiments, the electrolyte may be significantly thicker, e.g., on the order of millimeters.

Example loadings for solid-state composite electrodes according to embodiments of the present invention are given below in Table 1.

TABLE 1

Example Loadings for Solid-State Composite Electrolytes

| | | Examples | % Weight of Total |
|---|---|---|---|
| Inorganic phase | Inorganic ionically conductive particles | Sulfide glass Sulfide glass-ceramic Sulfide ceramic Argyrodites | 40%-97.5% 40%-90% 65%-90% |

| | | Examples | % Weight of organic phase | |
|---|---|---|---|---|
| Organic Phase | Cross-linked polyurethane | HLBH, LBH, PDMS backbones | 50%-99% 80%-99% 95%-99% | 2.5%-60% 10%-60% 10%-35% |
| | High molecular weight polymer binder | SEBS, SBS, SIS, SBR and mixtures thereof | 1%-50% 1%-20% 1%-5% | |

Table 1 provides loadings for compositions for which the organic matrix includes a high molecular weight polymer binder. The loadings do not consider unreacted reactants or byproducts—that is, unreacted reactants or byproducts, which may be present in trace or greater amounts, are not included in the loadings. For compositions that do not include a high molecular weight polymer binder, the high end of each example range for the polymerized precursor (99%) is replaced by 100%, with the low end of each example range for the binder (1%) replaced by 0.

In some embodiments, an electrolyte or other composition may have an organic phase that is at least 50%, and in some embodiments, at least 90% and as high as 99% high molecular weight binder, with 1-10% of the organic phase being a cross-linked polymer. This relatively small amount of cross-linked polymer can significantly improve the processability of such compositions. Cross-linking embeds it within the organic phase, preventing leakage of the polymer at room temperature or higher temperature operating conditions. Higher polyurethane loadings may be used for increased conductivity in some embodiments. Table 2 below provides example loadings for such compositions.

TABLE 2

Example Loadings for Solid-State Composite Electrolytes

| | | Examples | % Weight of Total |
|---|---|---|---|
| Inorganic phase | Inorganic ionically conductive particles | Sulfide glass Sulfide glass-ceramic Sulfide ceramic Argyrodites | 40%-97.5% 40%-90% 65%-90% |

| | | Examples | % Weight of organic phase | |
|---|---|---|---|---|
| Organic Phase | Cross-linked poly-urethane | HLBH, LBH, PDMS backbones | 60%-80% 1%-80% 1%-10% 1%-2% | 2.5%-60% 10%-60% 10%-35% |
| | High | SEBS, SBS, | 20%-40% | |

TABLE 2-continued

Example Loadings for Solid-State Composite Electrolytes

| | | |
|---|---|---|
| molecular weight polymer binder | SIS, SBR and mixtures thereof | 20%-99% 90%-99% 98%%-99% |

Electrodes

In one aspect of the invention, electrodes including the solid-state composites are provided. The solid-state composites further include an electrode active material, and optionally, a conductive additive. In embodiments in which a high molecular weight binder is present, the high molecular weight polymer binder may constitute between 1% and 50% by weight of the organic phase, with the polymerized precursor constituting at least 50% by weight of the organic phase. The organic phase consists essentially of an in-situ polymerized precursor, an optional high molecular weight polymer binder, and any unreacted reactant and byproduct that may be present according to some embodiments. In other embodiments, it may include one or more additional components as described above. Example loadings of embodiments of the present invention are given below in Table 3.

TABLE 3

Example Loadings for Solid-State Composite Electrodes

| | | | % Weight of powder | % Weight of Total |
|---|---|---|---|---|
| Inorganic phase - electrode powder | Active Material | Li$_2$S, LCO, NCA, graphite, silicon, sulfur | 30-80% 30-50% | 85-97% |
| | Conductive Additive | Activated carbon | 5-25% 10-20% | |
| | Inorganic ionically conductive particles | Sulfide glass Sulfide glass-ceramic Sulfide ceramic Argyrodites | 15-60% 30-50% | |

| | | | % Weight of organic phase | |
|---|---|---|---|---|
| Organic Phase | Cross-linked polyurethane | HLBH, LBH, PDMS backbones | 50%-99% 80%-99% 95%-99% | 3-15% |
| | High molecular weight polymer binder | SEBS, SBS, SIS, SBR and mixtures thereof | 1%-50% 1%-20% 1%-5% | |

Table 3 provides loadings for compositions for which the organic matrix includes a high molecular weight polymer binder. Unreacted reactants or byproducts, which may be present in trace or greater amounts, are not included in the loadings. For compositions that do not include a high molecular weight polymer binder, the high end of each example range for the polymerized precursor (99%) is replaced by 100%, with the low end of each example range for the binder (1%) replaced by 0.

In some embodiments, the solid-state electrodes are cathodes including an in-situ polymerized polymer matrix, inorganic ionically conductive particles, and an active material. In some embodiments, the solid-state electrodes are anodes including an in-situ polymerized polymer matrix, inorganic ionically conductive particles, and an active material.

Example cathode active materials include lithium cobalt oxide (LCO), lithium manganese oxide (LMO), lithium nickel cobalt aluminum oxide (NCA), lithium iron phosphate (LFP), and lithium nickel cobalt manganese oxide (NCM). Example anode active materials include graphite and other carbon-containing materials, silicon and silicon-containing materials, tin and tin-containing materials, lithium and lithium alloyed metals.

In some embodiments, the solid-state electrodes are sulfur cathodes including an in-situ polymerized polymer matrix, inorganic ionically conductive particles, and sulfur-containing active material. In some embodiments, the composite solid-state cathodes are incorporated into lithium-sulfur batteries with the composite solid-state cathodes including a an in-situ polymerized polymer matrix, an optional high molecular weight polymer binder, inorganic ionically conductive particles, lithium sulfide (Li2S) particles, and a carbon conductive material.

In some embodiments, the electrode may have an organic phase that is at least 90% and as high as 99% high molecular weight binder, with 1-10% of the organic phase being a cross-linked polymer. As discussed above, this relatively small amount of cross-linked polymer can significantly improve the processability of such compositions. Cross-linking embeds it within the organic phase, preventing leakage of the polymer at room temperature or higher temperature operating conditions. Higher polyurethane loadings may be used for increased conductivity in some embodiments. Table 4 below provides example loadings for such compositions.

TABLE 4

Example Loadings for Solid-State Composite Electrolytes

| | | | % Weight of powder | % Weight of Total |
|---|---|---|---|---|
| Inorganic phase - electrode powder | Active Material | Li$_2$S, LCO, NCA, graphite, silicon, sulfur | 30-80% 30-50% | 85-97% |
| | Conductive Additive | Activated carbon | 5-25% 10-20% | |
| | Inorganic ionically conductive particles | Sulfide glass Sulfide glass-ceramic Sulfide ceramic Argyrodites | 15-60% 30-50% | |

| | | | % Weight of organic phase | |
|---|---|---|---|---|
| Organic Phase | Cross-linked polyurethane | HLBH, LBH, PDMS backbones | 60%-80% 1%-80% 1%-10% 1%-2% | 3-15% |
| | High molecular weight polymer binder | SEBS, SBS, SIS, SBR and mixtures thereof | 20%-40% 20%-99% 90%-99% 98%-99% | |

According to various embodiments, the solid-state electrodes are thin films having thicknesses of less than 200 microns, and in some embodiments, less than 100 microns. The areal capacity may be between 1 mAh/cm$^2$ and 10 mAh/cm$^2$ in some embodiments.

In one aspect of the invention, electrode/electrolyte bilayers that include the solid-state composite compositions are provided. The bilayers include a solid-state composite electrode and a solid-state composite electrolyte as described above. Each of the ionically conductive inorganic particles, the in-situ polymerized polymer matrix, and the high molecular weight polymer binder (if present) may be independently selected for the electrode and the electrolyte, such that each component of the electrode may be the same or different as that in the electrolyte. The solid-state electrodes are thin films having thicknesses of less than about 200 microns, and in some embodiments, less than about 100 microns. The solid-state electrolyte, which contacts the solid-state electrode, may have a thickness of less than about 200 microns. In some embodiments, it is between 5 microns and 50 microns thick, e.g., between 25 microns and 50 microns thick.

Battery

Provided herein are alkali metal batteries and alkali metal ion batteries that include an anode, a cathode, and a compliant solid electrolyte composition as described above operatively associated with the anode and cathode. The batteries may include a separator for physically separating the anode and cathode.

Examples of suitable anodes include but are not limited to anodes formed of lithium metal, lithium alloys, sodium metal, sodium alloys, carbonaceous materials such as graphite, and combinations thereof. Examples of suitable cathodes include, but are not limited to cathodes formed of transition metal oxides, doped transition metal oxides, metal phosphates, metal sulfides, lithium iron phosphate, sulfur and combinations thereof. In some embodiments, the cathode may be a sulfur cathode. Additional examples of cathodes include but are not limited to those described in Zhang et al., US Pat. App. Pub No. 2012/0082903, at paragraph 178, which is incorporated by reference herein. In some embodiments, an electrode such as a cathode can contain a liquid, such as described in Y. Lu et al., J. Am. Chem. Soc. 133, 5756-5759 (2011), incorporated by reference herein.

In an alkali metal-air battery such as a lithium-air battery, sodium-air battery, or potassium-air battery, the cathode may be permeable to oxygen (e.g., mesoporous carbon, porous aluminum, etc.), and the cathode may optionally contain a metal catalyst (e.g., manganese, cobalt, ruthenium, platinum, or silver catalysts, or combinations thereof) incorporated therein to enhance the reduction reactions occurring with lithium ion and oxygen at the cathode.

In some embodiments, lithium-sulfur cells are provided, including lithium metal anodes and sulfur-containing cathodes. As noted above, the solid-state composite electrolytes described herein uniquely enable both a lithium metal anode, by preventing dendrite formation, and sulfur cathodes, by not dissolving polysulfide intermediates Li2Sn that are formed at the cathode during discharge.

A separator formed from any suitable material permeable to ionic flow can also be included to keep the anode and cathode from directly electrically contacting one another. However, as the electrolyte compositions described herein are solid compositions, they can serve as separators, particularly when they are in the form of a film.

As described above, in some embodiments, the solid composite compositions may be incorporated into an electrode of a battery. The electrolyte may be a compliant solid electrolyte as described above or any other appropriate electrolyte, including liquid electrolyte.

In some embodiments, a battery includes an electrode/electrolyte bilayer, with each layer incorporating the ionically conductive solid-state composite materials described herein.

Figure 14:
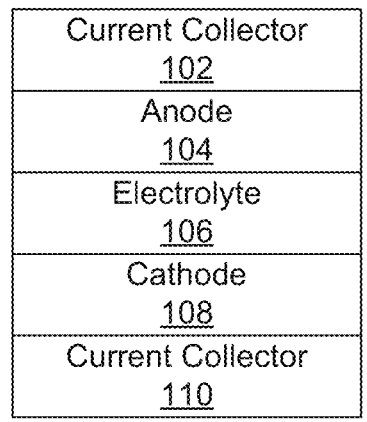
FIGS. 14-16 show examples of schematics of cells according to certain embodiments of the invention.
Figure 15:
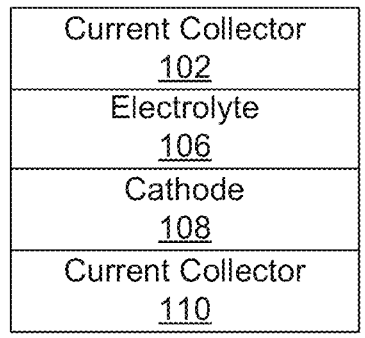
Figure 16:
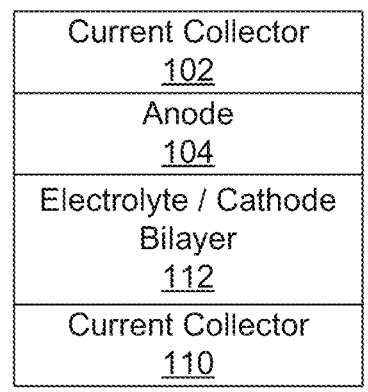

FIG. 14 shows an example of a schematic of a cell 100 according to certain embodiments of the invention. The cell 100 includes a negative current collector 102, an anode 104, an electrolyte 106, a cathode 108, and a positive current collector 110. The negative current collector 102 and the positive current collector 110 may be any appropriate electronically conductive material, such as copper, steel, gold, platinum, aluminum, and nickel. In some embodiments, the negative current collector 102 is copper and the positive current collector 110 is aluminum. The current collectors may be in any appropriate form, such as a sheet, foil, a mesh, or a foam. According to various embodiments, one or more of the anode 104, the cathode 108, and the electrolyte 106 is a solid-state composite including a first component as described above. In some embodiments, each of the anode 104, the cathode 108, and the electrolyte 106 is two- or three-component solid-state composite, as described above. FIG. 15 shows an example of schematic of a lithium metal cell as-assembled 200 according to certain embodiments of the invention. The cell as-assembled 200 includes a negative current collector 102, an electrolyte 106, a cathode 108, and a positive current collector 110. Lithium metal is generated on first charge and plates on the negative current collector 102 to form the anode. One or both of the electrolyte 106 and the cathode 108 may be a composite material as described above. In some embodiments, the cathode 108 and the electrolyte 106 together form an electrode/electrolyte bilayer as described above. FIG. 16 shows an example of a schematic of a cell 100 according to certain embodiments of the invention. The cell 100 includes a negative current collector 102, an anode 104, a cathode/electrolyte bilayer 112, and a positive current collector 110.

All components of the battery can be included in or packaged in a suitable rigid or flexible container with external leads or contacts for establishing an electrical connection to the anode and cathode, in accordance with known techniques.

Example Embodiments

Example 1.1: Synthesis of Diisopropylamine-Blocked 4,4-diisocyanatodiphenylmethane (MDI-DIPA)

10.0 g of 4,4-diisocyanatodiphenylmethane (MDI) was weight out in a glovebox and placed in a dry 250 mL Schlenk flask equipped with a stir bar, followed by the addition of 180 mL of anhydrous toluene. The flask was closed with a rubber septum and placed on a stir plate under nitrogen flow. Next 11.2 mL of dry diisopropylamine (DIPA) was slowly added to the mixture over 5 mins. As the mixture progresses a phase separation of the product from the solution was observed. The mixture was stirred at room temperature for three hours, then the bottom phase of the mixture was separated and residual solvent was removed under vacuum resulting in a white solid. The product was further dried under vacuum at 60° C. for 24 hrs.

Scheme 1.1: Synthesis of MDI-DIPA

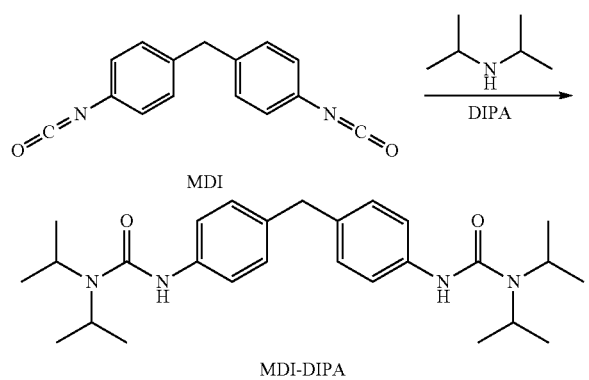

Example 1.2: Step-Growth/Condensation Polymerization—Hydrogenated Polybutadiene Diol With Blocked Diisocyanate

Scheme 1.2: Synthesis of Hydrogenated PBD diol with blocked diisocyanate

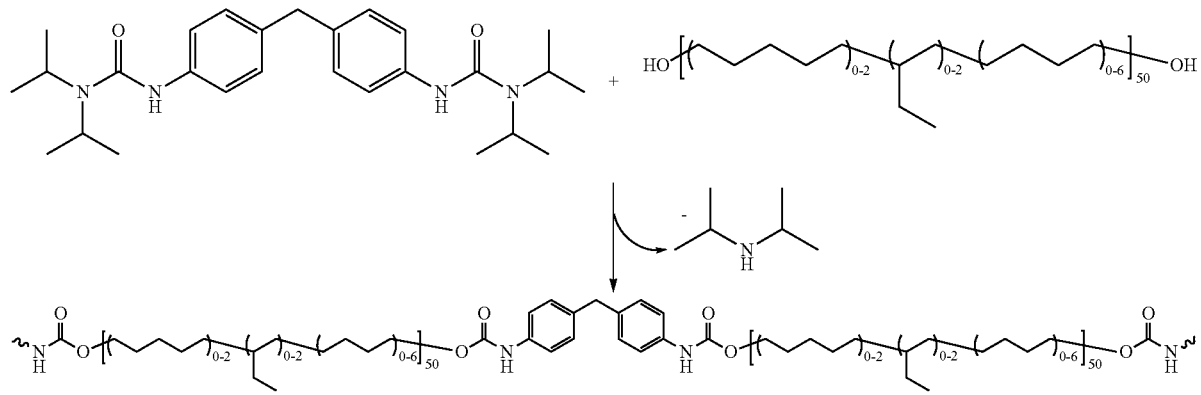

In a glovebox operating under argon atmosphere, 2.55 g of lithium sulfide glass (Li2S:P2S5=75:25) was placed in cup, next, 0.37 g of hydrogenated polybutadiene diol (Krasol HLBH-P 2000, Cray Valley) and 0.080 g of MDI-DIPA were added as a 25 wt. % solution in 1,2,4-trimethylbenzene, and extra 0.3 g of 1,2,4-trimethylbenzene was placed in the cup. The cup was placed in a Thinky mixer (Thinky ARV-SOLED) and mixed at 1500 rpm. The slurry was cast on aluminum foil using a doctor blade. The film was dried on the coater, while maintaining the vacuum, then was transferred to an antechamber and dried under vacuum without heat for 16 hrs.

The dry film was cut into three 50×70 mm rectangles, each post-processed in a different way. All pieces of film were subjected to a pressure of 15 MPa for two hours using a vertical laminating press, however each was exposed to different temperatures while under pressure. The conductivities of films were measured in as A1|A1 symmetrical cells sealed pouches. Each sample was measured at three different applied pressures at room temperature. Table 3 below shows the results:

TABLE 3

Conductivity for composite films processed at different temperatures

| Sample # | Press Temp./° C. | Cond./S · cm$^{-1}$ Applied Force/MPa | | |
|---|---|---|---|---|
| | | 0.1 | 15 | 95* |
| 1 | 25 | 1.4 · 10$^{-6}$ | 6.6 · 10$^{-6}$ | 6.7 · 10$^{-5}$ |
| 2 | | 1.7 · 10$^{-6}$ | 1.7 · 10$^{-5}$ | 6.6 · 10$^{-5}$ |
| 3 | 100 | — | 9.4 · 10$^{-5}$ | 1.2 · 10$^{-4}$ |
| 4 | | — | 8.3 · 10$^{-5}$ | 1.0 · 10$^{-4}$ |
| 5 | 140 | 9.5 · 10$^{-5}$ | 1.1 · 10$^{-4}$ | 1.0 · 10$^{-4}$ |
| 6 | | 1.1 · 10$^{-4}$ | 1.2 · 10$^{-4}$ | 1.1 · 10$^{-4}$ |

*Values after thickness adjustment due to densification.

The temperature for the reaction to occur was determined by differential scanning calorimetry (DSC). DSC analysis of cast, dry sample (exotherm of reaction). The cross-linking was confirmed by DSC and thermogravimetric analysis (TGA), by disappearance of the exothermic signal of polymerization reaction and decreased weight loss of the sample respectively.

Referring to the above table, samples 1-4 show increased conductivity with increased applied pressure, while samples 5 and 6 maintain conductivity even at ambient pressure (0.1 MPa). This indicates that at 140° C., sufficient external energy is applied to initiate in-situ polymerization and that the in-situ polymerization allows the samples to maintain conductivity even after pressure is released.

Example 2: Analysis of Composite Synthesis Via In-Situ Polyurethane Formation Composites of lithium sulfide glasses with polyurethane polymer matrix are synthesized as described in Example 1.2. The formation of polyurethane occurs at elevated temperature between diol (polymer or small molecule) and an 'in-situ' generated isocyanate. The isocyanate is produced as a result of dissociation of the blocking agent from protected isocyanate; hence, the reaction temperature is no lower than the temperature of the dissociation of the blocking agent ($T_{react} \geq T_{diss}$).

Figure 5:
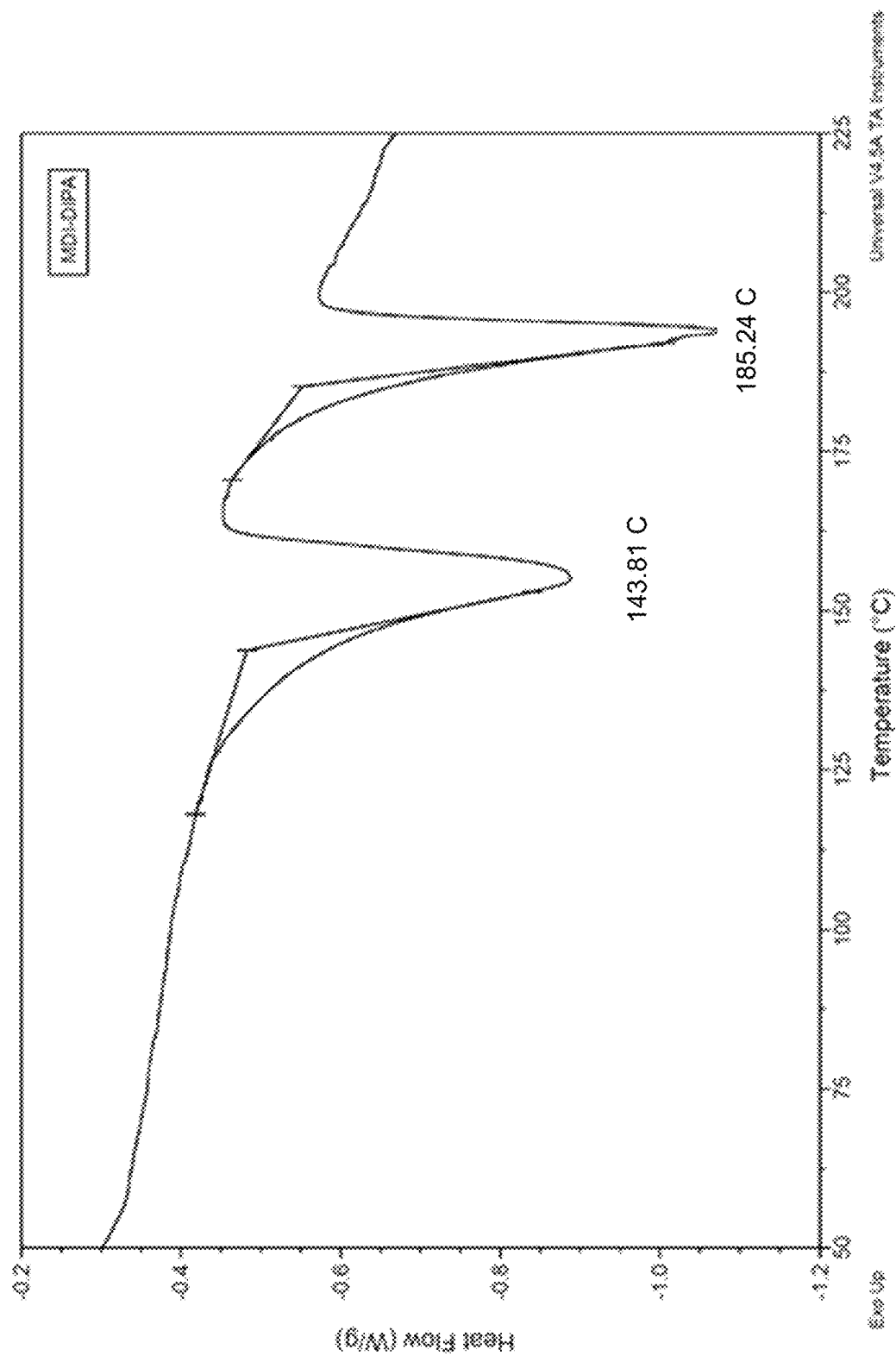
FIG. 5 is a differential scanning calorimetry (DSC) thermogram of 4,4-diisocyanatodiphenylmethane blocked with diisopropylamine (MDI-DIPA) in a method of synthesizing of a composite material via in-situ polyurethane formation according to certain embodiments of the invention.

Two main analytical techniques are employed in assessment of the decomposition process of blocked isocyanates: DSC and TGA. FIG. 5 shows a DSC thermogram of 4,4-diisocyanatodiphenylmethane blocked with diisopropylamine (MDI-DIPA), showing two endotherms with respective onset temperatures of $T_{diss1}$=143° C. and $T_{diss2}$=184° C.

The presence of two endotherms on the DSC thermogram indicates that the dissociation of diisopropylamine follows a two-step process (Scheme 2). When heated to $T_{diss1}$, only one of the isocyanate groups is unblocked (Step I, Scheme 2), and the system requires a higher temperature ($\geq T_{diss2}$) to release the other one (Step II, Scheme 2).

Scheme 2: Mechanism of disociation of diisopropylamine from MDI-DIPA.

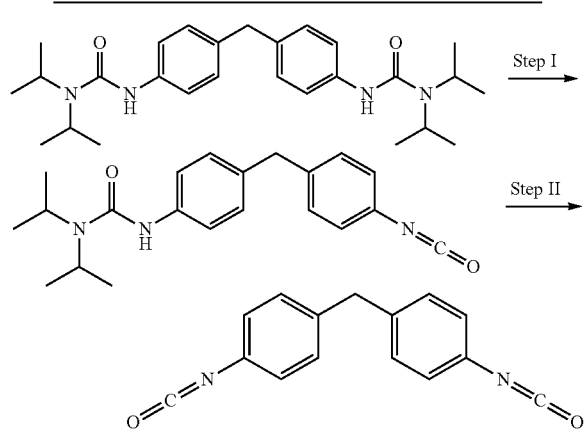

Figure 6:
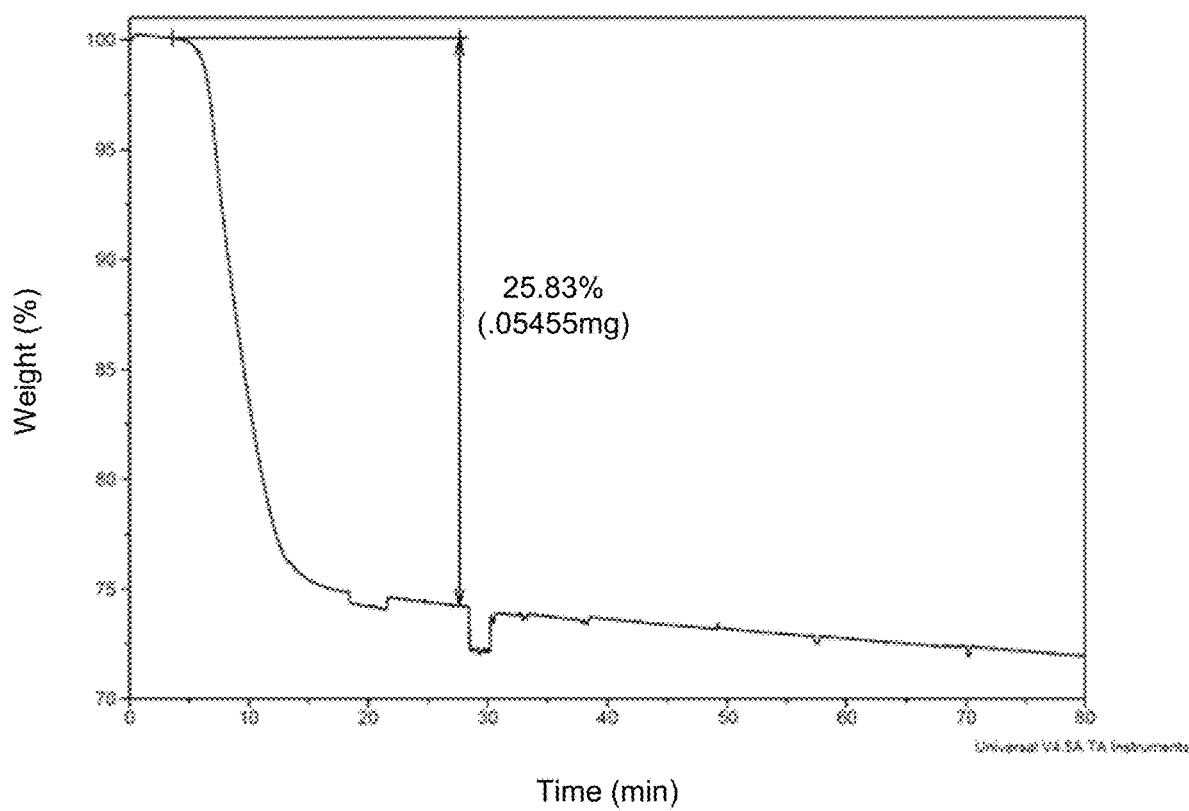
FIG. 6 is a thermogravimetric curve of MDI-DIPA obtained from thermogravimetric analysis (TGA) in a method of synthesizing of a composite material via in-situ polyurethane formation according to certain embodiments of the invention.

The step-wise dissociation mechanism is further confirmed by TGA analysis of MDI-DIPA, performed under isothermal conditions, at 140° C. (FIG. 6). As expected, the analysis showed a 25 wt. % loss, which corresponds to the loss of one DIPA molecule and correlates well with the theoretical value of about 23 wt. %

Figure 7:
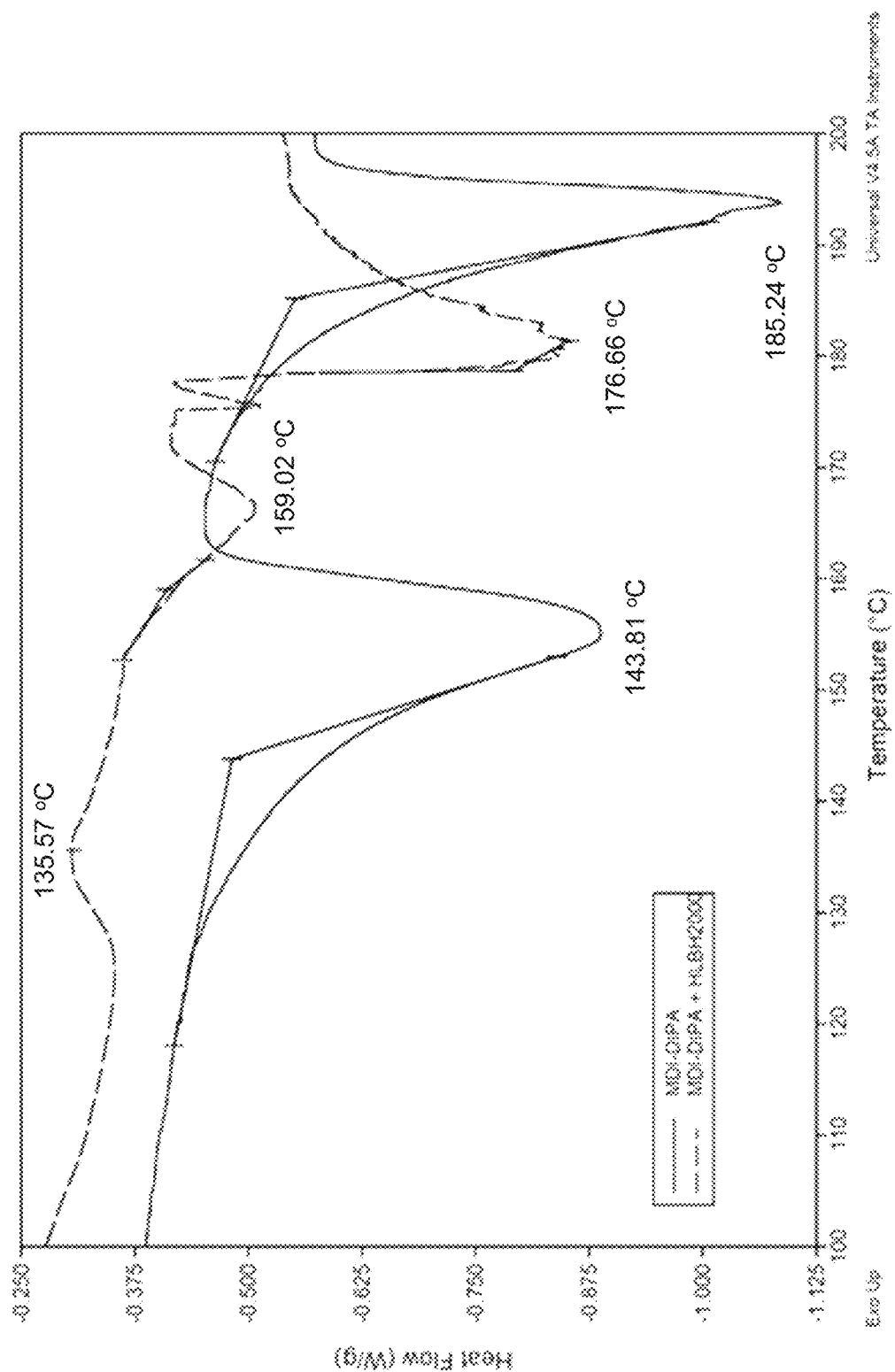
FIG. 7 is a DSC thermogram of a mixture of polymerizable components, MDI-DIPA and HLBH2000, obtained in a method of synthesizing of a composite material via in-situ formation according to certain embodiments of the invention.

Next, DSC was used to analyze a mixture of polymerizable components MDI-DIPA and HLBH2000. The data shows that in the presence of the diol (HLBH2000) the endotherm with onset temperature at $T_{diss1}$~140° C. (solid line, FIG. 7) disappears, and is replaced with an endothermic peak at $T_{end1}$~136° C. (dashed line, FIG. 7). The appearance of the exotherm is an indication of the polymerization (polyurethane formation) between (blocked) isocyanate and diol. However, the disappearance of the endotherm suggests that the process occurs via one-step transesterification, rather than two-step dissociation-condensation reaction.7

Figure 8:
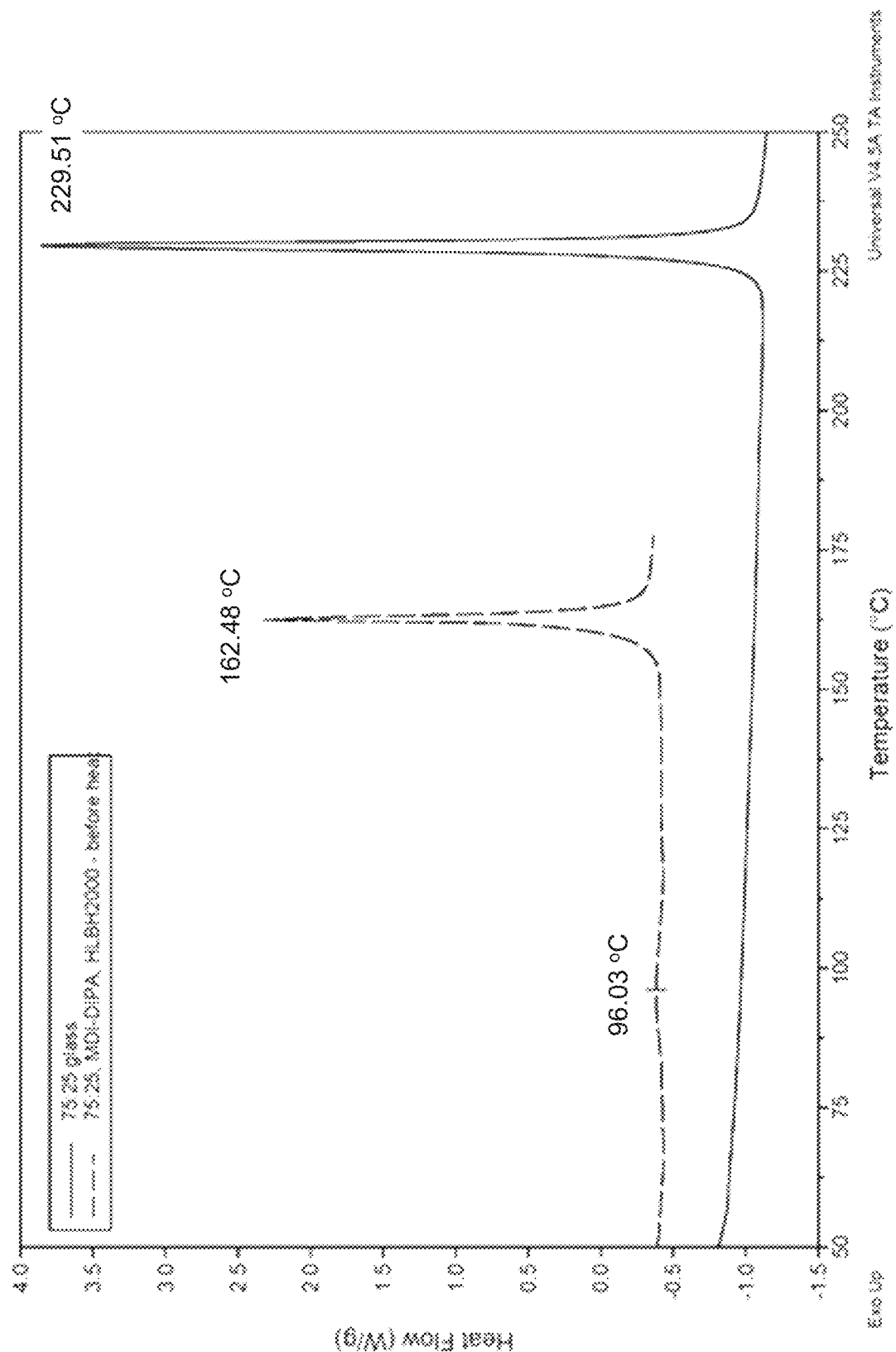
FIG. 8 shows DSC traces of pure $Li_2S:P_2S_5=75:25$ glass (upper trace) and a composite, according to certain embodiments of the invention, of the same sulfide glass, HLBH2000, and MDI-DIPA, before heat treatment (lower trace).

Finally, DSC and TGA analyses were performed on the full hybrid formulation of lithium sulfide glass and pre-matrix components, specifically HLBH2000 and MDI-DIPA, prepared by a thin-film casting method. The analyses provide several different pieces of information: a) temperature required to initiate 'in-situ' polymerization in polyurethane hybrids (DSC), b) thermal stability of the sulfide glass in the pre- and post-polymerized hybrid, and c) occurrence and progress of the polymerization in the organic matrix. FIG. 8 shows DSC traces of pure $Li_2S:P_2S_5$=75:25 glass (upper trace) and the hybrid mixture of the same sulfide glass, HLBH2000 and MDI-DIPA, before heat treatment (lower trace). The pure glass analysis shows only one endotherm at $T_{cryst1}$=230° C., which is related to the glass crystallization. When the same glass is combined with the matrix components, HLBH2000 and MDI-DIPA, two endothermal peaks are observed instead. The first, smaller signal at $T_{end2}$ about 96° C. is ascribed to the polymerization reaction, whereas the higher intensity peak at $T_{cyst2}$ about 162° C. corresponds to the glass crystallization. It is evident that the thermal stability of the sulfide glass decreases significantly in the presence of matrix components. This evidence is supported by the 67° C. drop in the crystallization temperature, and hence decreased thermal stability, of the glass in the pre-polymerized hybrid as compared to the pure glass. On the other hand, the presence of the sulfide glass catalyzes the polyurethane formation reaction, which is indicated by the shift of the polymerization endotherm from $T_{end1}$ of about 136° C. to $T_{end2}$ of about 96° C.

Figure 9:
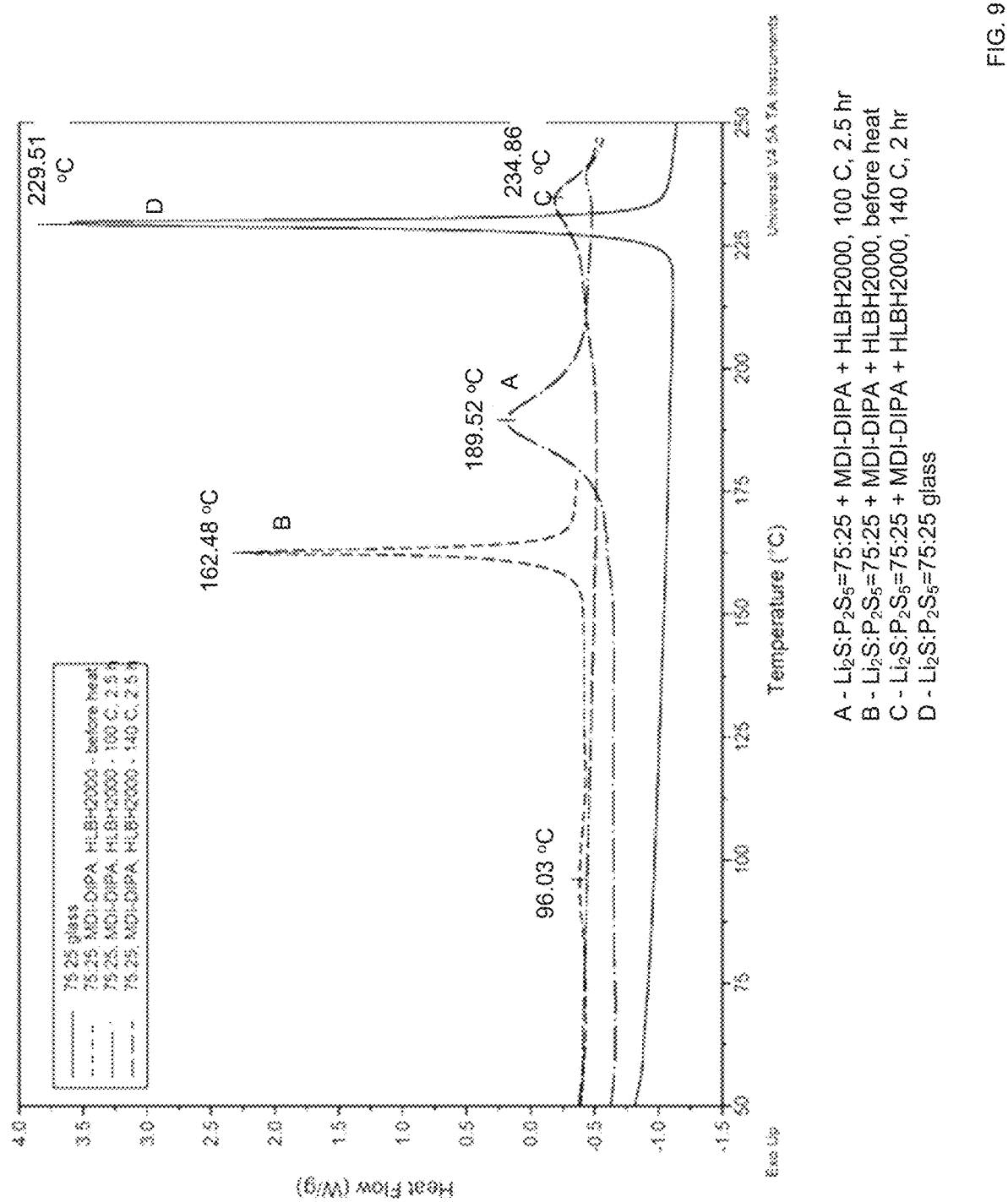
FIG. 9 shows DSC traces of a composite film according to certain embodiments of the invention treated at 100° C. and 140° C.

After determining the thermal stability of the glass and the polymerization temperature in the pre-polymerized hybrid, the thin film is subjected to thermal post-processing. The thin film is pressed in a horizontal lamination press at 15 MPa, then heated at 100° C. or 140° C. for 2 hrs, and cooled to room temperature, while applying the pressure. FIG. 9 shows DSC traces of the glass hybrid film treated at 100° C. and 140° C. As expected, the polymerization exotherm present in the pre-polymerized hybrid (short dash, labeled 'B') disappears when the film is exposed to either 100° C. (dash-dot trace, labeled 'A') or 140° C. (long dash trace, labeled 'C'), which confirms that the polymerization reaction within the hybrid is accomplished. In addition, based on the differences in observed crystallization temperatures, significant changes in the glass stability are noticed. The glass stability decreases by 67° C. when pre-polymerized matrix is introduced, but increases in the thermally treated (polymerized) hybrid. When the hybrid is pressed at 100° C., the thermal stability of glass is only 40° C. lower (dash-dot trace, labeled 'A') and it fully recovers when treated at 140° C. (long dash trace, labeled 'C'); hence providing evidence of the glass stabilization by in-situ polyurethane formation within the hybrid.

FIG. 9 shows that after heating films to 100° C. and 140° C. during film processing, the films are intrinsically stable to temperatures of 189° C. and higher, and that at this point, the only exothermic peaks realized in the DSC data are due to glass crystallization. As such, the composite electrolyte is substantially safer than liquid electrolytes traditionally used in lithium ion batteries.

Figure 10:
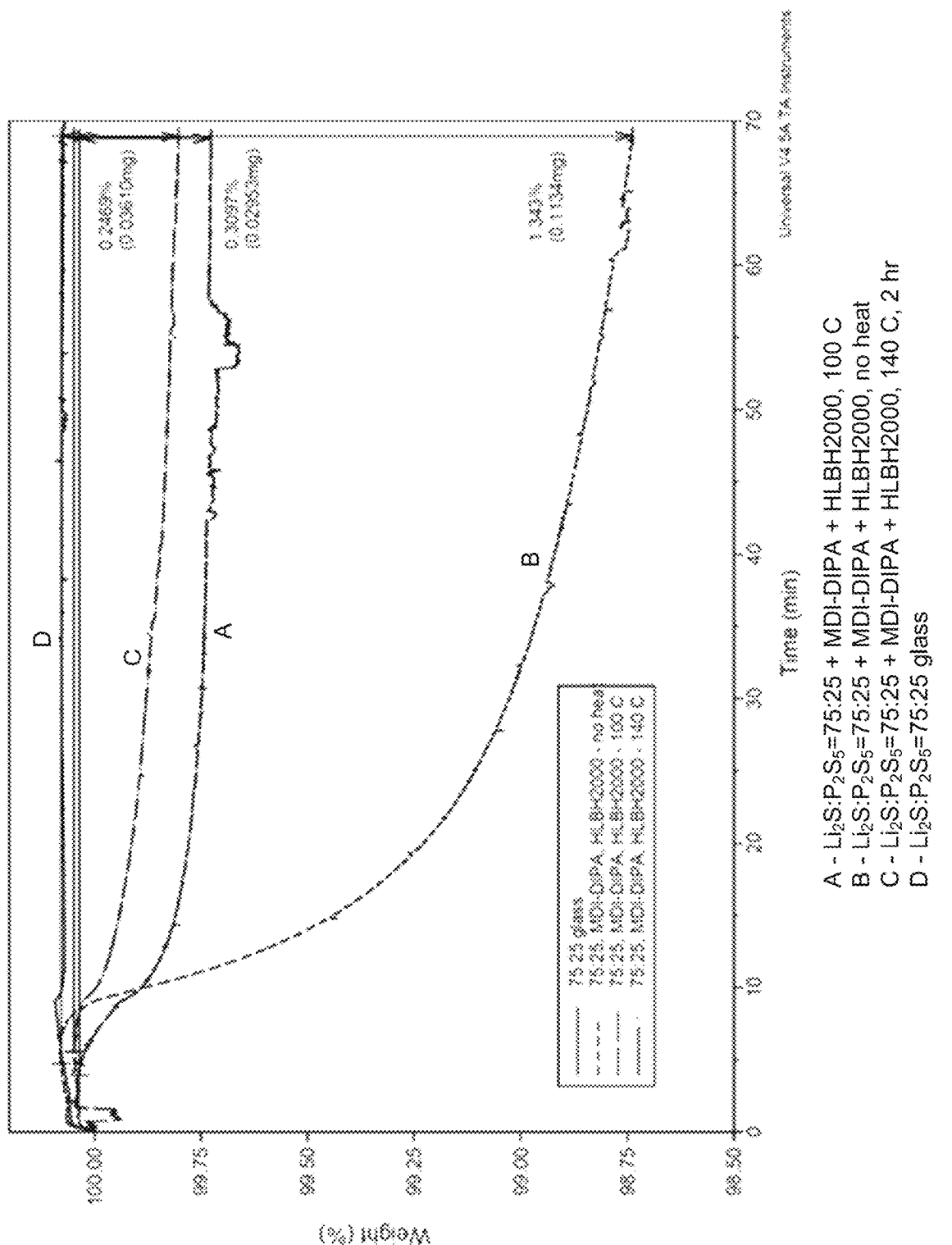
FIG. 10 is a thermogravimetric curve of four samples: pure sulfide glass, a non-treated composite thin film, a composite film according to certain embodiments heated at 100° C., and a composite film according to certain embodiments treated at 140° C.
Figure 11:
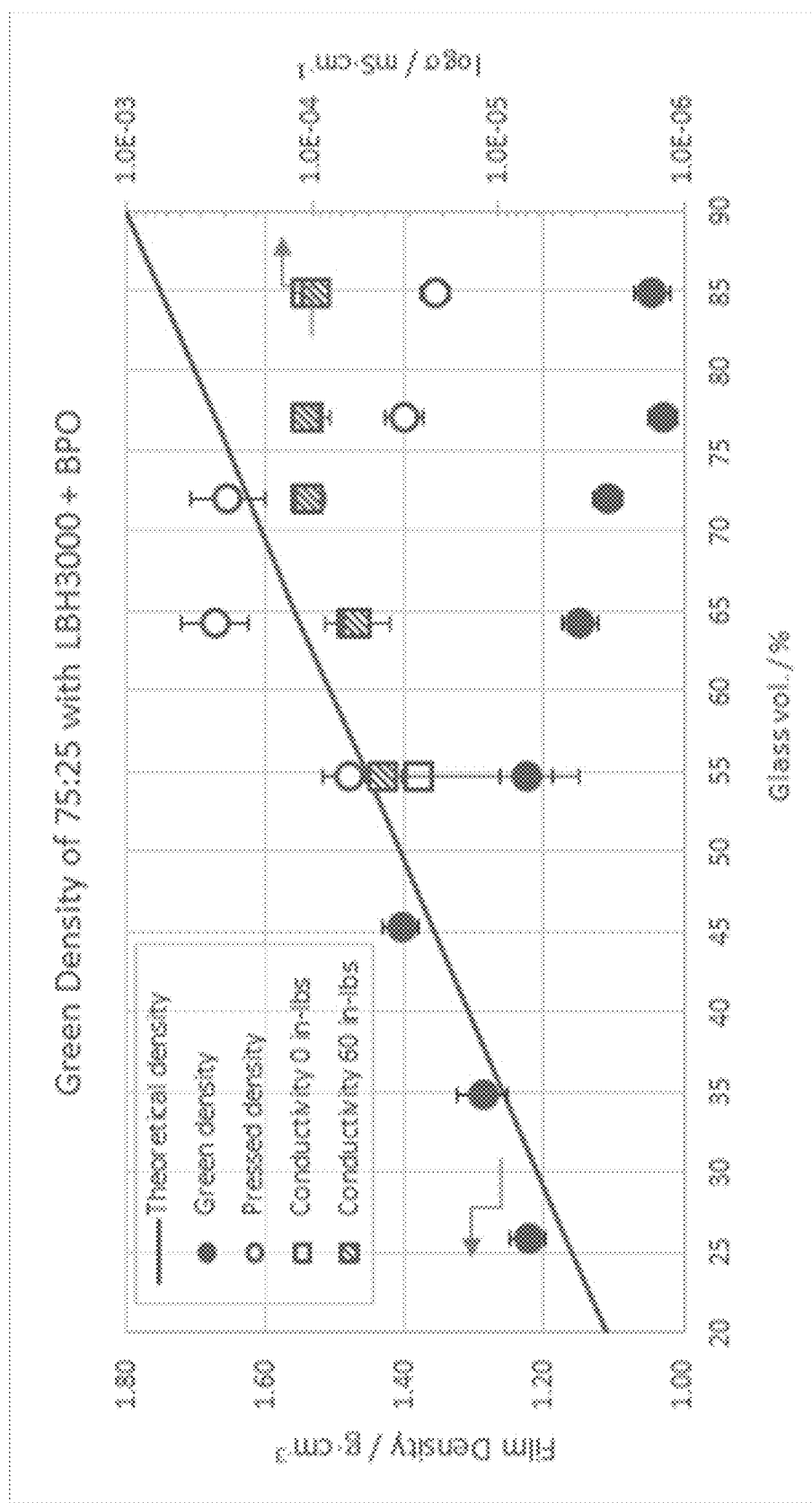
FIG. 11 is a plot showing a) film density before and after cross-linking composites according to certain embodiments under pressure and b) conductivities of pressed composites according to certain embodiments measured at 0.1 MPa and 50 MPa.

TGA is used to provide additional indication that the polymerization reaction occurred. See FIG. 10. Four samples: pure sulfide glass (labeled 'D'), the non-treated thin film (labeled 'B'), and the film heated at 100° C. (labeled 'A') and 140° C. (labeled 'C'), are analyzed by isothermal TGA, at 100° C. for 100 mins. The pure glass (D) is stable and shows no weight loss at 100° C. The non-treated hybrid (loses about 1.34% of its weight which closely correlates with the theoretical value of 1.25 wt. %. This number assumes a complete dissociation of all diisopropylamine molecules from MDI-DIPA. When treated at 100° C. and 140° C., that weight loss changes to 0.31% and 0.24% respectively, indicating on the polymerization reaction and DIPA evaporating from the system. The values of weight loss, however, may suggest limited un-blocking efficiencies (75% and 82%) of MDI-DIPA, uncomplete evaporation of free diisopropylamine or insufficient fraction of alcohol groups in the pre-polymerized matrix.

Example 3: In-Situ Polyurethane Synthesis

An example of a synthesis of a linear polyurethane sulfide glass composite according to an embodiment is shown below in Scheme 3.1.

Scheme 3.1: Synthesis of a linear polyurethane sulfide glass composite

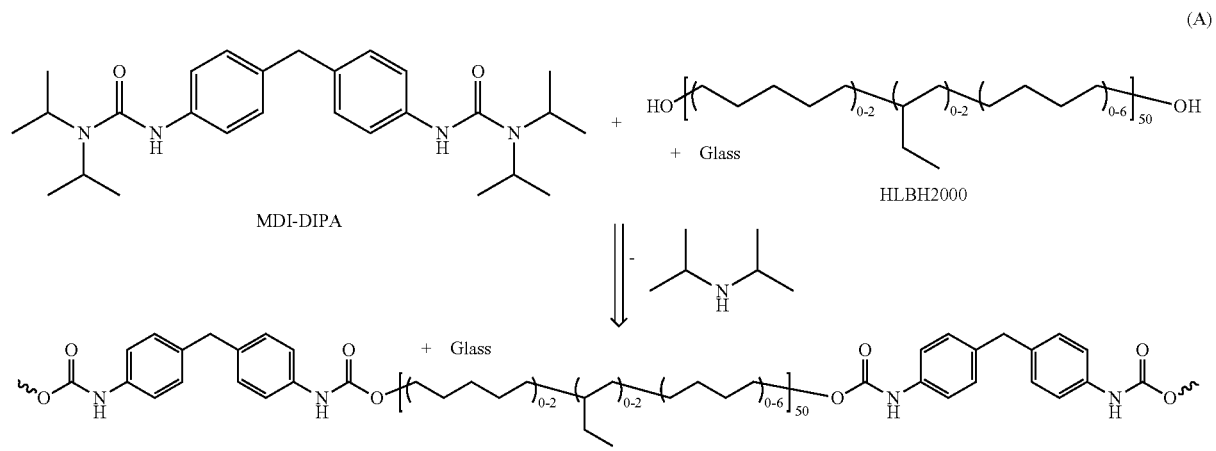

An example of a synthesis of a cross-linked polyurethane sulfide glass composite according to an embodiment is shown below in Scheme 3.2.

Scheme 3.2: Synthesis of a cross-linked polyurethane sulfide glass composite

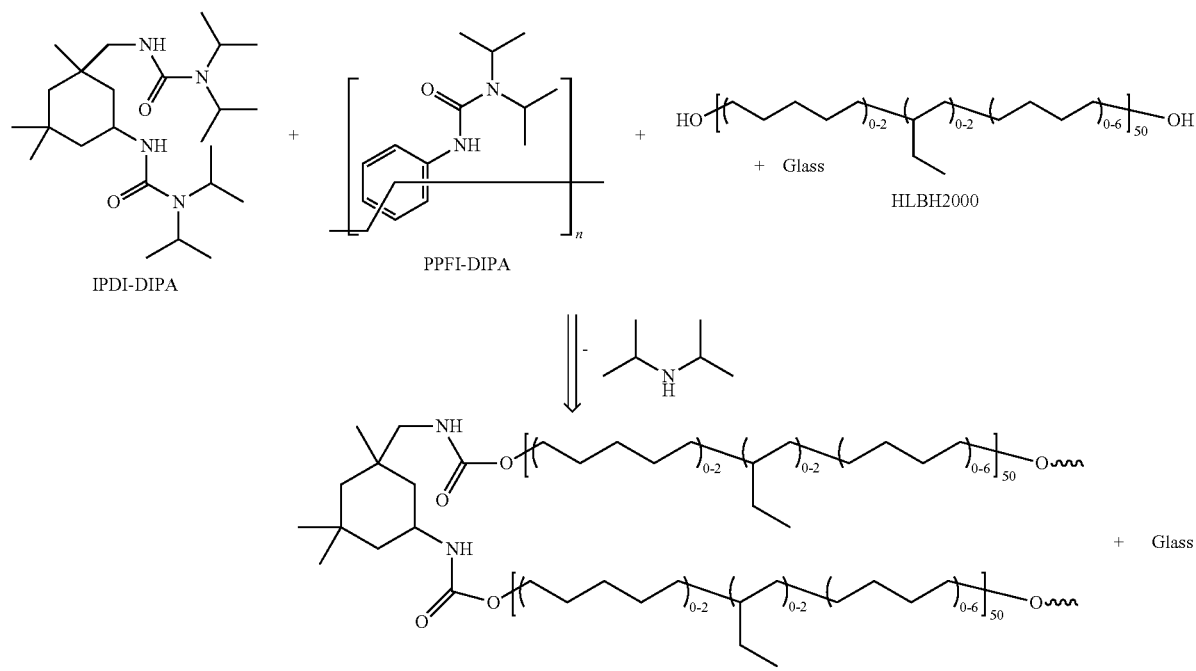

In a glovebox operating under argon atmosphere, a 30 mL Thinky cup was filled with 2.550 g of lithium sulfide glass (Li2S:P2S5=75:25) sieved to <25 μm. A 25 wt. % solution of HLBH2000 mixed with PPFI-DIPA and IPDI-DIPA (1:9=n:n, NCO) in 1:1 molar ratio was prepared in 1,2,4-trimethylbenzene and dried over molecular sieves before use. Next, 1.80 g of dried stock solution was added to the glass, followed by 6 Ø=5 mm zirconia balls and 0.25 g of 1,2,4-trimethylebenzene. The cup was placed in a Thinky mixer (Thinky ARV-SOLED) and mixed at 1500 rpm for 40 mins. Next, the mixture was coated on aluminum foil using a square applicator with 8 mil gap size, the solvent evaporated under ambient conditions and then the film was further dried in an antechamber under vacuum at room temperature for 16 hrs. Afterwards, a 50 mm×70 mm piece of the film was cut out, placed between two sheets of aluminum foil and pressed at 140° C. for 2 hrs, under 16.8 MPa using a hydraulic press. The cross-linked film was cooled down to room temperature, and only then the pressure was released.

Example 4: Polyurethane Crosslinking as a Function of Inorganic Particle Content Polyurethane composite films of different polymer compositions were prepared and characterized as described in Example 7. The results are shown in Table 4, below.

TABLE 4

Polymerization of Polyurethane matrix compositions

| Sample | Inorganic wt. % | Polymer composition | Processing | $10^{-4}$ cond./S cm$^{-1}$ 0.1 MPa | 50 MPa |
|---|---|---|---|---|---|
| PU-1.1 | 62.5 | HLBH2000, | 100° C., 48 hrs | ~0.001 | ~0.003 |
| PU-2.1 | 70 | IPDI-DIPA:PPFI-DIPA (9:1, n/n) | 140° C., 2 h, 6 tons | 1.25 | 1.14 |
| PU-4.1 | 85 | | | 1.97 | 2.22 |
| PU-5 | 85 | HLBH2000, | Dried | 0.02 | 0.67 |
| PU-5.1 | | MDI-DIPA | 140° C., 2 h, 6 tons | 1.03 | 1.12 |

Example 5: Dual Cure Polymerization

Isophorone diisocyanate-diisopropylamine (IPDI-DIPA) is a blocked diisocyanate that acts as a difunctional monomer in polyurethane formation and can only participate in formation of higher molecular weight, linear polymers. A DSC trace of IPDI-DIPA (not shown) indicates a presence of two endotherms, at about 75° C. and 100° C., and confirms a step-wise decomposition of blocked diisocyanate (Scheme 5.1) with a release of two diisopropylamine molecules per IPDI-DIPA.

Scheme 5.1: Mechanism of thermal, step-wise decomposition of IPDI-DIPA

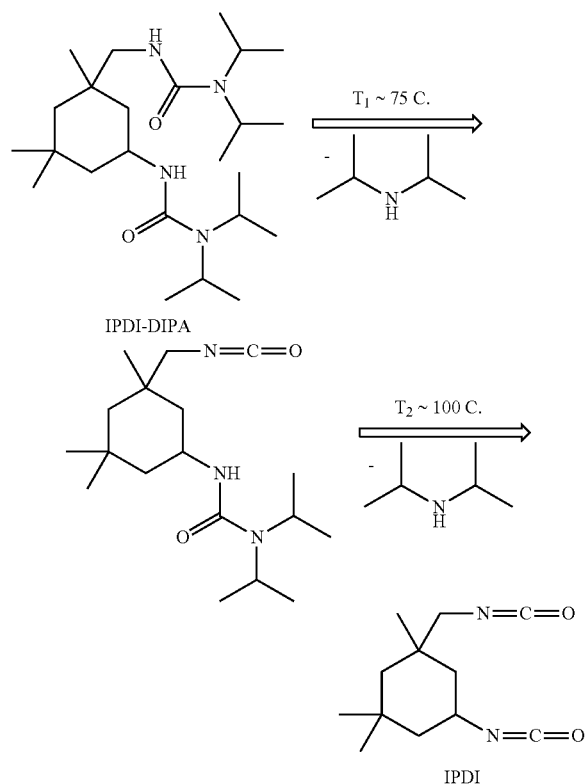

Poly[(phenyl isocyanate)-co-formaldehyde] (PPFI-DIPA) is a blocked trifunctional isocyanate, that acts as a cross-linker during in-situ polyurethane formation, and is responsible for the formation of a polymer network. A DSC trace of PPFI-DIPA (not shown) shows a presence of three endotherms, at about 140° C., 165° C., and 190° C. The peaks correspond to a consecutive loss of three diisopropylamine molecules per one PPFI-DIPA, and confirms a step-wise decomposition of blocked cross-linker (Scheme 5.2).

Scheme 5.2: Mechanism of thermal, step-wise decomposition of PPFI-DIPA

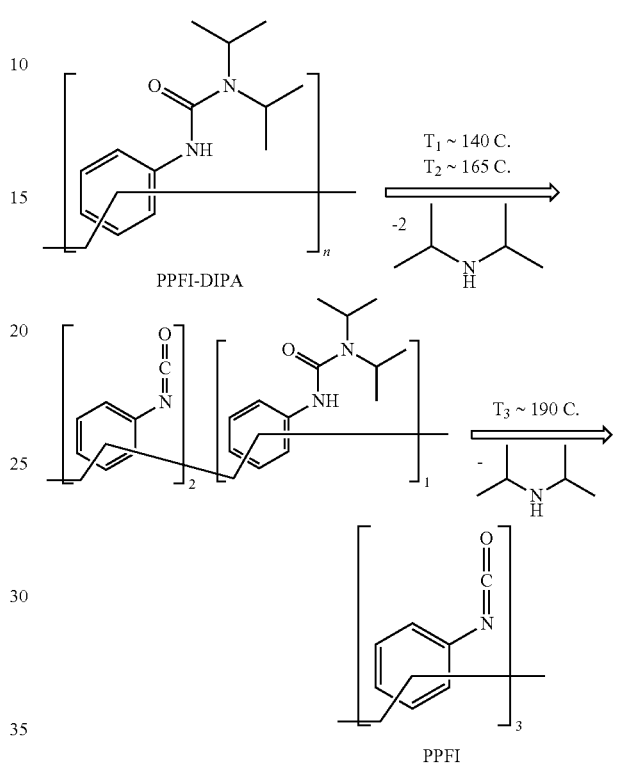

Figure 12:
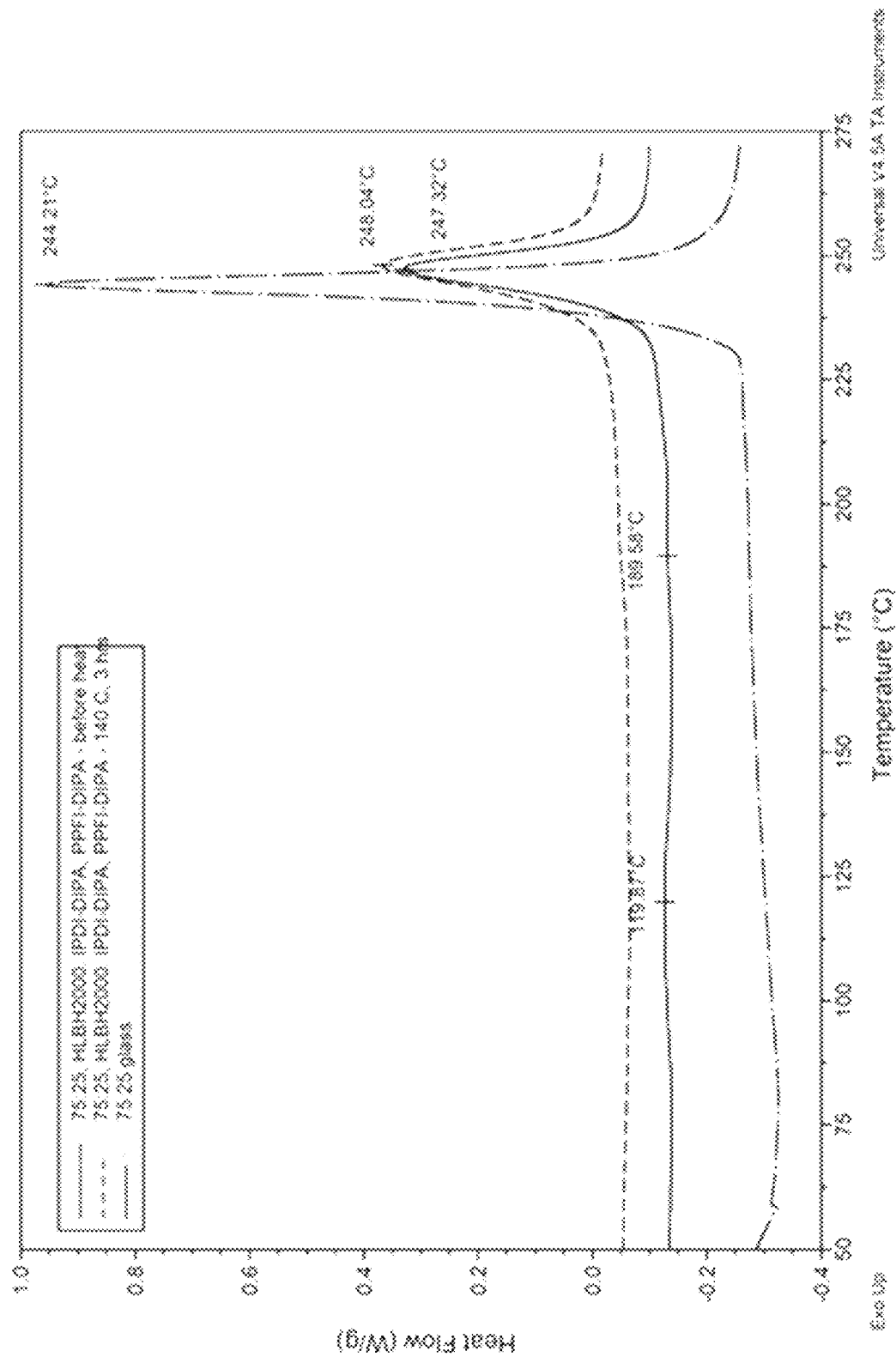
FIG. 12 shows DSC traces of pure $Li_2S:P_2S_5=75:25$ sulfide glass and a composite formed from the sulfide glass, isophorone diisocyanate-diisopropylamine (IPDI-DIPA), and poly[(phenyl isocyanate)-co-formaldehyde] (PPFI-DIPA) before and after in-situ polymerization of a polyurethane matrix of the composite.

FIG. 12 shows DSC traces of pure Li2S:P2S5=75:25 sulfide glass (dash dot) and a composite formed from the sulfide glass, IPDI-DIPA, PPFI-DIPA before (solid) and after) in-situ polymerization of a polyruethane matrix of the composite. In all cases, the exothermic peak related to glass crystalization appears at about 245-250° C., which indicates a very good resistance of glass to crystallization in both pre- and polymerized organic matrix.

Figure 13:
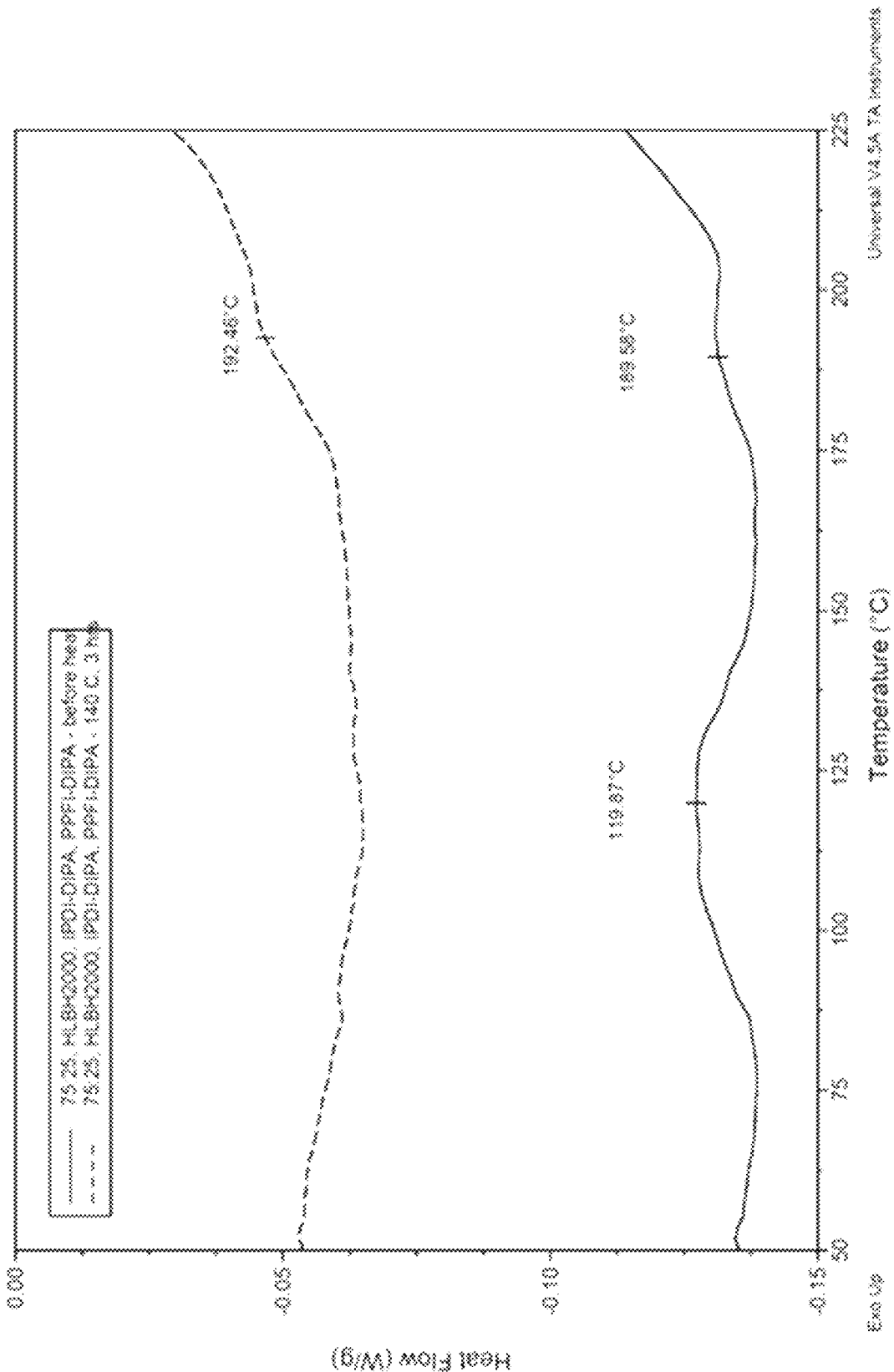
FIG. 13 shows magnified DSC traces of the composite of FIG. 12 before and after thermal crosslinking at 140° C.

FIG. 13 shows magnified DSC traces of the composite before (solid) and after (short dash) thermal crosslinking at 140° C. It can be seen that there are two broad exotherms, at about 120° C. and at about 190° C., in pre-polymerized matrix hybrid, which is possibly related to two-step curing of polyurethane network. The lower temperature exotherm (75° C.-150° C. range) may involve mostly curing with difunctional isocyanate (IPDI-DIPA), and hence the formation of higher molecular weight, linear polyurethane, whereas the second exotherm (175° C.-210° C.) is a result of the reaction with the cross-linker and a formation of a polyurethane network. This is evidenced by the DSC trace of the composite after curing at 140° C. (short dash). The trace shows no endothermic peaks at up to about 175° C., which provides evidence that the first step of curing (formation of higher molecular weight polyurethane chains) was completed during curing at 140° C. The endotherm signal at 175° C.-200° C. indicates that not all reactive components have reacted. Thus, the DSC after curing at 140° C. provides strong evidence that fully cross-linked polyurethane matrix can be prepared as the composite is heated to 175° C. and above, as it shows that below that temperature not all blocked isocyanate groups undergo deprotection.

In addition, decomposition temperature obtained from DSC traces of pure blocked isocyanates, IPDI-DIPA and PPFI-DIPA (not shown), correspond well to reaction endotherms observed in pre-polymerized composite. The DSC of pure PPFI-DIPA shows that the release of the last (third) isocyanate group (that allows the PPFI-DIPA to act as a cross-linker) does not start until about 175° C. and has its minimum about 190° C. (short dash). Both temperatures overlap respectively with the onset and maximum temperature of the second reaction endotherm observed in pre- and post-polymerized composites (solid and short dash) in FIGS. 12 and 13.

Example 6: Effect of Processing on Composite Conductivity

Composite polyurethane films were cast on various substrates and with various processing techniques. The conductivity of each sample film was measured under pressure. The processing techniques are as follow:
(A) Heating without applied pressure
(B) Heating under applied pressure
(C) Cold pressed, followed by heating without applied pressure
The results are in Table 5, below.

TABLE 5

Effect of Processing on Conductivity

| Sample | Process | Substrate | Step 1 Load (tons)/$T_{press}$ (° C.) | Step 2 $T_{cure}$ (° C.) | $10^{-4}$ cond./S cm$^{-1}$ (50 MPa) |
|---|---|---|---|---|---|
| 6.1 | A | Al | N/A | 140 | 0.14 |
| 6.2 | B |  | 12/140 | N/A | 1.00 |
| 6.3 | C | Teflon ® | 12/25 | 140 | 0.22 |
| 6.4 | B |  | 12/140 | N/A | 0.81 |
| 6.5 | B | PET | 12/140 | N/A | 0.81 |

Three types of casting substrates were tested: aluminum (Al) foil, Teflon®, and polyethylene terephthalate (PET). Non-conducting substrates (Teflon® and PET) produced free-standing film hybrids with similar conductivities that were lower than the conductivity of single-sided film coated on an aluminum substrate, as can be seen by comparing samples 6.4 (Teflon®) and 6.5 (PET) with sample 6.2 (Al). The difference in conductivities is attributed to differences in interfacial contact between the electrolyte film and electrodes during the conductivity measurements, rather than changes in morphology of the composite as a result of the different casting substrate.

The results in Table 5 also show the effect of the processing order and the effect of pressure and temperature on the conductive properties of the resulting film. In particular, the results indicate that pressure applied on a sample enables a good film densification and reduction of porosity, which improves particle-to-particle contact and the conductivity. This is confirmed by the higher conductivity of a sample that was pressed before curing (sample 6.3), as compared to the green composite film that was cured without exposure to external pressure during any post-processing steps (Sample 6.1).

A more unexpected effect is observed when the temperature and pressure are combined in one processing step. The temperature not only cures the polymer matrix, but it enables a lowering of the viscosity of organic matrix components and drastically improves the flow of particles, allowing for a better densification and improved contact between glass particles. As a result, the highest conductivity is observed when the composite is cured at elevated temperatures when the external pressure is applied (sample 6.2).

Example 7: Capping of Isocyanates With Different Blocking Agents

Two blocking agents were analyzed: methyl ethyl ketoxime (MEKO) and diisopropylamine (DIPA). Methylene diphenyl diisocyanate (MDI) was reacted with both, MEKO and DIPA, giving blocked diisocyanates, MDI-MEKO (Scheme 7.1) and MDI-DIPA (Scheme 1.1). Syntheses of the respective blocked isocyanates are described in Example 7.1 and Example 1, Part 1.

Example 7.1: Synthesis of Methyl Ethyl Ketone-Blocked 4,4-diisocyanatodiphenylmethane (MDI-MEKO)

10.0 g of 4,4-diisocyanatodiphenylmethane (MDI) was weighted out in a glovebox and placed in a dry 250 mL round-bottom flask equipped with a stir bar, followed by the addition of 120 mL of anhydrous toluene. The flask was sealed with a rubber septum and placed on a stir plate under nitrogen flow. Next 7.6 mL of dry diisopropylamine (DIPA) was slowly added to the mixture over 5 mins. As the mixture progresses a phase separation of the product from the solution was observed. The mixture was stirred at room temperature overnight, then the solvent was removed under vacuum resulting in a white solid. The product was dried under vacuum at 60° C. for 24 hrs.

Scheme 7.1: Synthesis of MDI-MEKO blocked diisocyanate

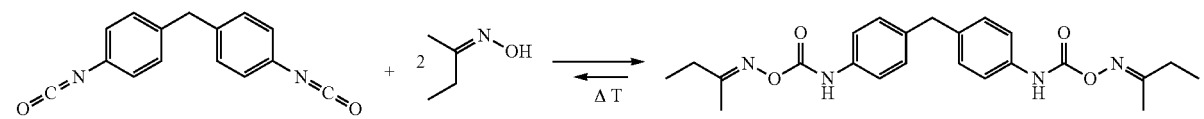

Example 7.2: Thermal Stability of MDI with Different Blocking Agents

DSC and TGA were employed in assessment of the thermal stability of blocked isocyanates. For both blocked isocyanates, DSC analyses show two thermal transitions below 200° C. (endotherms or exotherms) associated with the loss of two moles of blocking agents, one per each isocyanate functionality. TGA analyses showed that temperatures around 190° C. and 140° C. may be used to cure hybrids with MDI-MEKO and MDI-DIPA respectively. The difference in curing temperatures is related to boiling points of MEKO ($T_{bp}$=152° C.) and DIPA ($T_{bp}$=84° C.). Different temperatures are required to remove side products of de-blocking process from polymer matrix as observed by weight loss in TGA analyses and higher boiling point of MEKO. As discussed above, the boiling point of the blocking agent can inform the processing temperature.

Based on the TGA and DSC data, diisopropylamine as a blocking agent uses similar temperature for de-blocking as MEKO. However, the temperature to remove DIPA from matrix after de-blocking is significantly lower than that of MEKO, hence it is much easier to remove from the matrix post-polymerization. In some embodiments, DIPA may be accordingly more suitable as a blocking agent.

Example 8: Solubility of Diisocyanates Blocked with Diisopropylamine

Figure 17:
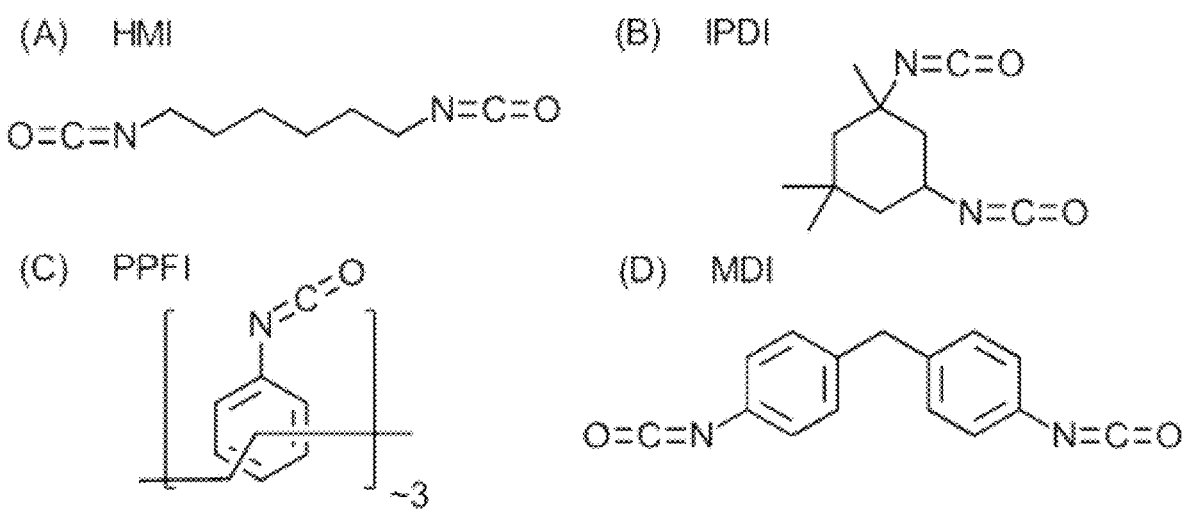
FIG. 17 shows structures of example isocyanates.

Several commercially available isocyanates with different chemical structures were selected and reacted with diisopropylamine as a blocking agent. Two aliphatic isocyanates, isophorone (IPDI) and hexamethylene (HMI) diisocyanates, and two aromatic isocyanates, poly[(phenyl isocyanate)-co-formaldehyde] (PPFI) and 4,4-diisocyanato-diphenylmethane (MDI) were analyzed. The structures of each are shown in FIG. 17. The synthesis of a representative MDI-DIPA is provided in Example 1.1 and of IPDI-DIPA below in Example 8.1.

The solubility of the DIPA-blocked isocyanates in aromatic solvents was tested by mixing 2 g of material with 10 g of toluene. Only IPDI-DIPA had good solubility in toluene, whereas HMI-DIPA is practically insoluble. The aromatic blocked isocyanates, MDI-DIPA and PPFI-DIPA, showed partial solubility in toluene, sufficient if small concentrations of blocked isocyanates in slurries are used, such as in case of cross-linkers.

Example 8.1: Synthesis of Diisopropylamine-Blocked Isophorone Diisocyanate (IPDI-DIPA)

30.0 g of isophorone diisocyanate (IPDI) was weight out in a glovebox and placed in a dry 500 mL flask equipped with a stir bar. Next, 300 mL of anhydrous hexanes was added to the isocyanate. The flask was closed with a rubber septum and stirred under a constant flow of nitrogen. Next 40 mL of dry diisopropylamine (DIPA) was added in small portions to the mixture over 15 mins. As the mixture progresses a phase separation of the product from the solution was observed. The mixture was stirred at room temperature for 16 hours. The product precipitated out from the solution in the form of white solid. The powder was filtered off, washed with small amounts of hexanes and then dried under vacuum at 60° C. for 24 hrs.

Scheme 8.1: Synthesis of IPDI-DIPA blocked diisocyanate

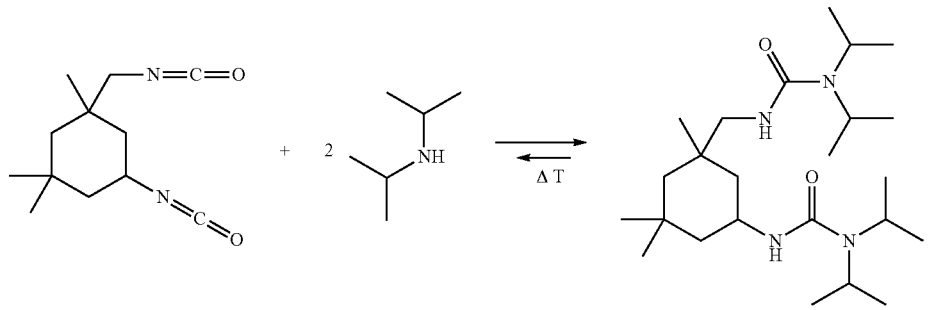

Example 9: Thermal Properties of DIPA-Blocked Isocyanates

Figure 18:
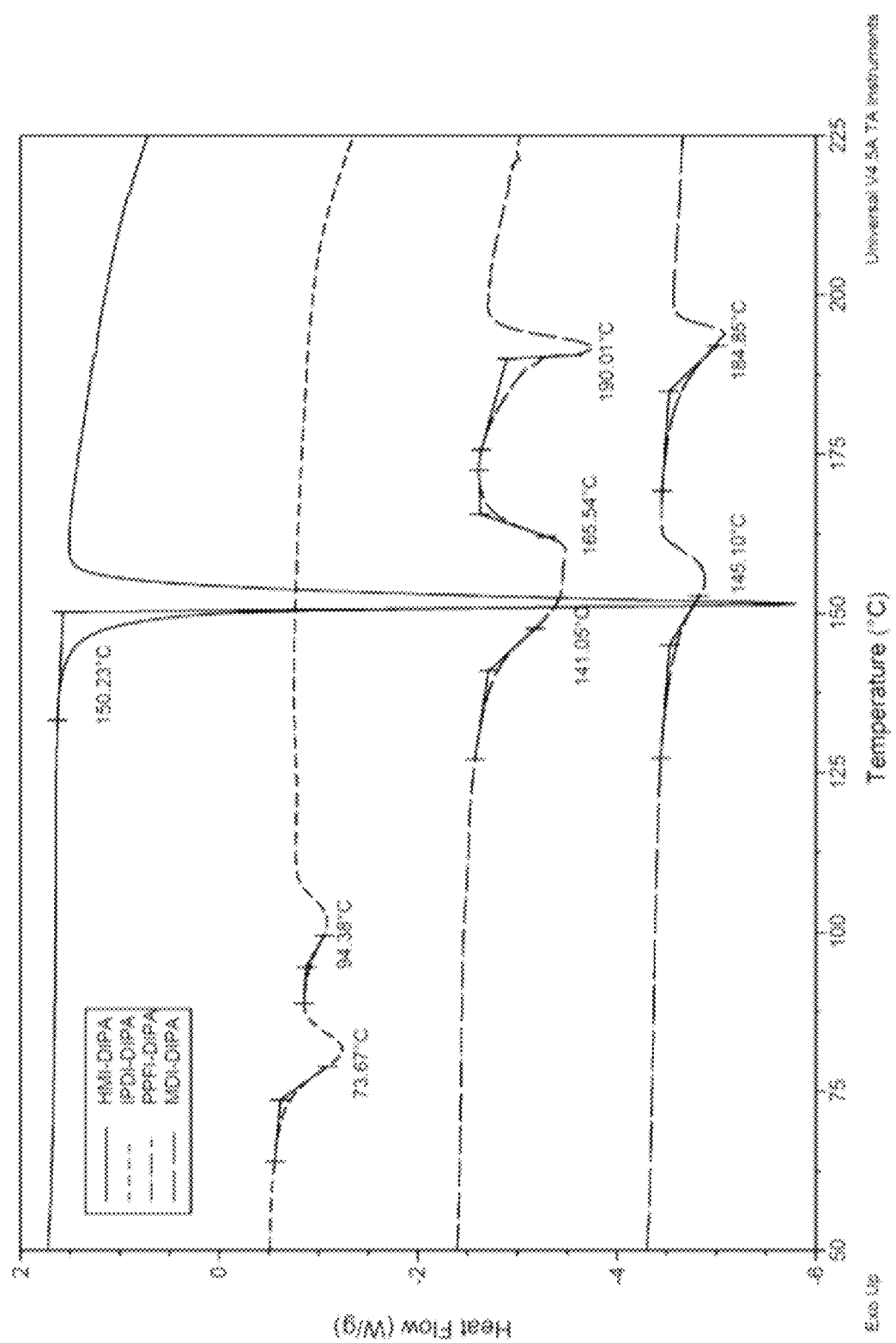
FIG. 18 shows DSC thermograms of example blocked isocyanates.

Thermal stabilities of four DIPA-protected isocyanates were determined via DSC analysis. FIG. 18 shows DSC thermograms of HMI-DIPA, IPDI-DIPA, PPFI-DIPA and HMI-DIPA obtained for the heating rate of 10° C./min. As can be seen, the thermal stability of DIPA-blocked isocyanates is largely dependent on the chemical structure of the starting isocyanate. HMI-DIPA (solid line) displayed only one, very sharp, endothermic transition at about 150° C. It is related to a simultaneous loss of both blocking agents from isocyanate groups, which indicates an equal reactivity of both functional groups (Scheme 9.1A). Both aromatic isocyanates, PPFI-DIPA and MDI-DIPA, showed alike thermal decomposition behaviors ascribed to their similar compositions; PPFI-DIPA and MDI-DIPA are basically a trimer and a dimer of methylene phenyl isocyanate. DSC thermograms of PPFI-DIPA (dashed line) and MDI-DIPA (long dashed line) display two distinct transitions at about 150° C. and 190° C. In case of MDI-DIPA, each endotherm corresponds to the loss of one blocking agent (Scheme 9.1D). However, in case of PPFI-DIPA, the first endotherm is broader, which is the result of an overlap of two decomposition signals from de-blocking of two isocyanate functionalities having similar reactivities (Scheme 9.1C).

Scheme 9.1: Thermal decomposition pathways for HMI-DIPA (A), IPDI-DIPA (B), PPFI-DIPA (C) and HMI-DIPA (D) blocked isocyanates.
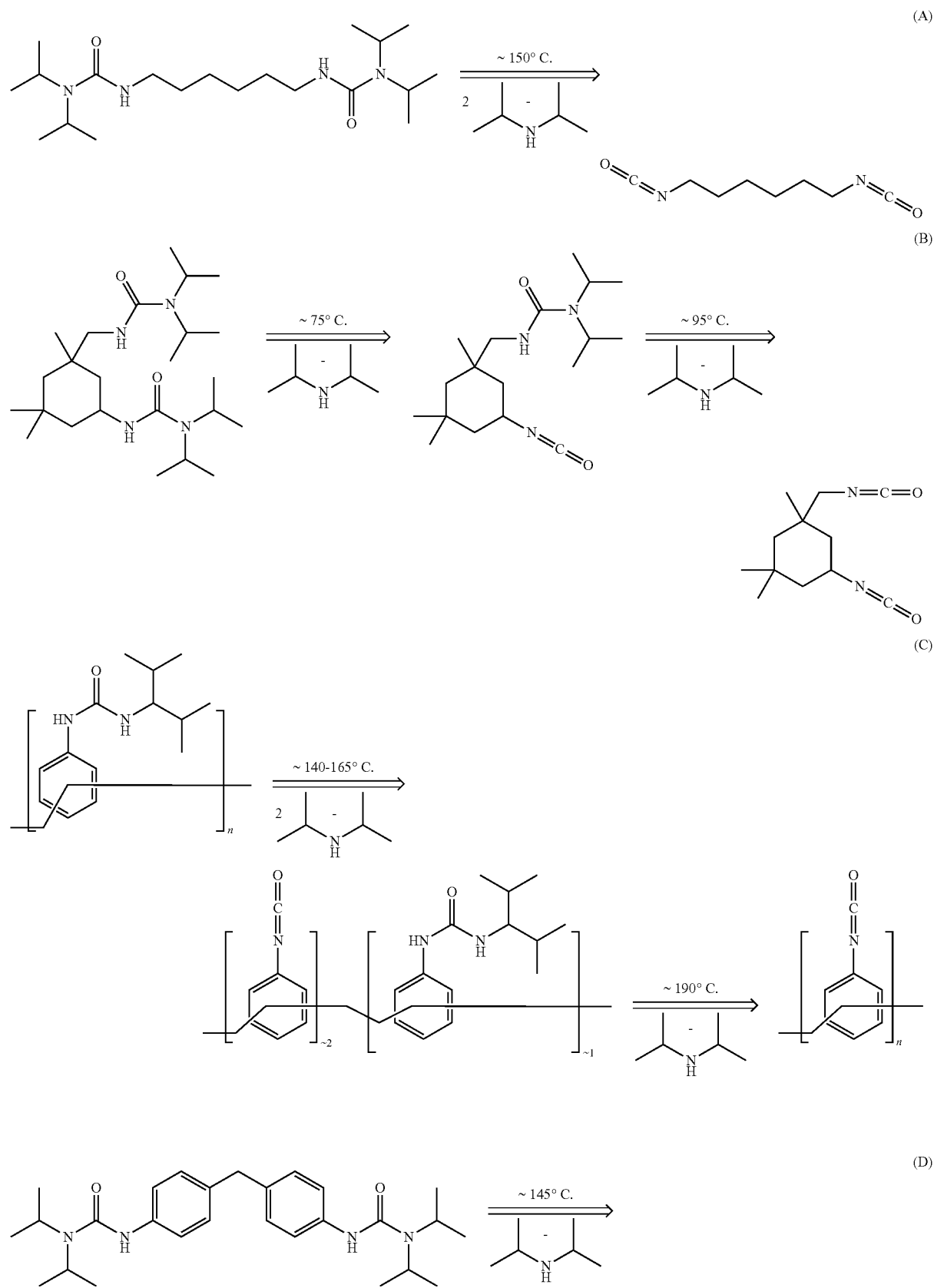

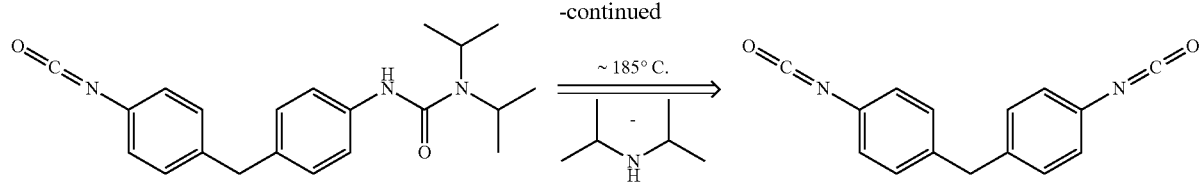

Interestingly, IPDI-DIPA showed a significantly different thermal decomposition pattern in comparison to other tested isocyanates (short dashed line, Figure Y). There are two decomposition endotherm peaks at ~75° C. and 95° C. corresponding to different reactivity secondary and primary isocyanate groups (Scheme 8.2B). In addition, the overall thermal stability is about 50° C. lower than that of any other tested isocyanate. The phenomenon may be ascribed to the cyclic, aliphatic structure of isophorone that introduces significant steric hindrance and might be having a destabilizing effect on thermal behavior of IPDI-DIPA.

Example 10: In-Situ Crosslinked Composite Films of Varying Organic Content

A series of composites of $Li_2S:P_2S_5=75:25$ glass and a different weight fraction of organic phase was prepared using the scheme shown in FIG. 4B. The ratio of hydroxyl-to isocyanate groups was 1:1 (n/n) and, the fraction of the cross-linker was set to 10 mol. % of total isocyanates content. Composites containing an organic polyurethane matrix at wt. %: 15, 25, 27.5, 30 and 35, were prepared as slurries and cast into thin films using a doctor blade technique. All films were analyzed via DSC to track and confirm curing of organic matrix; in each case, there was an exothermal peak ~240° C. corresponding to glass crystallization, which was consistent with crystallization temperature of pure glass material. The DSC curves showed of uncured composite films revealed presence of very broad, weak exotherms in range 80-140° C., which are ascribed to deblocking/polymerization reactions that occur in polymer matrix during the curing process. The intensity of the signal was directly proportional to the amount of pre-polymerized matrix in tested hybrid, and increased at higher loadings of organic components. The DSC data collected was used to establish the appropriate curing temperature of 'in-situ' generated cross-linked polyurethanes. The temperature above the average maximum of all collected isotherms, 140° C., was chosen to cure all films.

Each film was processed under the same conditions, by heating the films at 140° C. for 3 hrs in a vertical press, while applying constant pressure of 15 MPa during the entire curing process. The occurrence of polymerization was confirmed by both DSC and TGA analyses. DSC traces of 25 wt. % PU hybrid before and after curing are shown below confirmed the disappearance of reaction exotherm after curing, proving the completion of the polymerization reaction. In addition, TGA was used to track the change in weight loss during isothermal heating at 140° C. Thermograms of 25 wt. % PU hybrids before and after curing showed respective weight losses of about 2.6% and of about 0.75%. Assuming no solvent residue is present in uncured hybrid, any weight loss observed should be the result of de-blocking of isocyanates and evaporation of DIPA side-product; hence no or little change in weight loss of cured polyurethane hybrid film is a solid indication that the 'in situ' polyurethane formation has successfully occurred.

Conductivities of all samples were measured at room temperature. The conductivity was measured as an average of conductivities of three discs cut out from the film using a 15 mm die cutter. A single disc was pressed between two stainless-steel die pieces used as electrodes, in a tight-fitting Teflon collar used to prevent shorting and ensure good alignment of electrodes. The set-up was then pressed at 50 MPa to provide a sufficient interfacial contact between two electrodes and the electrolyte film. The resistance of the film was measured using Autolab PGSTAT101 potentiostat. The thickness of the film was taken as an average of three thicknesses measured across the disc using a micrometer. The conductivity of the hybrid was determined as an average of three measurements done on separate sample specimens.

Figure 19:
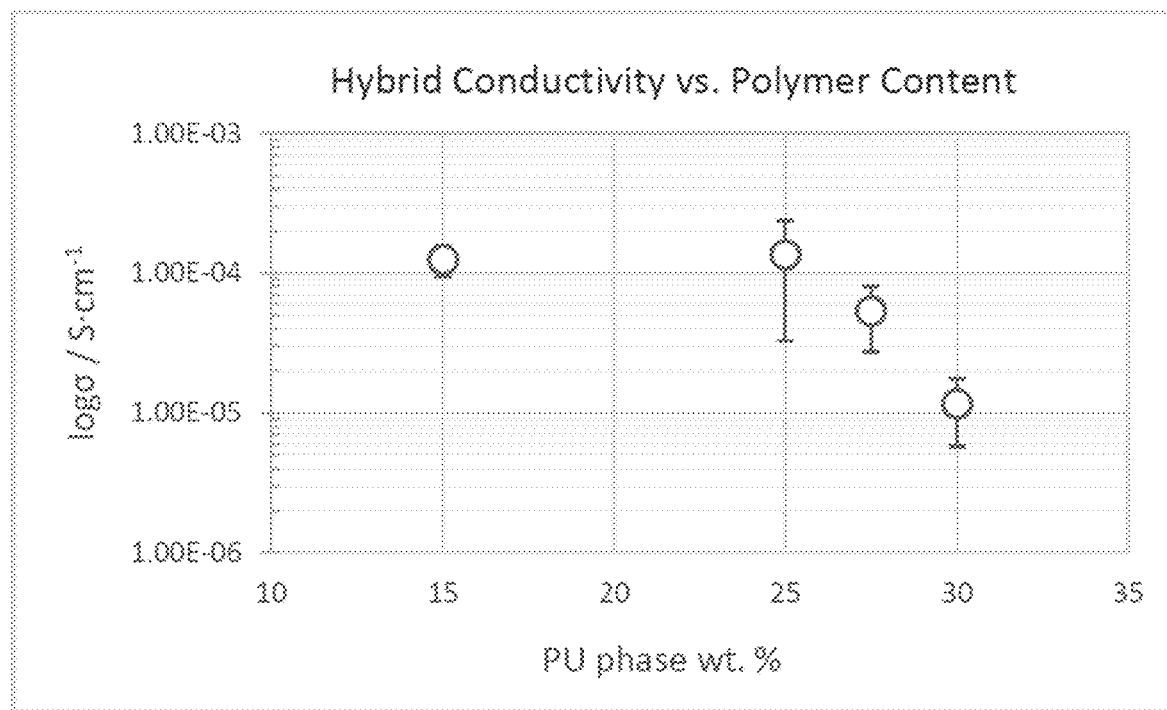
FIG. 19 is a plot showing conductivity of hybrid electrolytes with different weight fractions of polymer content measured at room temperature under 80 MPa pressure.
Figure 20:
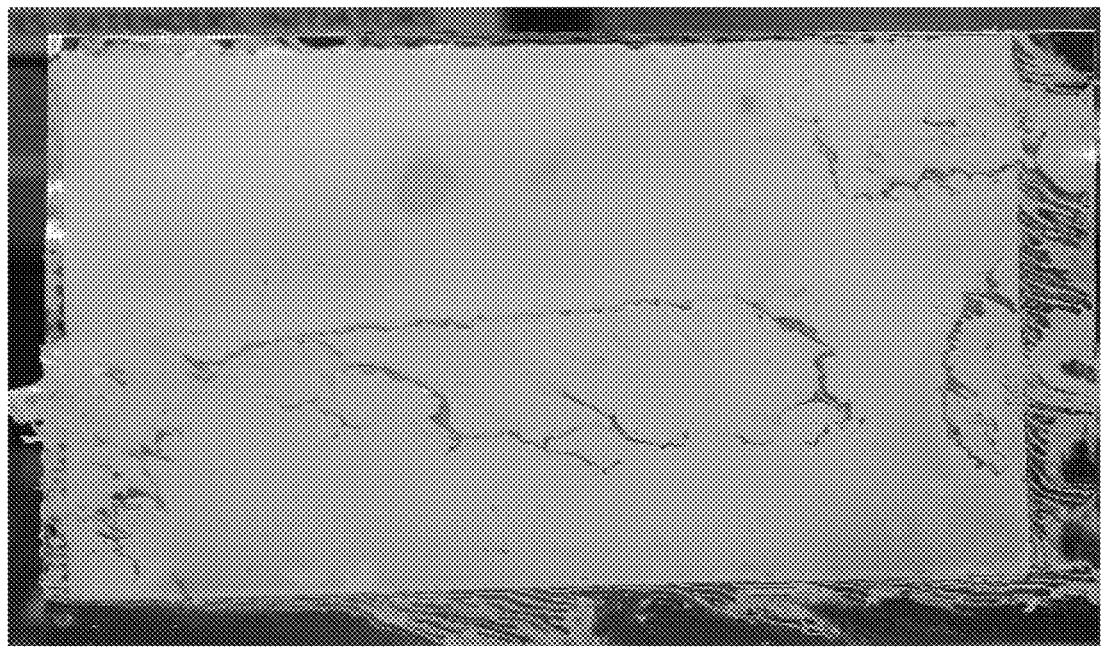
FIG. 20 is digital image of a composite containing 30 wt. % of polyurethane phase composed of HLBH-P 2000, IPDI-DIPA and PPFI-DIPA, pressed at 140° C. under 15 MPa, for 3 hrs.

FIG. 19 represents the effect of polymer content on measured average conductivity of a composite. The range of conductivities for composites with 15-30 wt. % of polyurethane was between 0.01 and 0.1 mS/cm at room temperature. The higher the polymer content, the lower the conductivity measured for a hybrid. In addition, large variations between measurements collected per a single sample was observed. The difference varied from ±25% for 15 wt. % polyurethane (PU) film, to as high as ±50-75% for higher loading of polymers. The large discrepancies between measurements were ascribed to inhomogeneity of material within hybrid films. The heterogeneity of material distribution was largely attributed to the change in viscosities during processing steps. The heating of the composite during the curing step leads to large changes in viscosities. On one hand, it allows for proper flow of the material under pressure, good densification and reduction of porosity. However, very low viscosities might cause a phase separation of inorganic particles from polymer matrix, or even worse, lead to a 'leakage' of organic components from hybrid film under applied pressure as shown in the image of FIG. 20.

Example 11: Effect of Molecular Weight of Polymer Diol on In-Situ Cross-linked Polyurethane Composites Polyurethane composites containing HLBH 2000 as polymer diol (MW of about 2000) have issues with inhomogeneity when cured under pressure and elevated temperature. As discussed in Example 9, this can be ascribed to the high flow of materials during processing, which results in 'squeezing out' and/or deformation of composite thin films. The flow distribution of the material under heat and load largely depends on the viscosity of the entire system, which in turn is strongly related to the viscosity of the polymer diol present in the organic matrix. The effect of molecular weight of polymer diol on the performance of resulting hybrids was tested. A series of polymer diols with four degrees of polymerization (DPs), 3, 5, 9 and 15, were prepared to cover a range of molecular weights between 2 and 30 kDa. Polymer diols with varying molecular eights were synthesized in form of pre-polymers, short polyurethane oligomers, prepared in an ex-situ polymerization reaction of HLBH 2000 and IPDI isocyanate (see FIG. 4A).

The pre-polymers were analyzed via GPC to determine apparent molecular weights. Table 7 summarizes number average molecular weights ($M_n$) along with calculated average degrees of polymerization of obtained pre-polymers. With an exception of targeted DP of 9, there was a very good correlation between targeted and calculated DPs of synthesized pre-polymers.

TABLE 7

GPC characterization of pre-polymers prepared from HLBH2000 and IPDI

| Sample | $M_n$ | $M_w$ | $M_w/M_n$ | $DP_{calc}$ |
|---|---|---|---|---|
| HLBH2000 | 3,063 | 3,472 | 1.13 | 1 |
| P(HLBH2000)3 | 11,963 | 19,423 | 1.62 | 3.8 |
| P(HLBH2000)5 | 20,094 | 35,836 | 1.78 | 6.3 |
| P(HLBH2000)9 | 85,410 | 179,787 | 2.11 | 27 |
| P(HLBH2000)15 | 52,224 | 112,793 | 2.16 | 16 |

Figure 21:
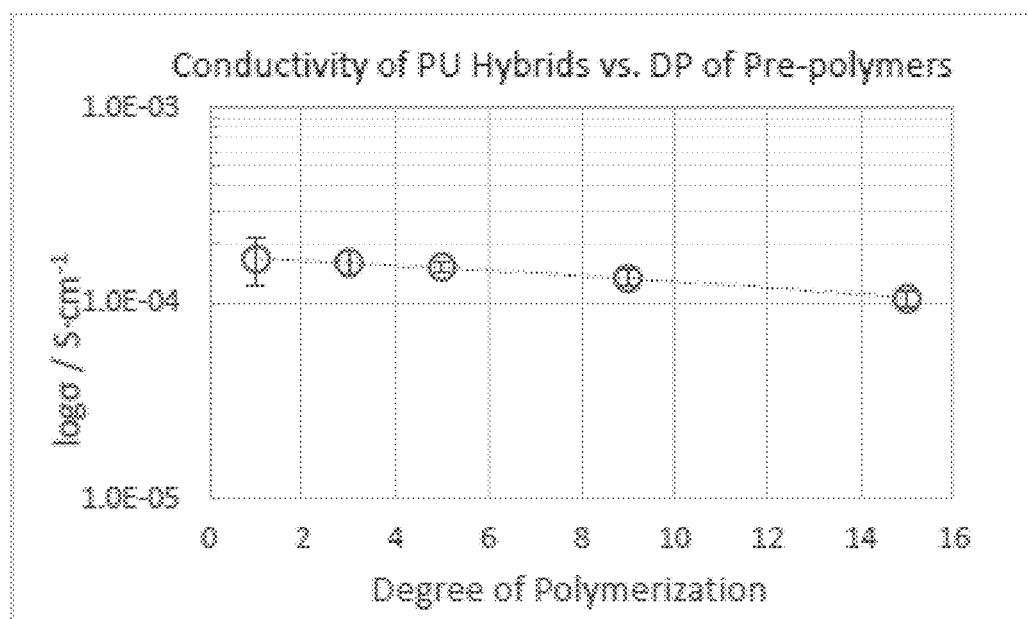
FIG. 21 is a semi-log plot of conductivities of composites vs degree of polymerization of an example oligomer diol used to form the polyurethane matrix in the composites.

Next, composite electrolytes were prepared from synthesized pre-polymers. $Li_2S:P_2S_5=75:25$ glass was embedded in 15 wt. % of organic matrix containing IPDI-DIPA diisocyanate, PPFI-DIPA cross-linker, and one of pre-polymer diols with DP of about 3, 5, 9 or 15. The composition of pre-polymerized matrix was adjusted in such way that all cured polyurethane matrix compositions were chemically identical, independently of the molecular weight of used pre-polymers. Films were heated at 140° C. for 3 hrs under 15 MPa pressure and conductivities were measured at room temperature under 60 MPa pressure. The semi-log plot showed a linear dependence of conductivity on DP of used pre-polymer, with conductivities decreasing with increasing molecular weights of used pre-polymer diol (FIG. 21). Even with the dropping trend in conductivities with increasing DPs, values for all composites remained above 0.1 mS/cm. The trend was associated with progressively increasing viscosities of polymers with higher DPs, and hence, reduced flow of a material under heat and pressure. However, the drop in 'fluidity' of the compositions significantly changed the homogeneity of obtained composite films. The thin film with HLBH 2000 as a polymer diol was tested the discrepancy between samples was as high as 25%, and it only increased with higher loadings of organic phase. In case of the pre-polymers, the consistency of conductivity data was much better and the variations between results within a single sample was in range of only 5-10%. It indicated that a better uniformity and homogeneity of composite was obtained when a two-step method employing pre-polymers was utilized.

Example 12: Effect of Hard Phase on Polyurethane Matrix in Composites

The extent of phase separation and morphological characteristics of the domains dictates the final bulk properties of the material. The effect of the weight fraction of hard phase in polyurethane matrix on final properties of hybrid electrolytes was determined. The soft phase was composed of HLBH 2000, and hard phase of blocked isocyanate, IPDI-DIPA, small molecule chain extender, 2-ethylhexyl-1,3-diol (EDH), and triisopropanolamine (TIPA) cross-linker as shown in Scheme 11.1. Small alcohol molecules were chosen based on compatibility and miscibility with polymer diol, as well as solubility in aromatic solvents, such as toluene or xylenes.

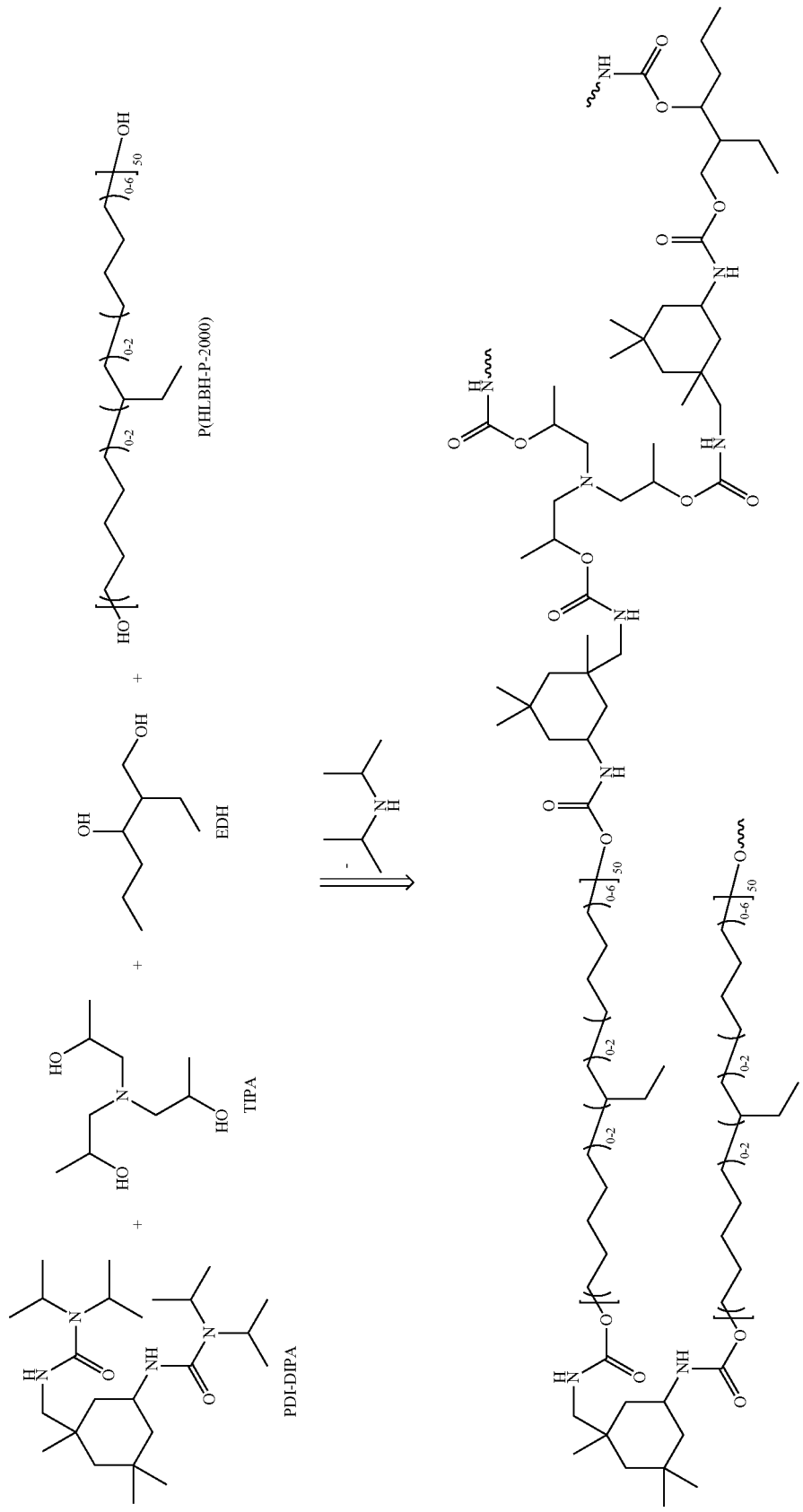
Scheme 12.1: Synthesis of polyurethane matrix containing HLBH-P 2000 as soft segment and a hard phase of EDH diol and TIPA triol.

The effect of hard phase content was tested on hybrids containing total 15 wt. % of polyurethane matrix, but varying fractions of the hard segment. In the composition with no chain extenders, the hard phase is provided by the isocyanate component only. It adds up to about 8 wt. % of total polyurethane mass and is the minimum amount of hard phase that can be incorporated into that particular composition. (If polymer diols larger than HLBH-2000 are used, the minimum amount can be lower). In addition to the composition with no chain extenders, five hybrids containing between 20 and 40 wt. % of hard phase in polyurethane phase were tested. The fraction of hard phase was controlled by varying the amounts of chain extenders incorporated into the organic phase, while maintaining the same ratio of 10 mol. % cross-linker to small molecule diol.

The green films that include hard phase components of EDH and TIPA exhibited dramatically improved mechanical properties. The composite film having only about 8 wt. % of hard phase and containing no EDH and TIPA was very powdery and prone to mechanical damage, with tweezers able to form deep scratches on the film surface. The film having 30 wt. % hard phase in the polyurethane matrix showed a much better mechanical resistance, with only gentle marks formed during similar handling as the film with 8 wt % hard phase content.

Figure 22:
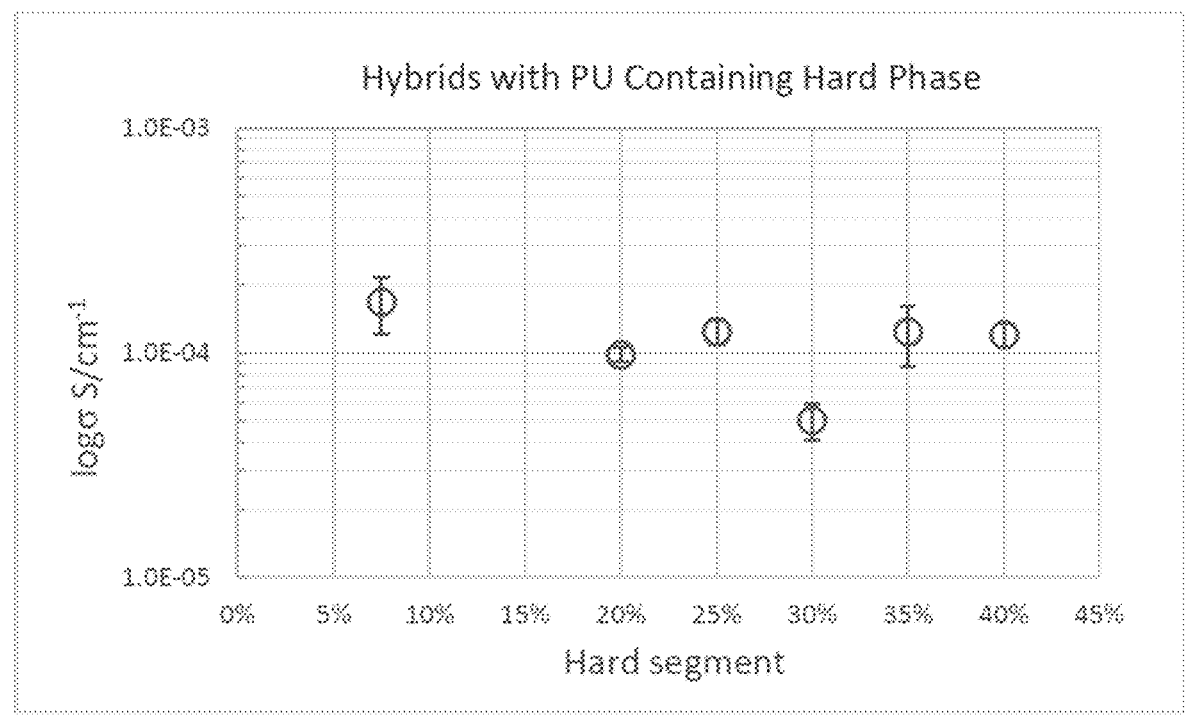
FIG. 22 is a semi-log plot of conductivities of composites containing 15 wt. % of polyurethane matrix with varying content of wt. % of hard phase in polymer phase.

All films were cast on Teflon, dried and cured by pressing at 140° C. under 15 MPa, for 3 hrs. FIG. 22 shows results of conductivity measurements of composites with different hard phase content in 15 wt. % of polyurethane matrix. No clear trend in conductivity was observed. However, is a clear tendency of composites to become harder and more brittle with increasing fraction of hard phase in polyurethane matrix. The polymer with 20 wt. % of the hard phase showed optimal mechanical properties and conductivities and was used as a baseline for further testing.

The films, fabricated without pre-polymers in a one-step processing operation, demonstrated the same issues as with other composites prepared without pre-polymerization, namely being too soft and tending to squeeze out under pressure.

Example 13: Two Step Processing With Hard Phase

To further improve processing, homogeneity and reproducibility of polyurethane hybrids, a method that combined both a pre-polymer and a higher hard segment content into the 'in-situ' formed polyurethane matrix was performed. The method enabled a better mechanical strength of green films, hence drastically improving processability and enabling higher polymer contents. Higher viscosities of starting components prevented the uncontrollable 'squeezing' of the material under pressure, while still allowing for a sufficient low of components and form cured composites with high pressed densities. The use of pre-polymers, with DP as low as about 3 provided viscosities that were high enough to prevent the material from flowing out of the hybrid during processing, while 20 wt. % of hard phase content improved mechanical properties and enabled formation of free-standing films.

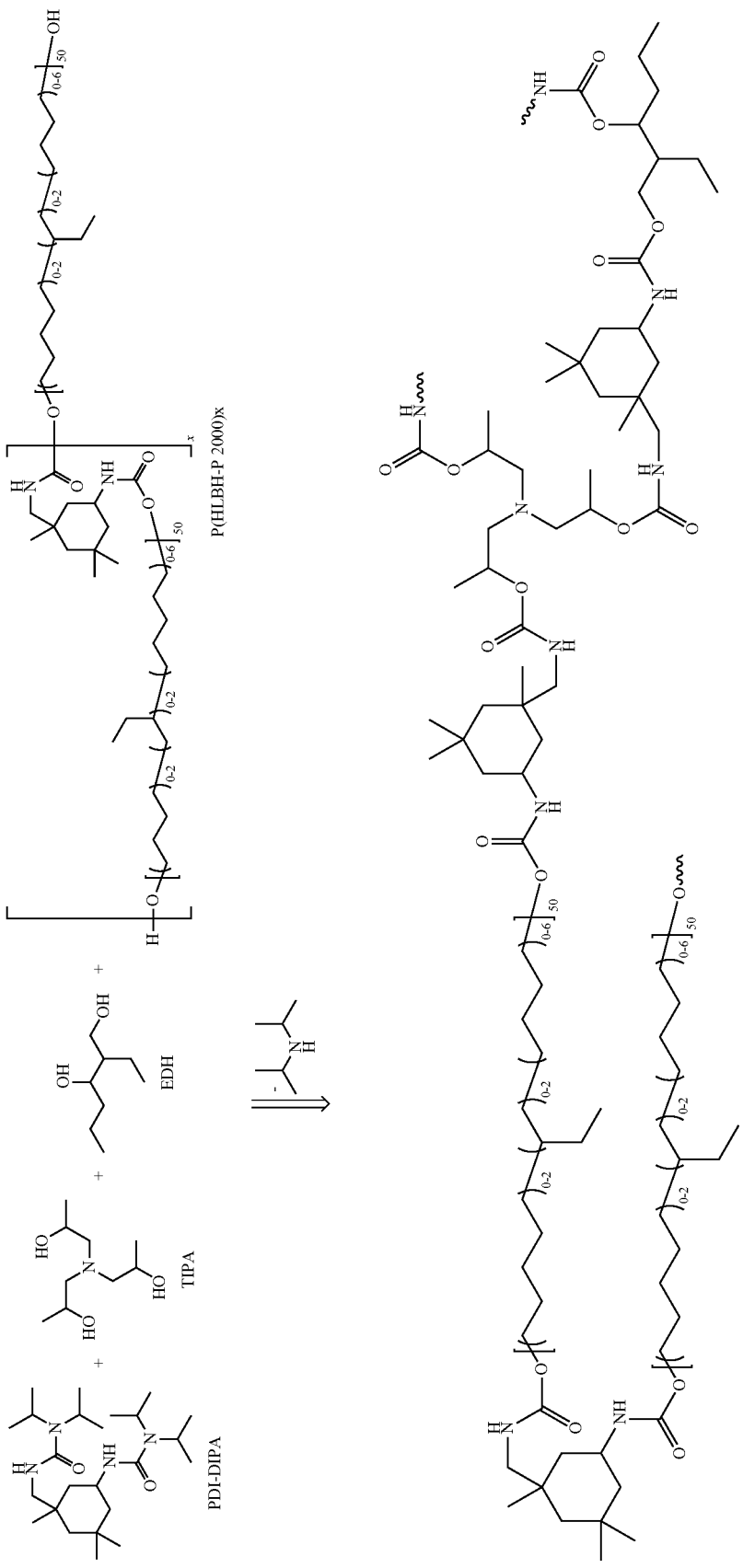

Three films with 20 wt. % hard phase in the polyurethane matrix and progressively increasing fraction of the polyurethane matrix (20, 25 and 27.5 wt. %) were prepared as slurries and cast on Teflon via doctor blade technique. The curing was done under the same conditions for all films; hybrids were pressed at 15 MPa for 3 hrs, while heating at 140° C. Green and pressed densities were calculated for each film and compared to theoretical densities of fully densified films. Interestingly, under tested curing conditions, green and pressed densities were remained the same for each film, independently on the fraction of incorporated polyurethane (see FIG. 23). The green (open square) and pressed (full square) densities were calculated from the theoretical maximum density and were about 65% and 90% respectively.

Figure 23:
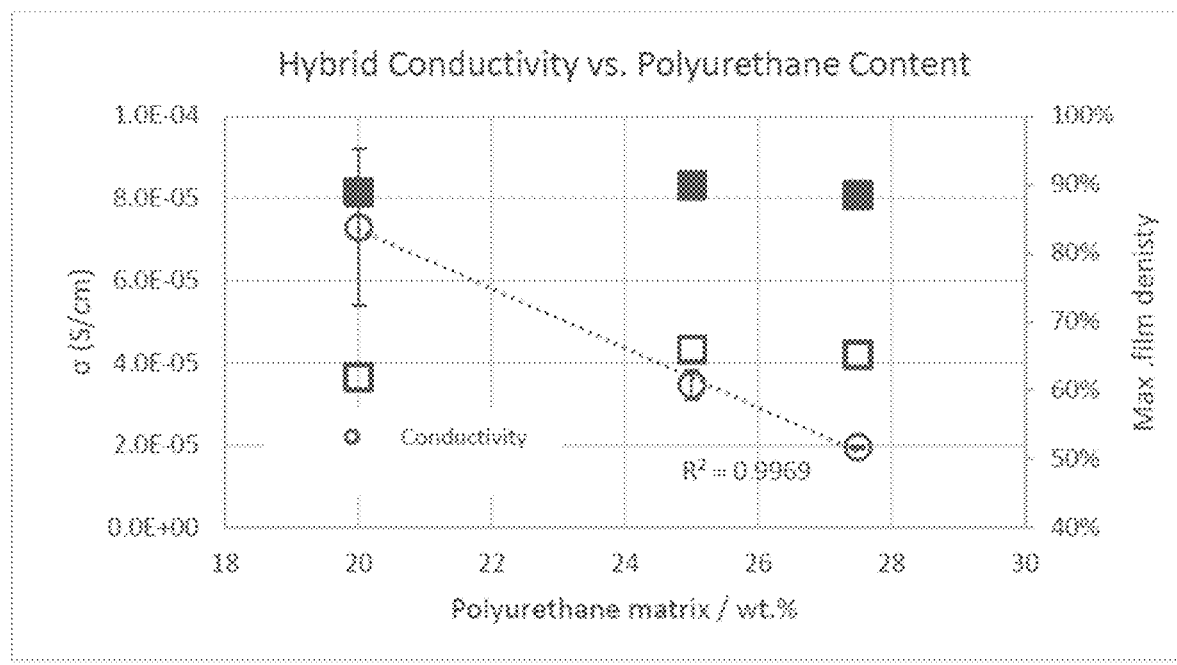
FIG. 23 is a plot showing the effect of the weight fraction of incorporated polyurethane (20 wt. % of hard phase) on conductivities of composite films.

Synthesized free-standing films showed a linear correlation between the weight fraction of polyurethane matrix incorporated into the composite and conductivities measured at room temperature (open circle, FIG. 23). The conductivity dropped as more polymer was incorporated into the system, which is expected when more non-conductive phase is incorporated into an electrolyte.

Figure 24:
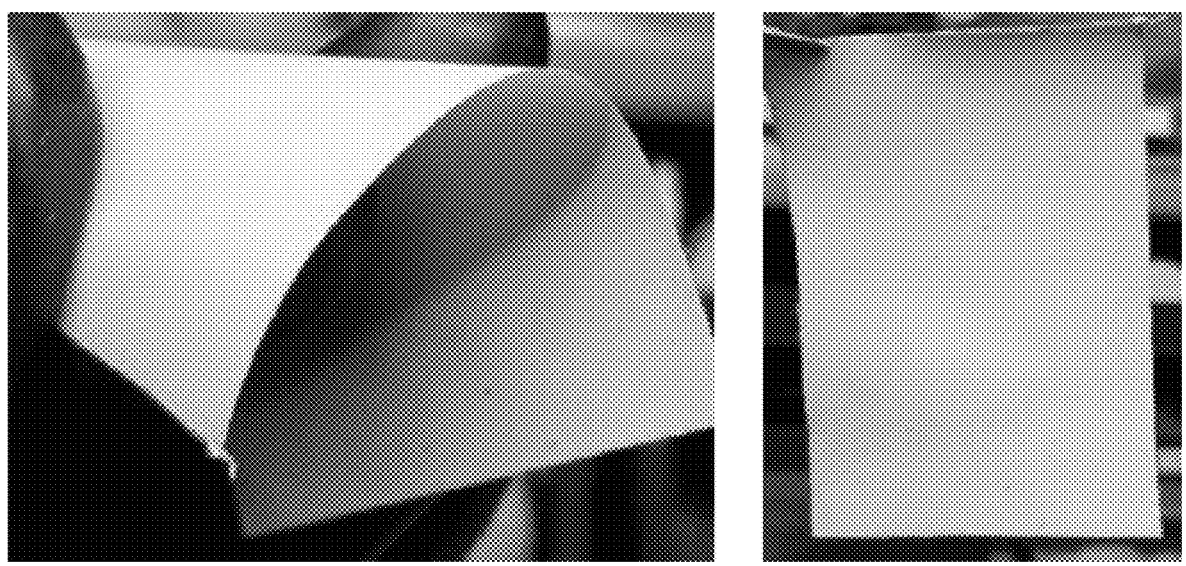
FIG. 24 shows digital images of the free-standing film prepared from $Li_2S:P_2S_5=75:25$, and 20 wt. % polyurethane prepared from P(HLBH-P 2000)3, IPDI-DIPA, EDH and TIPA, containing 20 wt. % of hard phase.

The mechanical properties of the composites improved with the amount of polyurethane incorporated into films. The more polyurethane the better mechanical properties were observed; all films showed mechanical performance sufficiently good to form flexible, free-standing films. FIG. 24 shows images of the hybrid prepared with 20 wt. % polyurethanes containing 20 wt. % of hard phase.

SEM imaging as done on top-down and cross-section views of films with 20, 25 and 27.5 wt. % polyurethanes respectively show that hybrids with higher polyurethane contents give more uniform, smoother films with lower surface roughness. In addition, cross-section views show that the film with 27.5 wt. % of polyurethanes had less mechanical imperfections, such as horizontal cracks and large pores, than films with lower polymer fractions.

Example 13: Effect of Particle Size of Inorganic Conductor

The effect of $Li_2S:P_2S_5=75:25$ glass particles size on properties of thin-film electrolytes was studied. $Li_2S:P_2S_5=75:25$ glass prepared according to standard procedure yields mean average number particle size, d50, about 12 μm. To reduce particle size, the standard glass is milled further using a wet technique. Glass particles after wet-milling give average particle size of $d_{50}$ of about 5 μm; over 50% smaller than standard glass particles.

Figure 25:
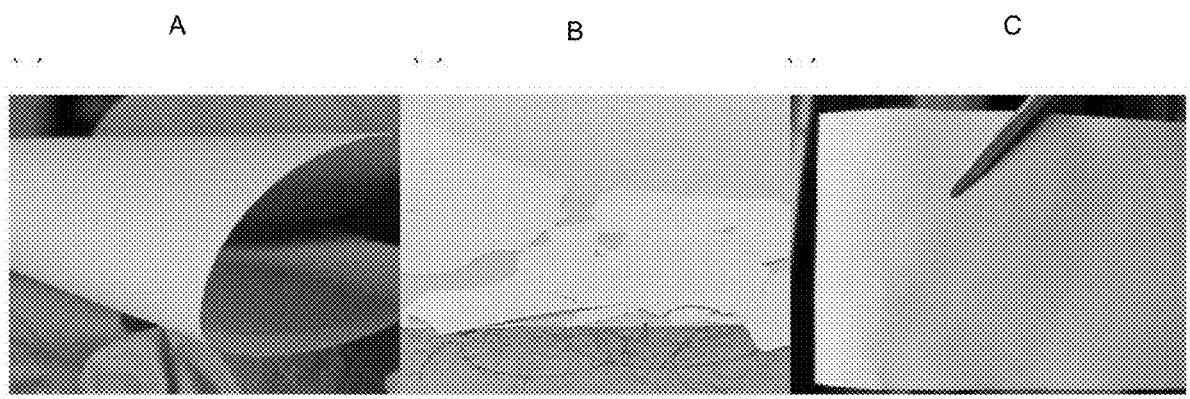
FIG. 25 shows digital images of thin films composed of 20 wt. % polyurethanes (20 wt. % hard phase) and $Li_2S$: $P_2S_5=75:25$ glass with (A) 12 μm (1-12), (B) 5 μm (s-5), and (C) 2:1 mixture of 12 μm and 5 μm (m-12/5) particle sizes.

Three films containing 20 wt. % of polyurethane (20 wt. % hard phase) and sulfide glass conductor with varying grain size were prepared. The three films contained the glass with following particle diameters, $d_{50}$: 12 μm (1-12), 5 μm (s-5), and a 2:1 mixture of 12 μm and 5 μm (m-12/5), were tested. Composite films were cast and processed following procedures described in Example 12. FIG. 25 shows respective digital images of thin films obtained from 1-12, s-5 and m-12/5.

The difference in mechanical properties and appearance of prepared thin film composites was drastically different depending on the size of inorganic conductor particles. While larger glass particles, 1-12, provided a flexible free-standing film (FIG. 25 (A)), the smaller glass, s-5, yielded a very brittle film with poor elasticity, that shattered during curing (FIG. 25 (B)).

Additionally, the appearance of films changed with size of inorganic component. The larger particles for a film with matte appearance, whereas small glass grains form smoother and shiner surfaces. In case of mixed glass size, m-12/5, the properties were basically an average of those observed for films made from large and small particles. SEM images of three films confirm visual observations of the effect of particle sizes on properties of hybrids.

The most interesting difference was the effect of the particle size on the density and porosity of films. The larger the size of particles used, the higher the porosity and pore size observed in the film. The 1-12 glass formed more a porous and heterogeneous film whereas s-5 hybrid was much more homogeneous and smoother, with very little porosity observed. The mixed particle size, m-12/5, formed a film with lower porosity and higher homogeneity than pure large particles, yet not as good as the ones observed for the film with s-5 glass. The conductivity measurements at room temperature yielded 0.081, 0.036 and 0.044 mS/cm for hybrids prepared from 1-12, s-5 and m-12/5 respectively. The data shows the clear correlation between particles size and properties of prepared hybrid composite. The larger particles lead to membranes with more robust mechanical properties and better conductivities, while smaller particles give more compact, uniform films with lower porosity and better density. The evidence also showing additive effect of properties of mixed size particles, as proved by conductivity and SEM data.

Example 14: Conductivities of Composites With Polyurethane Matrix Prepared From Various Polymer Diols Table 8 summarizes conductivities of sulfide composites with polyurethane matrix prepared from various polymeric diols. Polymer diols tested included different classes of polymers with varying molecular weights, including hydrogenated polybutadiene (HLBH), polyethers (PTHF), polyesters (PCL), polyesters of fatty acid dimers (Priplast), and oligomers of hydrogenated polybutadiene (PHLBH). Conductivities remained high for different diols, however mechanical properties were much more strongly affected and were typically worse for more polar polymer diols. All films were processed by heating to 140° C. at 3 h under application of 15 Mpa.

| Sample | Polymer diol | MW (g/mol) | Polymer Phase Composition | $10^{-4}$ cond./ S cm$^{-1}$ 60 in-lbs | Film quality |
|---|---|---|---|---|---|
| PU-7.1 | HLBH | 2,100 | 15 wt. % (polymer diol, IPDI-DIPA, PPFI-DIPA) | 1.7 ± 0.5 | Good |
| PU-7.2 | | 3,100 | | 1.04 ± 0.13 | Good |
| PU-7.3 | P(HLBH2000)3 | 6,745 | | 1.6 ± 0.2 | Good |
| PU-7.4 | P(HLBH2000)5 | 10,500 | | 1.54 ± 0.10 | Good |
| PU-7.5 | P(HLBH2000)9 | 18,900 | | 1.34 ± 0.12 | Good |
| PU-7.6 | P(HLBH2000)15 | 34,600 | | 1.06 ± 0.12 | Good |
| PU-7.7 | PCL | 1,000 | | — | Bad slurry |

-continued

| Sample | Polymer diol | MW (g/mol) | Polymer Phase Composition | $10^{-4}$ cond./ S cm$^{-1}$ 60 in-lbs | Film quality |
|---|---|---|---|---|---|
| PU-7.8 | | 2,000 | | 1.0 ± 0.3 | Brittle |
| PU-7.9 | | 3,000 | | 1.42 ± 0.05 | Brittle |
| PU-7.10 | PTHF | 1,000 | | — | Bad slurry |
| PU-7.11 | | 1,900 | | 0.51 ± 0.06 | Good |
| PU-7.12 | | 2,900 | | 0.25 | Good |
| PU-7.13 | P(HLBH2000)3 | 6,745 | 20 wt. % | 1.00 ± 0.12 | Very good |
| PU-7.14 | Priplast 3172 | 3,000 | (polymer diol, | 1.71 | Brittle |
| PU-7.15 | 3196 | 3,000 | IPDI-DIPA, | 1.2 ± 0.2 | Brittle |
| PU-7.16 | 3238 | 2,000 | EHD, TIPA) | 0.73 | Brittle |
| PU-7.17 | 1838 | 2,000 | | 1.35 | Brittle |

Example 15: X-Ray Diffraction (XRD) Analysis of Pristine Sulfide Conductor

Figure 26:
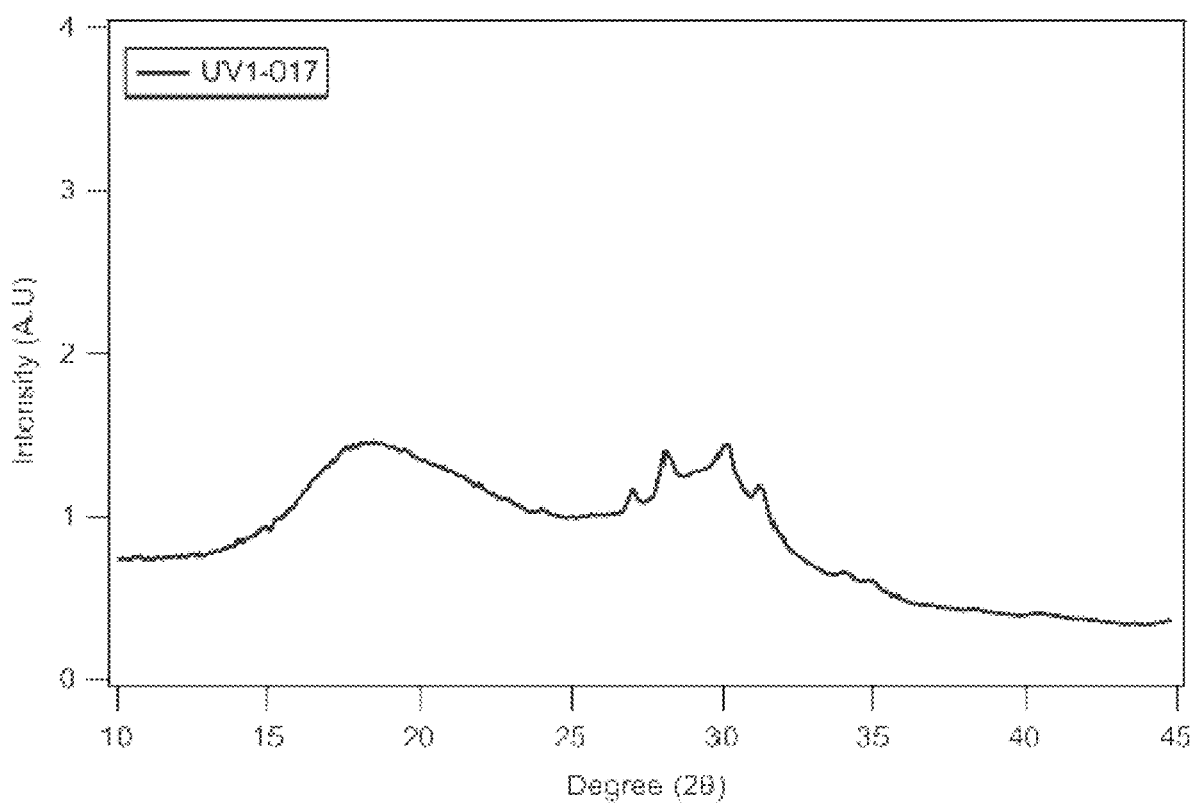
FIG. 26 shows an example of an XRD pattern of a representative pristine sulfide conductor.

Sulfide conductor ($Li_2S:P_2S_5$=75:25) XRD samples were prepared in an argon-filled glovebox by placing sample in a glass capillary then sealing with wax. The sealed capillaries were then removed from the glovebox and sent for XRD analysis. FIG. 26 shows an example of an XRD pattern of a representative pristine sulfide conductor. The XRD pattern indicates that the sample has both amorphous and crystalline domains.

Example 16: Effect of SEBS Fraction on 72% wt. Sulfide Conductor Composite

Figure 27:
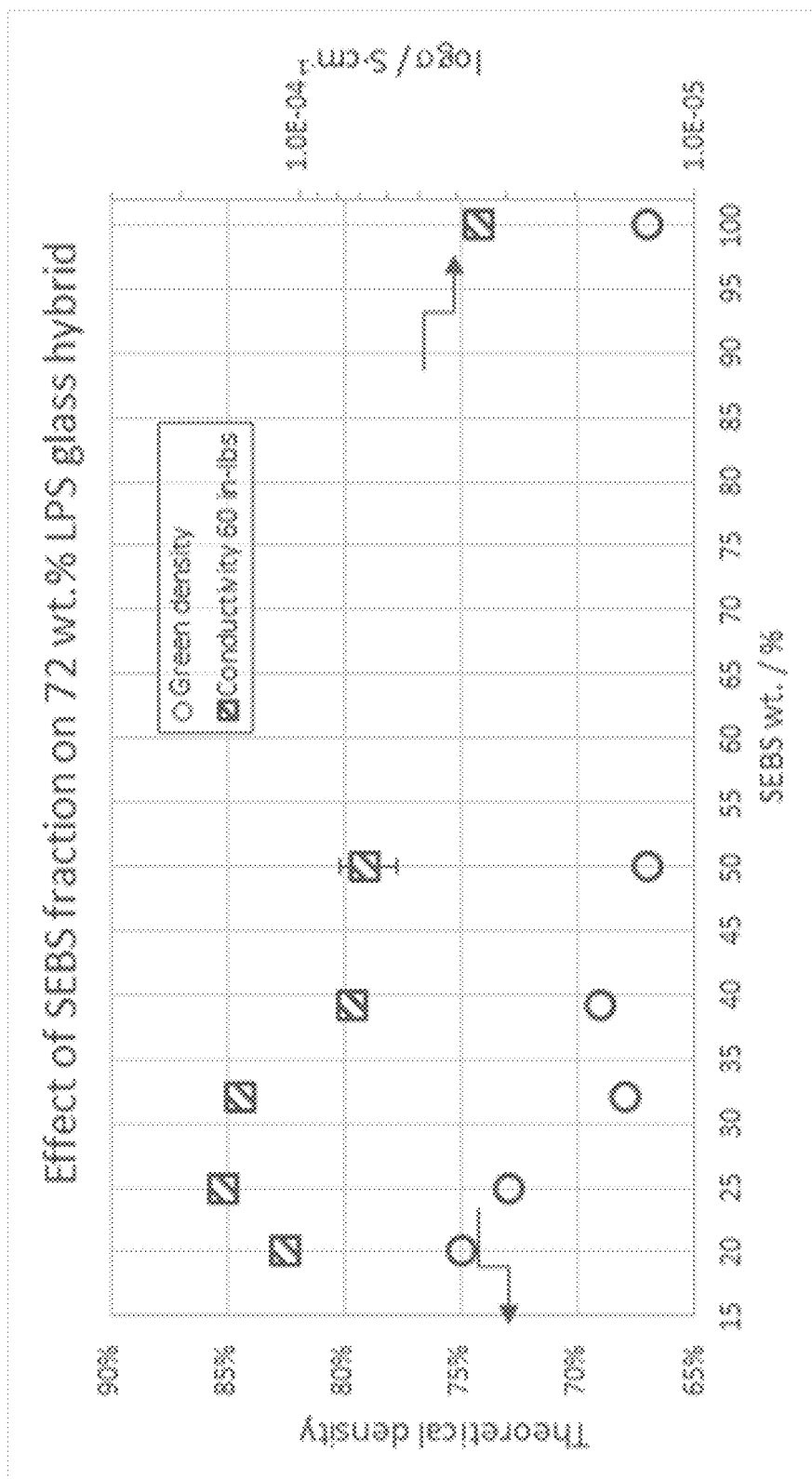
FIG. 27 is a graph showing the theoretical density and conductivity of composites having an organic phase that includes a high molecular weight binder (SEBS) and a polymer diol as a function of SEBS wt. % in the organic phase.

A series of $Li_2S:P_2S_5$ composite electrolytes were prepared with 28 wt. % total HLBH2000-SEBS polymer matrix, containing between 20 and 100 wt. % of SEBS in the mixture. All composites were prepared under the same conditions, 140° C. for 3 hrs under 12 tons load. FIG. 27 is a graph showing the theoretical density and conductivity of each composite as a function of SEBS wt. % in the organic phase. SEBS, as the only component of the organic phase, resulted in the lowest conductivities (~0.035 mS/cm) in the series, whereas the highest conductivities (0.10-0.15 mS/cm) were obtained for composites with 20-33 wt. % of SEBS mixed into the matrix with HLBH2000. In addition, Composites containing 20-25 wt. % of SEBS in the matrix had higher green densities (73-75%) than those of SEBS-richer (>25 wt. %) composite films (66-69%). The results that incorporation of HLBH2000 into organic matrix with solid binder such as SEBS can significantly improve processability of composites films.

The results indicate that polymer diols cannot only act as a lubricant for inorganic particles, resulting in higher green density and easier 'compaction' of material, but also as plasticizer for solid binders, such as SEBS. The presence of HLBH2000 as plasticizer helps improve processability of SEBS, reducing requirements for pressure and temperatures used for pure SEBS materials to obtain the same properties such as conductivity.

Example 17: Composite With In-Situ Polymerized Polyurethane and High Molecular Weight Binder In a glovebox operating under argon atmosphere, a 30 mL polypropylene cup was filled with 2.550 g of lithium sulfide glass (Li2S:P2S5=75:25) sieved to <25 μm. A 25 wt. % solution of HLBH2000 mixed with PPFI-DIPA and IPDI-DIPA (1:9=n:n, NCO) in 1:1 molar ratio was prepared in 1,2,4-trimethylbenzene and dried over molecular sieves before use. Next, 0.50 g of dried stock solution was added to the glass, followed by 8 Ø=10 mm zirconia balls and 2.0 g of 1,2,4-trimethylebenzene. The cup was placed on a tube roller at 200 rpm for 16 hrs. Next, the mixture was coated on Teflon using a square applicator with 6 mil gap size, the solvent evaporated under ambient conditions and then the film was further dried under vacuum in a glove box antechamber at room temperature for 16 hrs. Afterwards, a 50 mm×70 mm piece of the film was cut out, and pressed at 160° C. for 3 hrs, under 17 MPa using a hydraulic press. The cross-linked film was cooled down to room temperature, and only then the pressure was released. Afterwards, Teflon sheet used as a substrate was peeled off and the resulting hybrids was obtained as a free-standing film.

Composites with 20, 25 and 30 wt. % of organic phase containing a mixture of solid binder (SEBS) and polyurethane precursors were synthesized. In addition, different fractions of SEBS, 17-50 wt. %, in organic matrix were explored. Films were processed by heating at 140 or 160° C., under 17 MPa pressure for 3 hrs. Conductivity measurements were done at room temperature, and results are summarized in the below table. Similar to pure polyurethane matrix phases, higher total polymer contents of organic phase negatively affected the conductivities of hybrids, which dropped from 0.06-0.08 mS/cm to few μS/cm for films with more than 20 wt. % of polymers. There was no clear dependence of the wt. fraction of SEBS in organic matrix of the hybrid conductivities.

| Sample | Total wt. % organic phase | SEBS wt. % in organic phase | $\sigma \cdot 10^{-4}$/S·cm$^{-1}$ at rt Hot-pressing temp./° C. 140 | 160 |
|---|---|---|---|---|
| 7.1 | 20 | 25 | 0.69 | 0.80 |
| 7.2 | | 50 | 0.69 | 0.59 |
| 7.3 | 25 | 20 | 0.04 | N/A |
| 7.4 | | 40 | 0.035 | |
| 7.5 | 30 | 17 | Flaked off | |
| 7.6 | | 33 | 0.02 | |
| 7.7 | | 50 | 0.01 | |

Example 18: Uniformity and Conductivity of Composite Films

The table below summarizes conductivities of composite films containing 15-30 wt. % polymer and correlates the effect of a matrix polymerization method with observed composite uniformity. The uniformity is quantified as a standard deviation from an average conductivity measured for three discs cut out from the same composite sheet. A standard deviation of about 10% is expected based just on measurements errors, i.e.: temperature, film thickness or impedance. The higher the deviation from the average the less uniform the composite film is.

in the standard deviation of conductivities as compared to 'in-situ' approach: 24 to 6-12% (PU-8.1 to PU-8.5-PU-8.8), and 51-76% to 22-31% (PU-8.2-PU-8.4 to PU-8.9-PU-8.11), for 15 wt. % and 25-30 wt. % polymers hybrids respectively.

| Sample | Method | Total wt. % polymers | Polymer diol | Other Reactants | | Cond. mS/cm | St. dev. % |
|---|---|---|---|---|---|---|---|
| PU-8.1 | In-situ | 15 | HLBH2000 | IPDI-DIPA, | | 0.125 | 24 |
| PU-8.2 | | 25 | | PPFI-DIPA | | 0.135 | 76 |
| PU-8.3 | | 27.5 | | | | 0.054 | 49 |
| PU-8.4 | | 30 | | | | 0.012 | 51 |
| PU-8.5 | Ex-situ | 15 | P(HLBH2000)3 | IPDI-DIPA, | | 0.161 | 12 |
| PU-8.6 | | | P(HLBH2000)5 | PPFI-DIPA | | 0.154 | 6 |
| PU-8.7 | | | P(HLBH2000)9 | | | 0.134 | 9 |
| PU-8.8 | | | P(HLBH2000)15 | | | 0.106 | 11 |
| PU-8.9 | | 25 | P(HLBH2000)3 | | | 0.042 | 31 |
| PU-8.10 | | | P(HLBH2000)5 | | | 0.03 | 29 |
| PU-8.11 | | 30 | P(HLBH2000)9 | | | 0.03 | 22 |
| PU-8.12 | Hard phase | 15 | HLBH2000 | IPDI-DIPA, EDH, TIPA | 20 wt. % HP | 0.098 | 8 |
| PU-8.13 | | | | | 25 wt. % HP | 0.124 | 13 |
| PU-8.14 | | | | | 30 wt. % HP | 0.056 | 1 |
| PU-8.15 | | | | | 40 wt. % HP | 0.120 | 12 |
| PU-8.16 | Ex-situ + hard phase | 20 | P(HLBH2000)3 | IPDI-DIPA, EDH, TIPA | 20 wt. % HP | 0.100 | 12 |
| PU-8.17 | | | | | 30 wt. % HP | 0.081 | 15 |
| PU-8.18 | | 25 | | | 20 wt. % HP | 0.077 | 4 |
| PU-8.19 | | | | | 30 wt. % HP | 0.080 | 13 |

The 'in-situ' method describes a polyurethane matrix formed via in-situ crosslinking of HLBH2000 diol in presence of blocked isocyanates, IPDI-DIPA and PPFI-DIPA. Conductivity measurements of hybrids (PU-8.1-PU-8.4) with 15-30 wt. % of polymers prepared through that approach show large standard deviations, between 24 and 76%, with higher values observed at higher polymers loading. These results indicate on a large heterogeneity and non-uniformity of films prepared via the 'in-situ' approach. It is correlated with poor mechanical integrity of films under high processing temperatures and pressures. Viscosities of low molecular weight HLBH2000 at used processing conditions can lead to significant flow of the materials, leading to phase separation or 'oozing-out' of organic components from the film. Hence, leading to large composition variations across the film, and therefore standard deviations of conductivities.

The 'ex-situ' approach utilizes higher molecular weight pre-polymer diols prepared from HLBH2000 in a reaction with IPDI diisocyanate. Pre-polymers with degrees of polymerization (DP), and hence molecular weights, of HLBH2000, 3, 5, 9 and 15 were prepared. The higher the DP the more viscous the resulting pre-polymer. The conductivity data shows small, liner drop in conductivities with increasing DP of used pre-polymer in hybrids containing 15 wt. % polymers (PU-8.5-PU-8.8). Standard deviations of conductivities were in a range of 6-12%, independently on DP of pre-polymer, and within a standard conductivity measurement error. The higher viscosity of pre-polymers in 'ex-situ' methods enabled more uniform films with the same composition and under the same processing conditions as compared to 'in-situ' approach. This is proved by the drop The introduction of hard phase components EDH extender and TIPA crosslinker in the 'hard phase' method described above allowed for an additional improvement of mechanical properties, and hence, processability and uniformity. Composites containing 15 wt. % polymers and 20-40 wt. % hard phase components showed standard deviation of conductivities varying from 1 to 13%, as compared to 'ex-situ' approach giving 6-12% variations and 'in-situ' method with 24% conductivity variation.

As both 'ex-situ' and 'hard phase' approaches improved uniformity of films, the last approach used a combination of pre-polymers and hard phase components. Conductivity data shows that even at 20-25 wt. % of total polymers (PU-8.16-8.19) comprised pre-polymer and hard phase components, the standard deviation is in a range of 4-15%, which indicate much more uniform films that any higher polymer content films prepared by either 'in-situ' (49-76%) or 'ex-situ' (22-31%) approach.

In the description above and in the claims, numerical ranges are inclusive of the end points of the range. For example, "an average diameter between 0.1 µm and 500 µm," includes 0.1 µm and 500 µm. Similarly, ranges represented by a dash (e.g., 50%-99%) are inclusive of the end points of the ranges.

All conductivities referred to are at room temperature (about 25° C.). It should be noted that conductivities are strongly dependent on temperature, with higher temperatures resulting in higher conductivities.

The foregoing describes the instant invention and its certain embodiments. Numerous modifications and variations in the practice of this invention are expected to occur to those skilled in the art. For example, while the above specification describes electrolytes and cathodes for alkali

The invention claimed is:

1. A secondary battery comprising a solid-state electrolyte composition wherein the solid state electrolyte composition comprising: ionically conductive inorganic particles in a non-ionically conductive organic phase, wherein the non-ionically conductive organic phase comprises a cross-linked network wherein the cross-linked network is a cross-linked polyurethane network, a cross-linked poly(urea-urethane) network, or a cross-linked polythiourethane network, wherein the cross-linked network comprises a hard phase and a soft phase, wherein the hard phase comprises a chain extender, a cross-linker, an isocyanate, or any combination thereof, wherein the soft phase comprises a polymer backbone, wherein the organic phase comprises an isocyanate blocking agent, wherein the isocyanate blocking agent is diisopropylamine-blocked 4,4- diisocyanatodiphenylmethane (MDI-DIPA), methyl ethyl ketone-blocked 4,4- diisocyanatodiphenylmethane (MDI-MEKO), diisopropylamine-blocked isophorone diisocyante (IPDI-DIPA) or poly [(phenyl isocyanate)-co-formaldehyde] (PPFI-DIPA),
and wherein the weight percentage of the hard phase in the cross-linked network is between 5% and 50%.

2. A secondary battery comprising a solid-state electrolyte composition of claim 1, wherein the weight percentage of the hard phase in the cross-linked network is between 10% and 30%.

3. A secondary battery comprising a solid-state electrolyte composition of claim 1, wherein the weight percentage of the hard phase in the cross-linked network is between 20% and 30%.

4. A secondary battery comprising a solid-state electrolyte composition of claim 1, wherein the soft phase comprises a non-polar backbone.

5. A secondary battery comprising a solid-state electrolyte composition of claim 1, wherein the soft phase comprises a low-polar backbone.

6. A secondary battery comprising a solid-state electrolyte composition of claim 1, wherein the soft phase comprises a hydrogenated polyolefin backbone.

7. A secondary battery comprising a solid-state electrolyte composition of claim 1, wherein the hard phase comprises a chain extender selected from:
ethylene glycol, propylene glycol, triethylene glycol, tetraethylene glycol, propylene glycol, dipropylene glycol, 1,3-propanediol, 1,3-butanediol, 1,4-butanediol, neopentyl glycol, 1,6-hexanediol, 1,12-dodecanediol, 1,4-cyclohexanedimethanol, 2-butyl-2-ethyl- 1,3-propanediol, 2-ethyl-1,3-hexanediol (EHD), 1,4-bis(2-hydroxyethoxy)benzene, ethanolamine, diethanolamine, methyldiethanolamine, 1,12-diaminododecane, phenyldiethanolamine, 4,4'- ethylene dianiline, dimethylthiotoluenediamine, diethyl toluene diamine, 4,4'- methylene-bis-2,6- diethyl aniline, or m-xylene diamine, or any combination thereof.

8. A secondary battery comprising a solid-state electrolyte composition of claim 1, wherein the hard phase comprises a cross-linker selected from: glycerol, trimethylolpropane, 1,2,6-hexanetriol, diethylenetriamine, triethanolamine, tetraerythritol, pentaerythritol, N,N-bis(2-hydroxypropyl)aniline, triisopropanolamine (TIPA), or N,N,N'N''-tetrakis(2-hydroxypropyl)ethylenediamine, or any combination thereof.

9. A secondary battery comprising a solid-state electrolyte composition of claim 1, wherein the composition is a substantially uniform film.

10. A secondary battery comprising a solid-state electrolyte composition of claim 1, wherein the composition is a substantially free-standing film.

11. A secondary battery comprising a solid-state electrolyte composition of claim 1, wherein the organic phase comprises a polymer binder.

12. A secondary battery comprising a solid-state electrolyte composition of claim 11, wherein the polymer binder is between 10% and 50% by weight of the organic phase.

13. A secondary battery comprising a solid-state electrolyte composition of claim 1, wherein the organic phase is free of a polymer binder.

14. A secondary battery comprising a solid-state electrolyte composition of claim 1, wherein the organic phase is 2.5%-60% by weight of the composition.

15. A secondary battery comprising a solid-state electrolyte composition of claim 1, wherein the organic phase is at least 20% by weight of the composition.

16. A secondary battery comprising a solid-state electrolyte composition of claim 1, wherein the cross-linked network is polymerized in-situ.

17. A secondary battery comprising a solid-state electrolyte composition of claim 1, wherein the cross-linked network comprises a backbone selected from a polyolefin, a polysiloxane, a polystyrene, and a cyclic olefin polymer.

18. A secondary battery comprising a solid-state electrolyte composition of claim 1, wherein the cross-linked network comprises a polydimethylsiloxane (PDMS) backbone.

19. A secondary battery comprising a solid-state electrolyte composition of claim 1, wherein the cross-linked network comprises a polybutadiene (PBD) backbone.

20. A secondary battery comprising a solid-state electrolyte composition of claim 1, wherein the cross-linked network comprises one or more of:

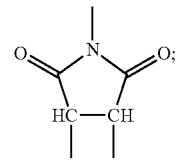

2) —NH—C(O)—NR—, where R is H, alkyl or aryl; 3) —NH—C(O)—O—; and 4) —NH—C(O)—S—.

21. A secondary battery comprising a solid-state electrolyte composition of claim 1, wherein the organic phase does not include an added salt.

22. A secondary battery comprising a solid-state electrolyte composition of claim 1, wherein the average particle size of inorganic ionically conductive particles is less than 20 µm.

23. A secondary battery comprising a solid-state electrolyte composition of claim 1, wherein the average particle size of inorganic ionically conductive particles is less than 7 µm.

24. A secondary battery comprising a solid-state electrolyte composition of claim 1, wherein the inorganic ionically conductive particles have a multi-modal size distribution having a first size distribution with an average size of less than 7 µm and a second size of greater than 10 µm.

25. A secondary battery comprising a solid-state electrolyte composition of claim 1, wherein the composition is disposed on a removable substrate.

26. A secondary battery comprising a solid-state electrolyte composition of claim 1, wherein the non-ionically conductive organic phase comprises an argyrodite.

27. A secondary battery comprising a solid-state electrolyte composition wherein the solid state electrolyte composition comprising: ionically conductive inorganic particles in a non-ionically conductive organic phase, wherein the non-ionically conductive organic phase comprises a cross-linked network, wherein the cross-linked network is a cross-linked polyurethane network, a cross-linked poly(urea-urethane) network, or a cross-linked polythiourethane network, wherein the cross-linked network comprises a hard phase and a soft phase, wherein the organic phase comprises an isocyanate blocking agent, wherein the isocyanate blocking agent is diisopropylamine-blocked 4,4-diisocyanatodiphenylmethane (MDI-DIPA), methyl ethyl ketone-blocked 4,4-diisocyanatodiphenylmethane (MDI-MEKO), diisopropylamine-blocked isophorone diisocyante (IPDI-DIPA) or poly[(phenyl isocyanate)-co-formaldehyde] (PPFI-DIPA),
  wherein the hard phase is selected from the group consisting of chain extenders, cross-linkers, isocyanates, and any combination thereof, wherein the soft phase comprises a polymer backbone, and wherein the weight percentage of the hard phase in the cross-linked polyurethane network, a cross-linked poly(urea-urethane) network, or a cross-linked polythiourethane network is between 5% and 50%, wherein, the chain extenders comprise ethylene glycol, propylene glycol, triethylene glycol, tetraethylene glycol, propylene glycol, dipropylene glycol, 1,3-propanediol, 1,3-butanediol, 1,4-butanediol, neopentyl glycol, 1,6-hexanediol, 1,12-dodecanediol, 1,4- cyclohexanedimethanol, 2-butyl-2-ethyl-1,3-propanediol, 2-ethyl-1,3-hexanediol (EHD), 1,4-bis(2- hydroxyethoxy)benzene, ethanolamine, diethanolamine, methyldiethanolamine, 1,12-diaminododecane, phenyldiethanolamine, 4,4'-ethylene dianiline, dimethylthiotoluenediamine, diethyl toluene diamine, 4,4'-methylene-bis-2,6-diethyl aniline, m-xylene diamine, or any combination thereof, and wherein, the cross-linkers comprise glycerol, trimethylolpropane, 1,2,6- hexanetriol, diethylenetriamine, triethanolamine, tetraerythritol, pentaervthritol, N,N- bis(2-hydroxypropyl)aniline, triisopropanolamine (TIPA), N,N,N'N"-tetrakis(2- hydroxypropyl)ethylenediamine, or any combination thereof.

* * * * *